US009946676B2

(12) United States Patent
Wagh et al.

(10) Patent No.: US 9,946,676 B2
(45) Date of Patent: Apr. 17, 2018

(54) MULTICHIP PACKAGE LINK

(71) Applicant: Intel Corporation, Santa Clara, CA (US)

(72) Inventors: Mahesh Wagh, Portland, OR (US); Zuoguo Wu, San Jose, CA (US); Venkatraman Iyer, Austin, TX (US); Gerald S. Pasdast, San Jose, CA (US); Mark S. Birrittella, Chippewa Falls, WI (US); Ishwar Agarwal, Hisslboro, OR (US); Lip Khoon Teh, Penang (MY); Su Wei Lim, Penang (MY); Anoop Kumar Upadhyay, Uttar Pradesh (IN)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 14/669,975

(22) Filed: Mar. 26, 2015

(65) Prior Publication Data
US 2016/0283429 A1    Sep. 29, 2016

(51) Int. Cl.
G06F 17/50     (2006.01)
G06F 13/40     (2006.01)
G06F 13/36     (2006.01)

(52) U.S. Cl.
CPC ......... G06F 13/4022 (2013.01); G06F 13/36 (2013.01); G06F 13/4068 (2013.01)

(58) Field of Classification Search
CPC ............ G06F 17/5081; G06F 17/5068; G06F 13/4022
USPC ........................................ 716/116
See application file for complete search history.

(56) References Cited

U.S. PATENT DOCUMENTS

| 7,003,066 | B1 | 2/2006 | Davis et al. |
| 7,627,806 | B1 | 12/2009 | Vijayaraghavan et al. |
| 2005/0121789 | A1* | 6/2005 | Madurawe .......... H01L 27/0207 257/758 |
| 2006/0161703 | A1 | 7/2006 | Nemazie et al. |
| 2006/0242339 | A1* | 10/2006 | Dickson ................. G06F 1/182 710/62 |

(Continued)

FOREIGN PATENT DOCUMENTS

| WO | 2014-065875 | 2/2006 |
| WO | 2016153660 A1 | 9/2016 |

OTHER PUBLICATIONS

International Search Report and Written Opinion in International Application No. PCT/US2016/018836 dated Jul. 28, 2016.

(Continued)

Primary Examiner — Suchin Parihar
(74) Attorney, Agent, or Firm — Alliance IP, LLC

(57) ABSTRACT

A system-on-a-chip, such as a logical PHY, may be divided into hard IP blocks with fixed routing, and soft IP blocks with flexible routing. Each hard IP block may provide a fixed number of lanes. Using p hard IP blocks, where each block provides n data lanes, h=n*p total hard IP data lanes are provided. Where the system design calls for k total data lanes, it is possible that k≠h, so that ⌈k/n⌉ hard IP blocks provide h=n*p available hard IP data lanes. In that case, h−k lanes may be disabled. In cases where lane reversals occur, such as between hard IP and soft IP, bowtie routing may be avoided by the use of a multiplexer-like programmable switch within the soft IP.

25 Claims, 36 Drawing Sheets

(56) References Cited

U.S. PATENT DOCUMENTS

2007/0141992 A1   6/2007  Kwa et al.
2007/0239922 A1  10/2007  Horigan
2009/0206876 A1\*  8/2009  Liu .................................. 326/39
2010/0268853 A1  10/2010  Oh et al.
2013/0094507 A1   4/2013  Brebner
2014/0009633 A1   1/2014  Chopra et al.
2015/0357257 A1\*  12/2015  Or-Bach et al. .............. 716/108

OTHER PUBLICATIONS

International Preliminary Report on Patentability in International Application No. PCT/US2016/018836 dated Oct. 5, 2017, 11 pages.

\* cited by examiner

|     | Lanes |     |     |     |     |     |     |     |     |     |     |     |     |     |     |     |     |     |
| --- | --- | --- | --- | --- | --- | --- | --- | --- | --- | --- | --- | --- | --- | --- | --- | --- | --- | --- |
|     |     | 49 | 48 | 47 | 46 | 45 | 44 | 43 | 42 | 41 | 40 | 39 | 38 | 37 | 36 | 35 | 34 | 33 | 32 |
| UI  | 1 | 392 | 384 | 376 | 368 | 360 | 352 | 344 | 336 | 328 | 320 | 312 | 304 | 296 | 288 | 280 | 272 | 264 | 256 |
|     | 2 | 393 | 385 | 377 | 369 | 361 | 353 | 345 | 337 | 329 | 321 | 313 | 305 | 297 | 289 | 281 | 273 | 265 | 257 |
|     | 3 | 394 | 386 | 378 | 370 | 362 | 354 | 346 | 338 | 330 | 322 | 314 | 306 | 298 | 290 | 282 | 274 | 266 | 258 |
|     | 4 | 395 | 387 | 379 | 371 | 363 | 355 | 347 | 339 | 331 | 323 | 315 | 307 | 299 | 291 | 283 | 275 | 267 | 259 |
|     | 5 | 396 | 388 | 380 | 372 | 364 | 356 | 348 | 340 | 332 | 324 | 316 | 308 | 300 | 292 | 284 | 276 | 268 | 260 |
|     | 6 | 397 | 389 | 381 | 373 | 365 | 357 | 349 | 341 | 333 | 325 | 317 | 309 | 301 | 293 | 285 | 277 | 269 | 261 |
|     | 7 | 398 | 390 | 382 | 374 | 366 | 358 | 350 | 342 | 334 | 326 | 318 | 310 | 302 | 294 | 286 | 278 | 270 | 262 |
|     | 8 | 399 | 391 | 383 | 375 | 367 | 359 | 351 | 343 | 335 | 327 | 319 | 311 | 303 | 295 | 287 | 279 | 271 | 263 |
|     | CRC | | Header Slot Type |
|     |     | 168 |

|     | Lanes |     |     |     |     |     |     |     |     |     |     |     |     |     |     |     |     |
| --- | --- | --- | --- | --- | --- | --- | --- | --- | --- | --- | --- | --- | --- | --- | --- | --- | --- |
|     |     | 31 | 30 | 29 | 28 | 27 | 26 | 25 | 24 | 23 | 22 | 21 | 20 | 19 | 18 | 17 | 16 |
| UI  | 1 | 248 | 240 | 232 | 224 | 216 | 208 | 200 | 192 | 184 | 176 | 168 | 160 | 152 | 144 | 136 | 128 |
|     | 2 | 249 | 241 | 233 | 225 | 217 | 209 | 201 | 193 | 185 | 177 | 169 | 161 | 153 | 145 | 137 | 129 |
|     | 3 | 250 | 242 | 234 | 226 | 218 | 210 | 202 | 194 | 186 | 178 | 170 | 162 | 154 | 146 | 138 | 130 |
|     | 4 | 251 | 243 | 235 | 227 | 219 | 211 | 203 | 195 | 187 | 179 | 171 | 163 | 155 | 147 | 139 | 131 |
|     | 5 | 252 | 244 | 236 | 228 | 220 | 212 | 204 | 196 | 188 | 180 | 172 | 164 | 156 | 148 | 140 | 132 |
|     | 6 | 253 | 245 | 237 | 229 | 221 | 213 | 205 | 197 | 189 | 181 | 173 | 165 | 157 | 149 | 141 | 133 |
|     | 7 | 254 | 246 | 238 | 230 | 222 | 214 | 206 | 198 | 190 | 182 | 174 | 166 | 158 | 150 | 142 | 134 |
|     | 8 | 255 | 247 | 239 | 231 | 223 | 215 | 207 | 199 | 191 | 183 | 175 | 167 | 159 | 151 | 143 | 135 |
|     | Generic Slot Type |
|     | 168 |

|     | Lanes |     |     |     |     |     |     |     |     |     |     |     |     |     |     |     |     |
| --- | --- | --- | --- | --- | --- | --- | --- | --- | --- | --- | --- | --- | --- | --- | --- | --- | --- |
|     |     | 15 | 14 | 13 | 12 | 11 | 10 | 9 | 8 | 7 | 6 | 5 | 4 | 3 | 2 | 1 | 0 |
| UI  | 1 | 120 | 112 | 104 | 96 | 88 | 80 | 72 | 64 | 56 | 48 | 40 | 32 | 24 | 16 | 8 | 0 |
|     | 2 | 121 | 113 | 105 | 97 | 89 | 81 | 73 | 65 | 57 | 49 | 41 | 33 | 25 | 17 | 9 | 1 |
|     | 3 | 122 | 114 | 106 | 98 | 90 | 82 | 74 | 66 | 58 | 50 | 42 | 34 | 26 | 18 | 10 | 2 |
|     | 4 | 123 | 115 | 107 | 99 | 91 | 83 | 75 | 67 | 59 | 51 | 43 | 35 | 27 | 19 | 11 | 3 |
|     | 5 | 124 | 116 | 108 | 100 | 92 | 84 | 76 | 68 | 60 | 52 | 44 | 36 | 28 | 20 | 12 | 4 |
|     | 6 | 125 | 117 | 109 | 101 | 93 | 85 | 77 | 69 | 61 | 53 | 45 | 37 | 29 | 21 | 13 | 5 |
|     | 7 | 126 | 118 | 110 | 102 | 94 | 86 | 78 | 70 | 62 | 54 | 46 | 38 | 30 | 22 | 14 | 6 |
|     | 8 | 127 | 119 | 111 | 103 | 95 | 87 | 79 | 71 | 63 | 55 | 47 | 39 | 31 | 23 | 15 | 7 |
|     | Generic Slot Type |
|     | 168 |

*FIG. 14A*

| UI | Lanes | | | | | | | | | | | | | | | | | | | | | | | | | | Packet(s) |
|---|---|---|---|---|---|---|---|---|---|---|---|---|---|---|---|---|---|---|---|---|---|---|---|---|---|---|---|
| | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | |
| 1 | 0 | 0 | 376 | 368 | 360 | 352 | 344 | 336 | 328 | 320 | 312 | 304 | 296 | 288 | 280 | 272 | 264 | 256 | 248 | 240 | 232 | 224 | 216 | 208 | 200 | 192 | |
| 2 | 0 | 0 | 377 | 369 | 361 | 353 | 345 | 337 | 329 | 321 | 313 | 305 | 297 | 289 | 281 | 273 | 265 | 257 | 249 | 241 | 233 | 225 | 217 | 209 | 201 | 193 | |
| 3 | 0 | 0 | 378 | 370 | 362 | 354 | 346 | 338 | 330 | 322 | 314 | 306 | 298 | 290 | 282 | 274 | 266 | 258 | 250 | 242 | 234 | 226 | 218 | 210 | 202 | 194 | |
| 4 | 0 | 0 | 379 | 371 | 363 | 355 | 347 | 339 | 331 | 323 | 315 | 307 | 299 | 291 | 283 | 275 | 267 | 259 | 251 | 243 | 235 | 227 | 219 | 211 | 203 | 195 | |
| 5 | 0 | 0 | 380 | 372 | 364 | 356 | 348 | 340 | 332 | 324 | 316 | 308 | 300 | 292 | 284 | 276 | 268 | 260 | 252 | 244 | 236 | 228 | 220 | 212 | 204 | 196 | |
| 6 | 0 | 0 | 381 | 373 | 365 | 357 | 349 | 341 | 333 | 325 | 317 | 309 | 301 | 293 | 285 | 277 | 269 | 261 | 253 | 245 | 237 | 229 | 221 | 213 | 205 | 197 | |
| 7 | 0 | 0 | 382 | 374 | 366 | 358 | 350 | 342 | 334 | 326 | 318 | 310 | 302 | 294 | 286 | 278 | 270 | 262 | 254 | 246 | 238 | 230 | 222 | 214 | 206 | 198 | |
| 8 | 0 | NA | 383 | 375 | 367 | 359 | 351 | 343 | 335 | 327 | 319 | 311 | 303 | 295 | 287 | 279 | 271 | 263 | 255 | 247 | 239 | 231 | 223 | 215 | 207 | 199 | |

| UI | Lanes | | | | | | | | | | | | | | | | | | | | | | | | Packet(s) |
|---|---|---|---|---|---|---|---|---|---|---|---|---|---|---|---|---|---|---|---|---|---|---|---|---|---|
| | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| 1 | 184 | 176 | 168 | 160 | 152 | 144 | 136 | 128 | 120 | 112 | 104 | 96 | 88 | 80 | 72 | 64 | 56 | 48 | 40 | 32 | 24 | 16 | 8 | 0 | |
| 2 | 185 | 177 | 169 | 161 | 153 | 145 | 137 | 129 | 121 | 113 | 105 | 97 | 89 | 81 | 73 | 65 | 57 | 49 | 41 | 33 | 25 | 17 | 9 | 0 | |
| 3 | 186 | 178 | 170 | 162 | 154 | 146 | 138 | 130 | 122 | 114 | 106 | 98 | 90 | 82 | 74 | 66 | 58 | 50 | 42 | 34 | 26 | 18 | 10 | 1 | |
| 4 | 187 | 179 | 171 | 163 | 155 | 147 | 139 | 131 | 123 | 115 | 107 | 99 | 91 | 83 | 75 | 67 | 59 | 51 | 43 | 35 | 27 | 19 | 11 | 2 | |
| 5 | 188 | 180 | 172 | 164 | 156 | 148 | 140 | 132 | 124 | 116 | 108 | 100 | 92 | 84 | 76 | 68 | 60 | 52 | 44 | 36 | 28 | 20 | 12 | 3 | |
| 6 | 189 | 181 | 173 | 165 | 157 | 149 | 141 | 133 | 125 | 117 | 109 | 101 | 93 | 85 | 77 | 69 | 61 | 53 | 45 | 37 | 29 | 21 | 13 | 4 | |
| 7 | 190 | 182 | 174 | 166 | 158 | 150 | 142 | 134 | 126 | 118 | 110 | 102 | 94 | 86 | 78 | 70 | 62 | 54 | 46 | 38 | 30 | 22 | 14 | 5 | |
| 8 | 191 | 183 | 175 | 167 | 159 | 151 | 143 | 135 | 127 | 119 | 111 | 103 | 95 | 87 | 79 | 71 | 63 | 55 | 47 | 39 | 31 | 23 | 15 | 7 | |

| UI | Lanes | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 |
|---|---|---|---|---|---|---|---|---|---|---|---|---|---|---|---|---|---|---|---|---|---|---|---|---|---|---|---|
| 1 | | 0 | 0 | 376 | 368 | 360 | 352 | 344 | 336 | 328 | 320 | 312 | 304 | 296 | 288 | 280 | 272 | 264 | 256 | 248 | 240 | 232 | 224 | 216 | 208 | 200 | 192 |
| 2 | | 0 | 0 | 377 | 369 | 361 | 353 | 345 | 337 | 329 | 321 | 313 | 305 | 297 | 289 | 281 | 273 | 265 | 257 | 249 | 241 | 233 | 225 | 217 | 209 | 201 | 193 |
| 3 | | 0 | 0 | 378 | 370 | 362 | 354 | 346 | 338 | 330 | 322 | 314 | 306 | 298 | 290 | 282 | 274 | 266 | 258 | 250 | 242 | 234 | 226 | 218 | 210 | 202 | 194 |
| 4 | | 0 | 0 | 379 | 371 | 363 | 355 | 347 | 339 | 331 | 323 | 315 | 307 | 299 | 291 | 283 | 275 | 267 | 259 | 251 | 243 | 235 | 227 | 219 | 211 | 203 | 195 |
| 5 | | 0 | 0 | 380 | 372 | 364 | 356 | 348 | 340 | 332 | 324 | 316 | 308 | 300 | 292 | 284 | 276 | 268 | 260 | 252 | 244 | 236 | 228 | 220 | 212 | 204 | 196 |
| 6 | | 0 | 0 | 381 | 373 | 365 | 357 | 349 | 341 | 333 | 325 | 317 | 309 | 301 | 293 | 285 | 277 | 269 | 261 | 253 | 245 | 237 | 229 | 221 | 213 | 205 | 197 |
| 7 | | 0 | 0 | 382 | 374 | 366 | 358 | 350 | 342 | 334 | 326 | 318 | 310 | 302 | 294 | 286 | 278 | 270 | 262 | 254 | 246 | 238 | 230 | 222 | 214 | 206 | 198 |
| 8 | | 0 | 0 | 383 | 375 | 367 | 359 | 351 | 343 | 335 | 327 | 319 | 311 | 303 | 295 | 287 | 279 | 271 | 263 | 255 | 247 | 239 | 231 | 223 | 215 | 207 | 199 |
| | | NA | LLP1 | LLP2 | LLP2 | LLP2 | LLP1 | LLP1 | LLP2 | LLP2 | LLP0 | LLP0 | LLP2 | LLP2 | LLP0 | LLP0 | LLP2 | LLP2 | LLP0 | LLP0 | LLP1 | LLP1 | LLP0 | LLP0 | LLP1 | LLP1 | |

| UI | Lanes | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1 | | 184 | 176 | 168 | 160 | 152 | 144 | 136 | 128 | 120 | 112 | 104 | 96 | 88 | 80 | 72 | 64 | 56 | 48 | 40 | 32 | 24 | 16 | 8 | 0 |
| 2 | | 185 | 177 | 169 | 161 | 153 | 145 | 137 | 129 | 121 | 113 | 105 | 97 | 89 | 81 | 73 | 65 | 57 | 49 | 41 | 33 | 25 | 17 | 9 | 0 |
| 3 | | 186 | 178 | 170 | 162 | 154 | 146 | 138 | 130 | 122 | 114 | 106 | 98 | 90 | 82 | 74 | 66 | 58 | 50 | 42 | 34 | 26 | 18 | 10 | 1 |
| 4 | | 187 | 179 | 171 | 163 | 155 | 147 | 139 | 131 | 123 | 115 | 107 | 99 | 91 | 83 | 75 | 67 | 59 | 51 | 43 | 35 | 27 | 19 | 11 | 2 |
| 5 | | 188 | 180 | 172 | 164 | 156 | 148 | 140 | 132 | 124 | 116 | 108 | 100 | 92 | 84 | 76 | 68 | 60 | 52 | 44 | 36 | 28 | 20 | 12 | 3 |
| 6 | | 189 | 181 | 173 | 165 | 157 | 149 | 141 | 133 | 125 | 117 | 109 | 101 | 93 | 85 | 77 | 69 | 61 | 53 | 45 | 37 | 29 | 21 | 13 | 4 |
| 7 | | 190 | 182 | 174 | 166 | 158 | 150 | 142 | 134 | 126 | 118 | 110 | 102 | 94 | 86 | 78 | 70 | 62 | 54 | 46 | 38 | 30 | 22 | 14 | 5 |
| 8 | | 191 | 183 | 175 | 167 | 159 | 151 | 143 | 135 | 127 | 119 | 111 | 103 | 95 | 87 | 79 | 71 | 63 | 55 | 47 | 39 | 31 | 23 | 15 | 6 |
| | | LLP1 | LLP1 | LLP1 | LLP1 | LLP1 | LLP1 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | 7 |

Fig. 29A

MULTICHIP PACKAGE LINK

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates increases, corresponding demand is placed on the capabilities of existing interconnect architectures.

BRIEF DESCRIPTION OF THE DRAWINGS

FIGS. 14A-14C are example bit mappings of data on lanes of an example MCPL.

FIGS. 29A and 29B are an example of a crosstalk pattern.

Like reference numbers and designations in the various drawings indicate like elements.

DETAILED DESCRIPTION

Figure 1:
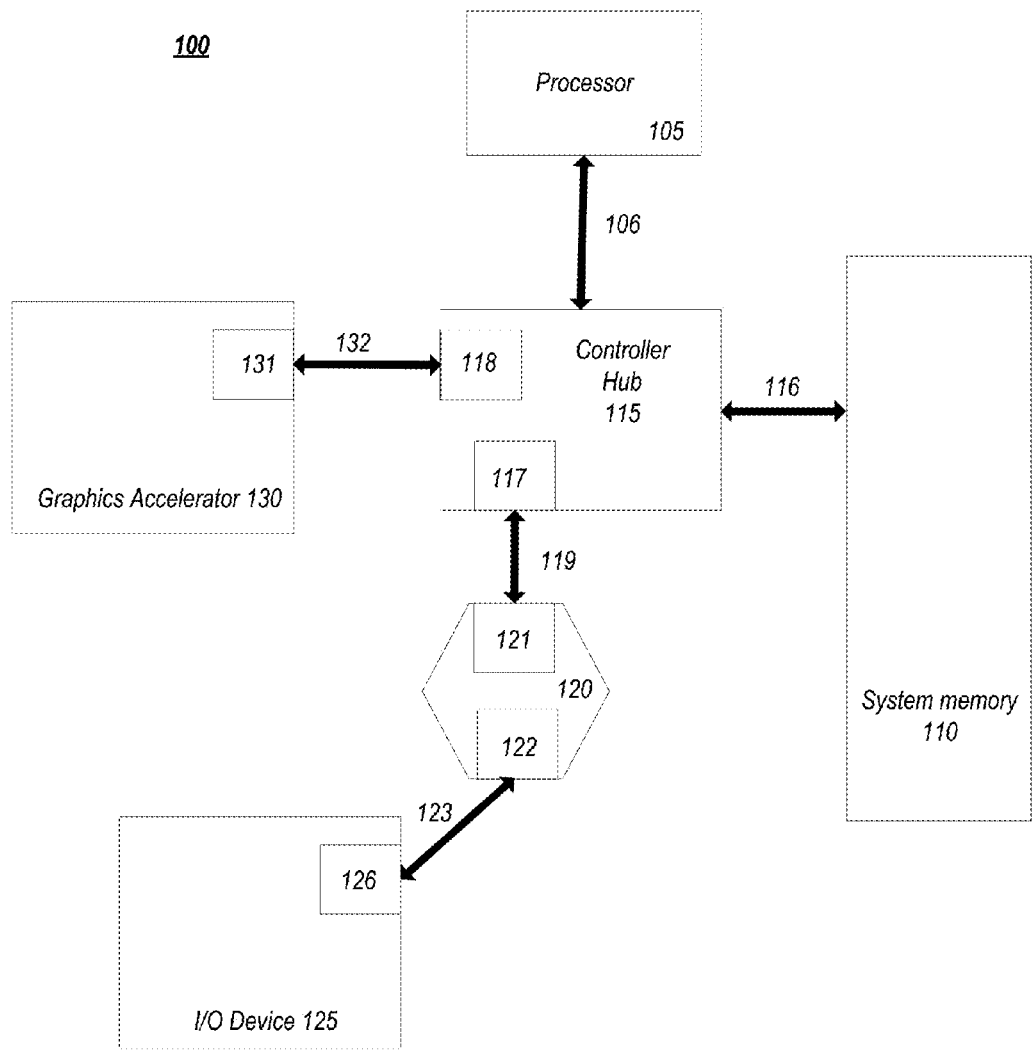
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. They may also be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide the highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices.

Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
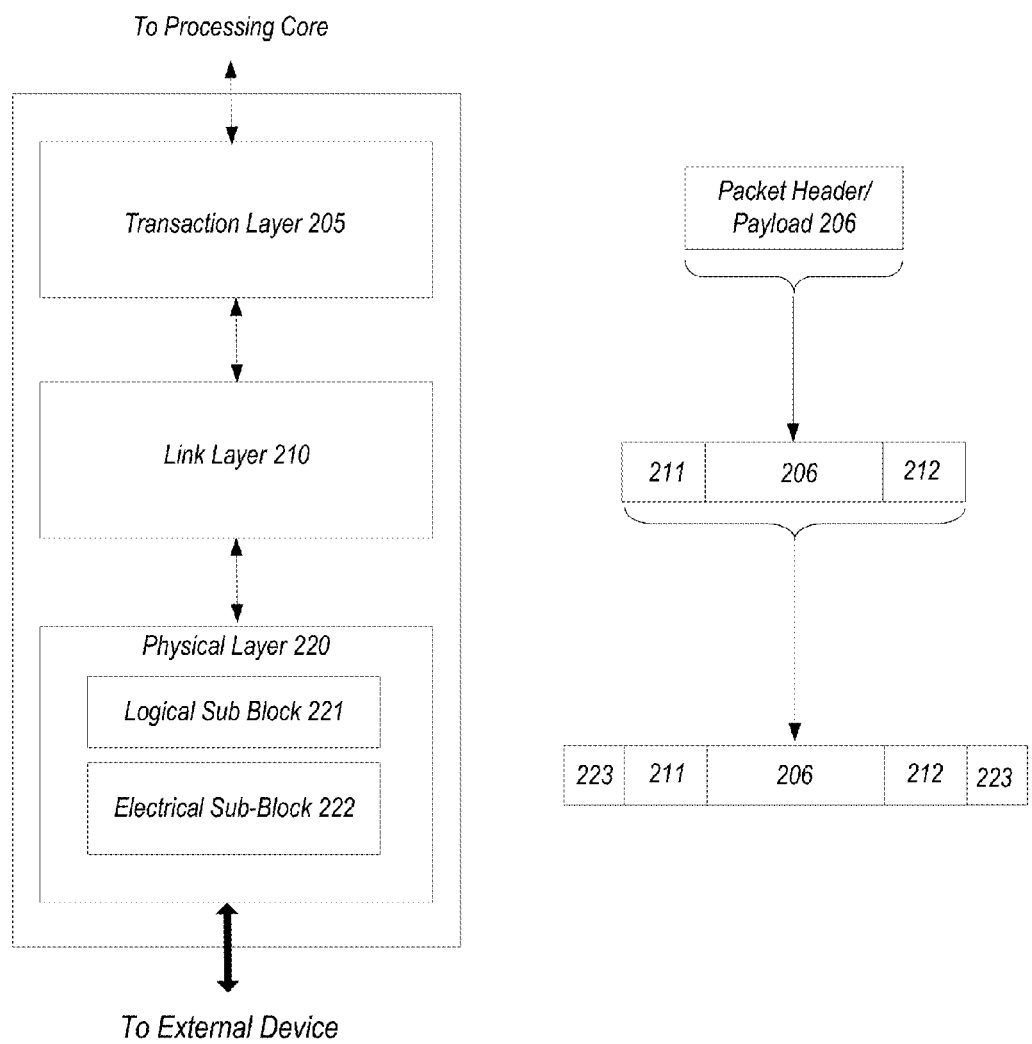
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
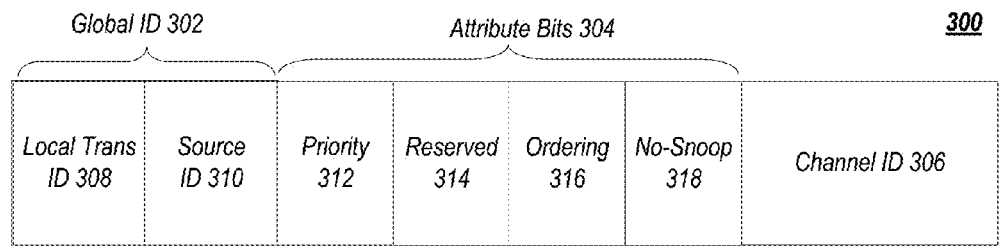
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
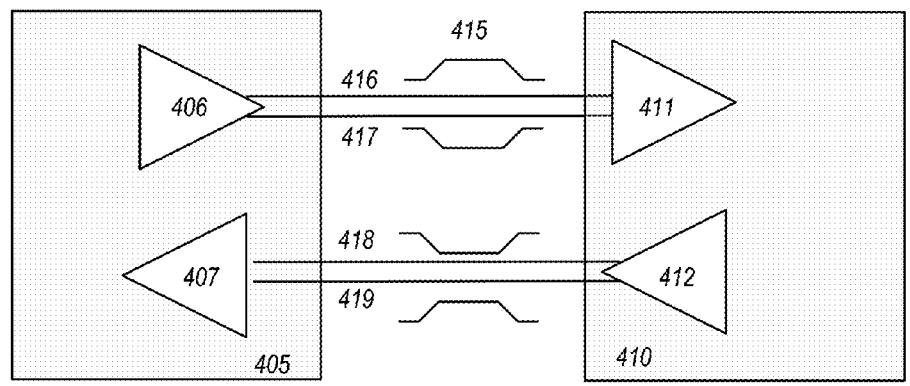
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
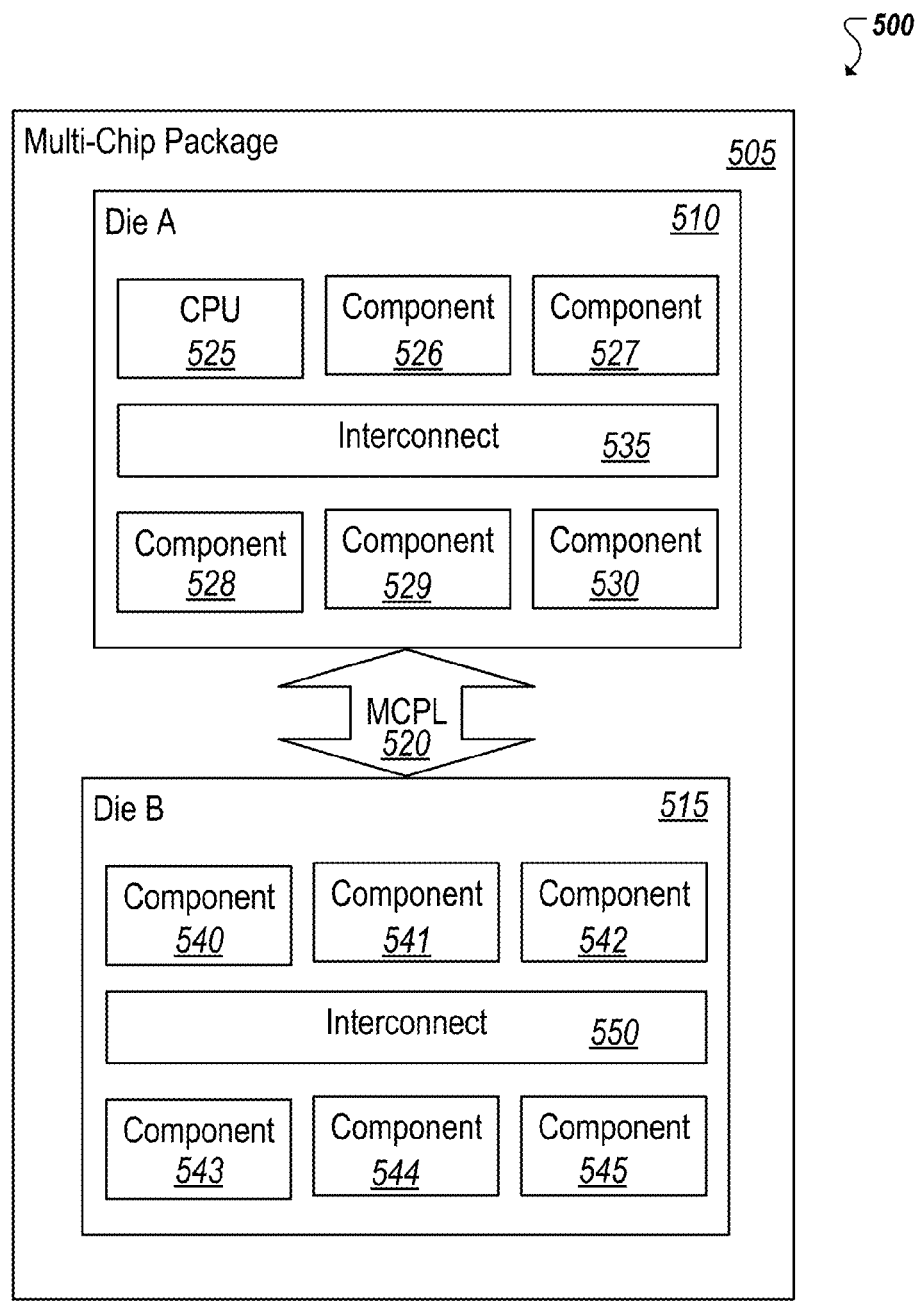
FIG. 5 illustrates an embodiment of a multichip package.

FIG. 5 is a simplified block diagram 500 illustrating an example multi-chip package 505 that includes two or more chips, or dies, (e.g., 510, 515) communicatively connected using an example multi-chip package link (MCPL) 520. While FIG. 5 illustrates an example of two (or more) dies that are interconnected using an example MCPL 520, it should be appreciated that the principles and features described herein regarding implementations of an MCPL can be applied to any interconnect or link connecting a die (e.g., 510) and other components, including connecting two or more dies (e.g., 510, 515), connecting a die (or chip) to another component off-die, connecting a die to another device or die off-package (e.g., 505), connecting die to a BGA package, implementation of a Patch on Interposer (POINT), among potentially other examples.

Generally, a multichip package (e.g., 505) can be an electronic package where multiple integrated circuits (ICs), semiconductor dies or other discrete components (e.g., 510, 515) are packaged onto a unifying substrate (e.g., silicon or other semiconductor substrate), facilitating the combined components' use as a single component (e.g., as though a larger IC). In some instances, the larger components (e.g., dies 510, 515) can themselves be IC systems, such as systems on chip (SoC), multiprocessor chips, or other components that include multiple components (e.g., 525-530 and 540-545) on the device, for instance, on a single die (e.g., 510, 515). Multichip packages 505 can provide flexibility for building complex and varied systems from potentially multiple discrete components and systems. For instance, each of dies 510, 515 may be manufactured or otherwise provided by two different entities, with the silicon substrate of the package 505 provided by yet a third entity, among many other examples. Further, dies and other components within a multichip package 505 can themselves include interconnect or other communication fabrics (e.g., 535, 550) providing the infrastructure for communication between components (e.g., 525-530 and 540-545) within the device (e.g., 510, 515 respectively). The various components and interconnects (e.g., 535, 550) may potentially support or use multiple different protocols. Further, communication between dies (e.g., 510, 515) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include a physical electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 6:
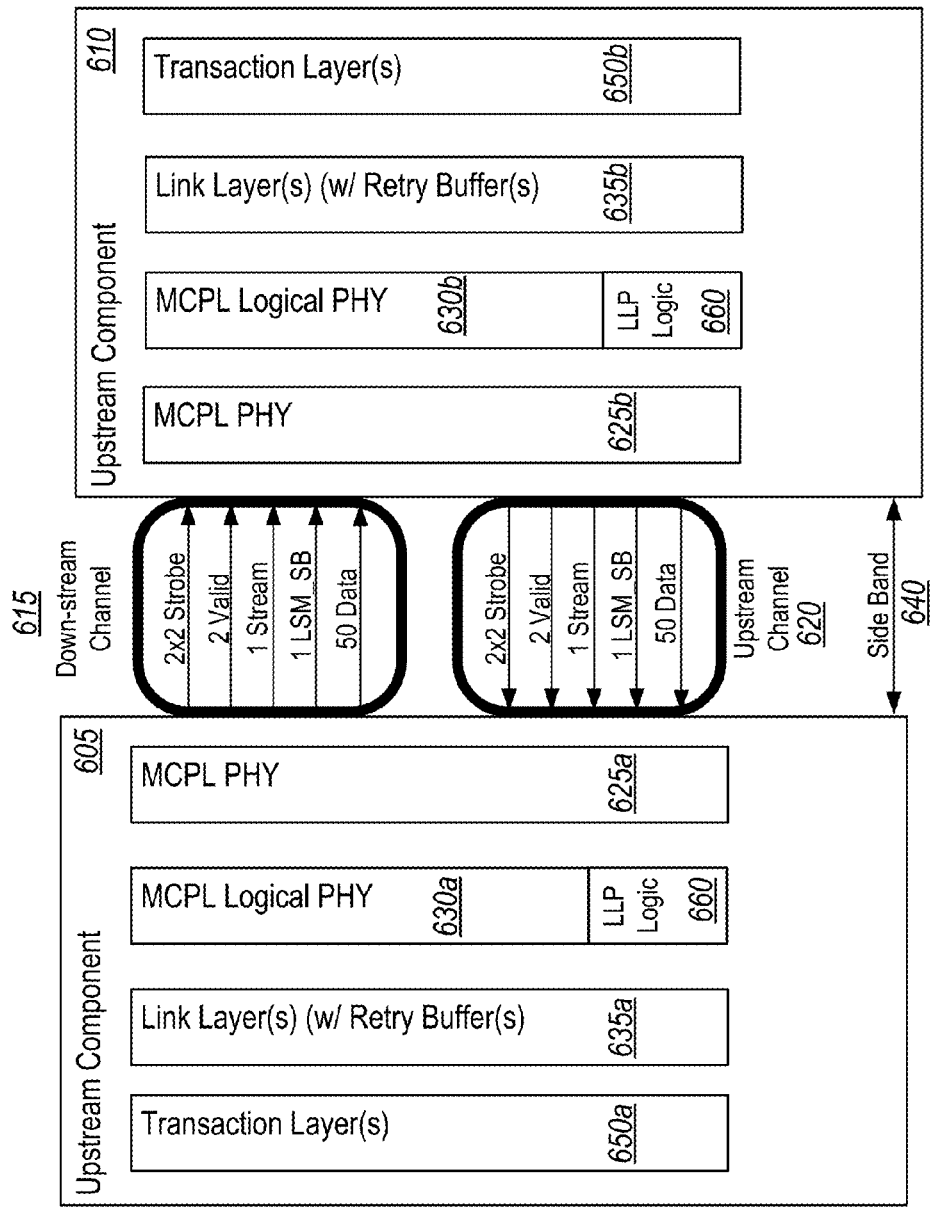
FIG. 6 is a simplified block diagram of a multichip package link (MCPL).

Turning to FIG. 6, a simplified block diagram 600 is shown representing at least a portion of a system including an example implementation of a multichip package link (MCPL). An MCPL can be implemented using physical electrical connections (e.g., wires implemented as lanes) connecting a first device 605 (e.g., a first die including one or more sub-components) with a second device 610 (e.g., a second die including one or more other sub-components). In the particular example shown in the high-level representation of diagram 600, all signals (in channels 615, 620) can be unidirectional and lanes can be provided for the data signals to have both an upstream and downstream data transfer. While the block diagram 600 of FIG. 6, refers to the first component 605 as the upstream component and the second component 610 as the downstream components, and physical lanes of the MCPL used in sending data as a downstream channel 615 and lanes used for receiving data (from component 610) as an upstream channel 620, it should be appreciated that the MCPL between devices 605, 610 can be used by each device to both send and receive data between the devices.

In one example implementation, an MCPL can provide a physical layer (PHY) including the electrical MCPL PHY 625a,b (or, collectively, 625) and executable logic implementing MCPL logical PHY 630a,b (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635a, 635b), and protocol multiplexing between potentially multiple, different protocols used for communications over the MCPL.

In one example implementation, physical PHY 625 can include, for each channel (e.g., 615, 620) a set of data lanes, over which in-band data can be sent. In this particular example, 50 data lanes are provided in each of the upstream and downstream channels 615, 620, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MCPL connecting devices 605, 610, among other examples.

As noted above, multiple protocols can be supported using an implementation of MCPL. Indeed, multiple, independent transaction layers 650a, 650b can be provided at each device 605, 610. For instance, each device 605, 610 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, link training, error detection, skew detection, de-skewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MCPL. In some implementations, logical PHY 630 can include link layer packet (LLP) generation logic 660 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 660 can assist in the negotiation and performance of link layer state transitioning, power management, loopback, disable, re-centering, scrambling, among other link layer features between the link layers 635a, 635b of devices 605, 610 respectively.

Figure 7:
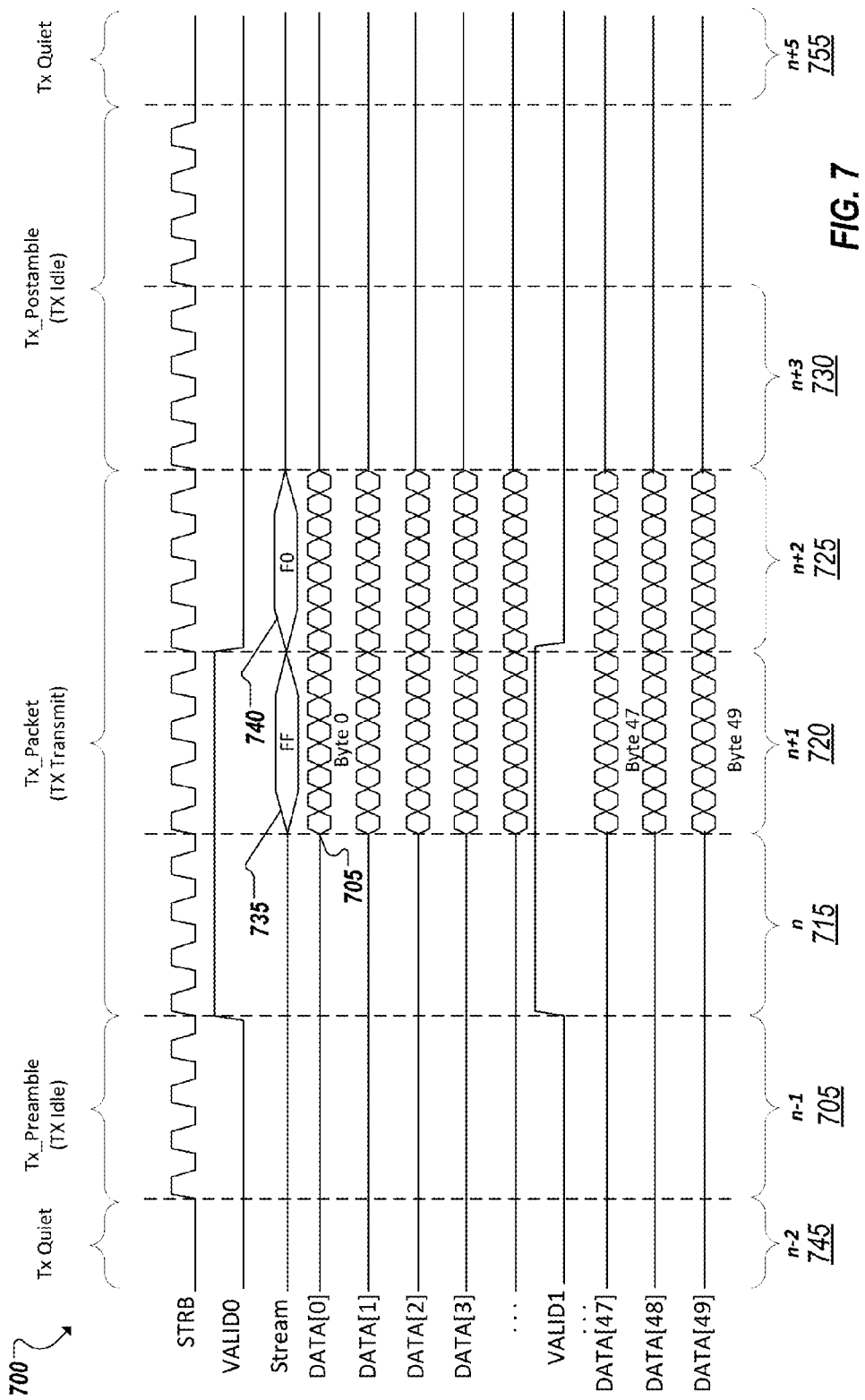
FIG. 7 is a representation of example signaling on an example MCPL.

Turning to FIG. 7, a diagram 700 is shown representing example signaling using a set of lanes (e.g., 615, 620) in a particular channel of an example MCPL. In the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8UI. A byte time period 710 can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 710. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data. Continuing with the example of FIG. 7, the valid signal remains asserted (on VALID1 and VALID2) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA[0-49] should be disregarded during time period window n+3 (730).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical. The VALID and STREAM lanes can also be different between the clusters allowing them to be operated as independent ports in a fabric or as a reduced width port for power saving.

As introduced above, data on stream lane STREAM can be used to indicate to the receiving logical PHY what protocol is to apply to corresponding data being sent on data lanes data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA[0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA[0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 7, at time period window n−2 (745), the MCPL is in a quiet or idle state and the strobe is disabled to save power. The MCPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MCPL may re-enter a low power or idle state (e.g., an L1 state) following the detection of idle conditions on the valid lanes, data lanes, and/or other lanes of the MCPL channel. For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

Figure 8:
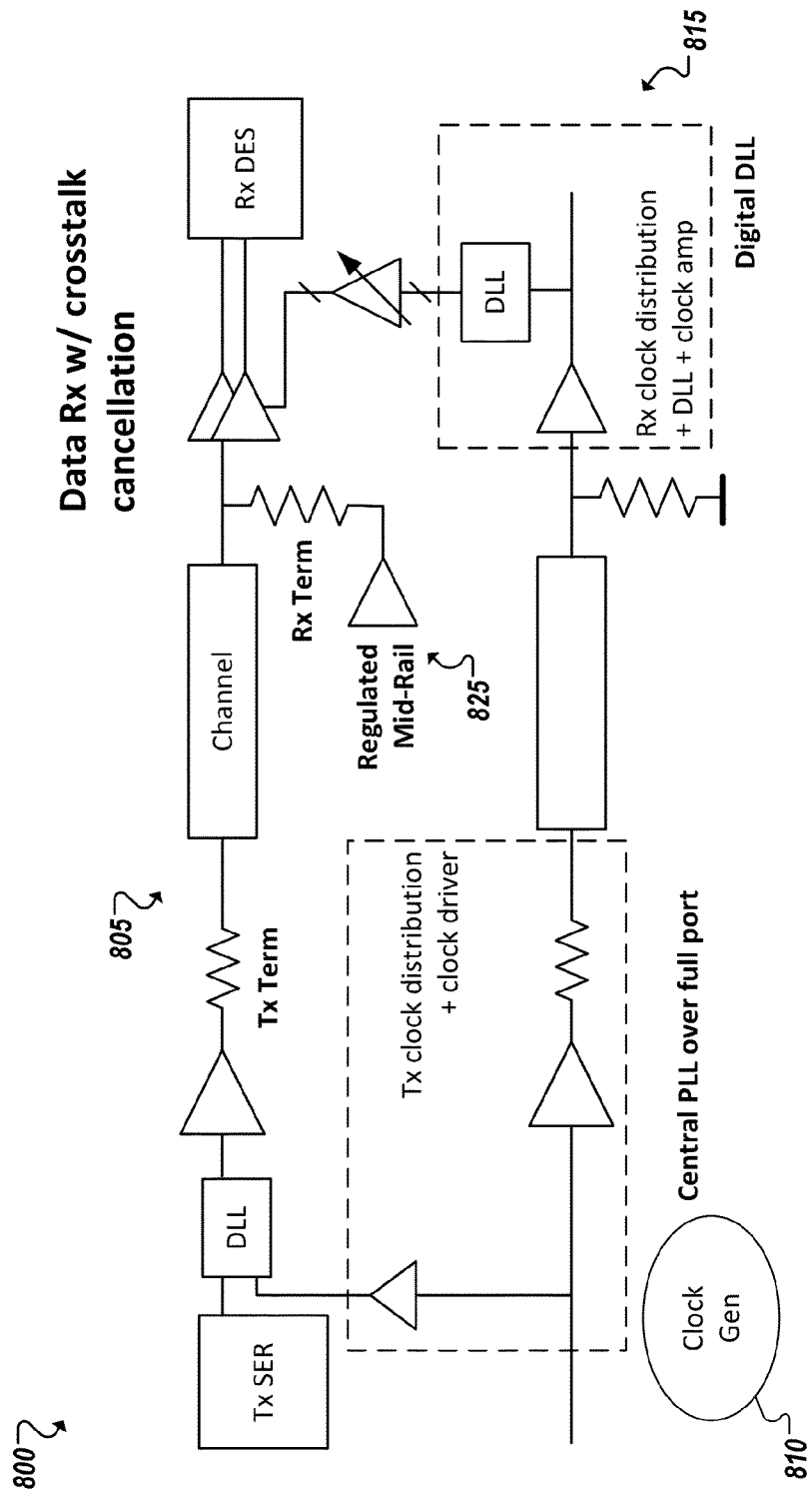
FIG. 8 is a simplified block diagram illustrating a data lane in an example MCPL.

FIG. 8 illustrates a portion of a simplified block diagram 800 representing a portion of an example MCPL. The diagram 800 of FIG. 8 includes a representation of an example lane 805 (e.g., a data lane, valid lane, or stream lane) and clock generation logic 810. As shown in the example of FIG. 8, in some implementations, clock generation logic 810 can be implemented as a clock tree to distribute the generated clock signal to each block implementing each lane of the example MCPL, such as data lane 805. Further, a clock recovery circuit 815 can be provided. In some implementations, rather than providing a separate clock recovery circuit for each lane in which the clock signal is distributed, as is customary in at least some traditional interconnect I/O architectures, a single clock recovery circuit can be provided for a cluster of a plurality of lanes. Indeed, as applied to the example configurations in FIGS. 6 and 7, a separate strobe lane and accompanying clock recovery circuit can be provided for each cluster of twenty-five data lanes.

Continuing with the example of FIG. 8, in some implementations, at least the data lanes, stream lanes, and valid lanes can be terminated, mid-rail, to a regulated voltage greater than zero (ground). In some implementations, a mid-rail voltage can be regulated to Vcc/2. In some implementations, a single voltage regulator 825 can be provided per cluster of lanes. For instance, when applied to the examples of FIGS. 6 and 7, a first voltage regulator can be provided for a first cluster of twenty-five data lanes and a second voltage regulator can be provided for the remaining cluster of twenty-five data lanes, among other potential examples. In some instances, an example voltage regulator 825 can be implemented as a linear regulator, a switched capacitor circuit, among other examples. In some implementations, the linear regulator can be provided with analog feedback loop or digital feedback loop, among other examples.

In some implementations, crosstalk cancellation circuitry can also be provided for an example MCPL. In some instances, the compact nature of the long MCPL wires can introduce crosstalk interference between lanes. Crosstalk cancellation logic can be implemented to address these and other issues. For instance, in one example illustrated in FIGS. 9-10, crosstalk can be reduced significantly with an example low power active circuit, such as illustrated in diagrams 900 and 1000. For instance, in the example of FIG. 9, a weighted high-pass filtered "aggressor" signal can be added to the "victim" signal (i.e., the signal suffering cross-talk interference from the aggressor). Each signal can be considered a victim of crosstalk from each other signal in the link, and can, itself, be the aggressor to the other signal insofar it is the source of crosstalk interference. Such a signal can be generated and reduce crosstalk on the victim lane by more than 50%, owing to the derivative nature of crosstalk on the link. The low pass filtered aggressor signal, in the example of FIG. 9, can be generated through a high-pass RC filter (e.g., implemented through C and R1) that produces the filtered signal to be added using a summing circuit 905 (e.g., RX sense-amp).

Figure 9:
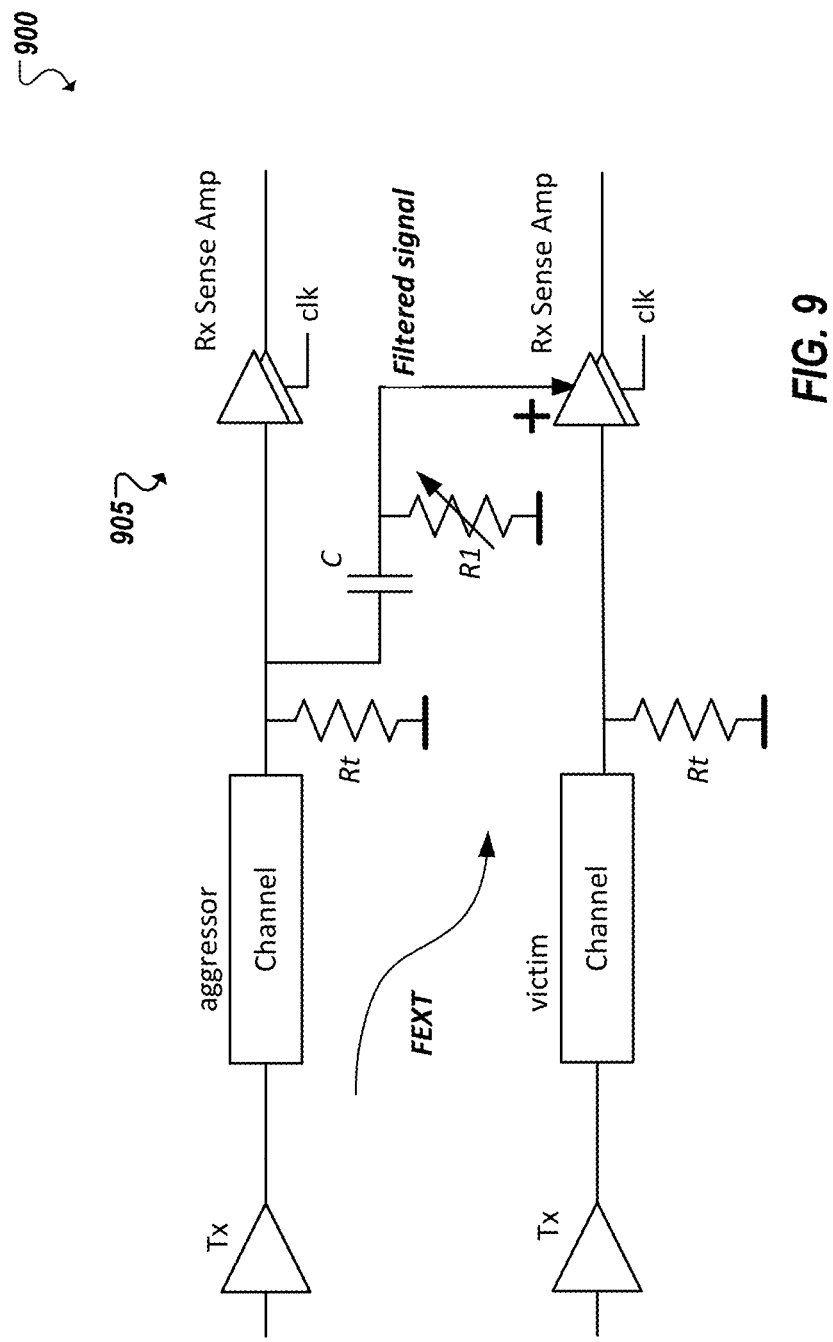
FIG. 9 is a simplified block diagram illustrating example crosstalk cancellation techniques in an embodiment of an MCPL.
Figure 10:
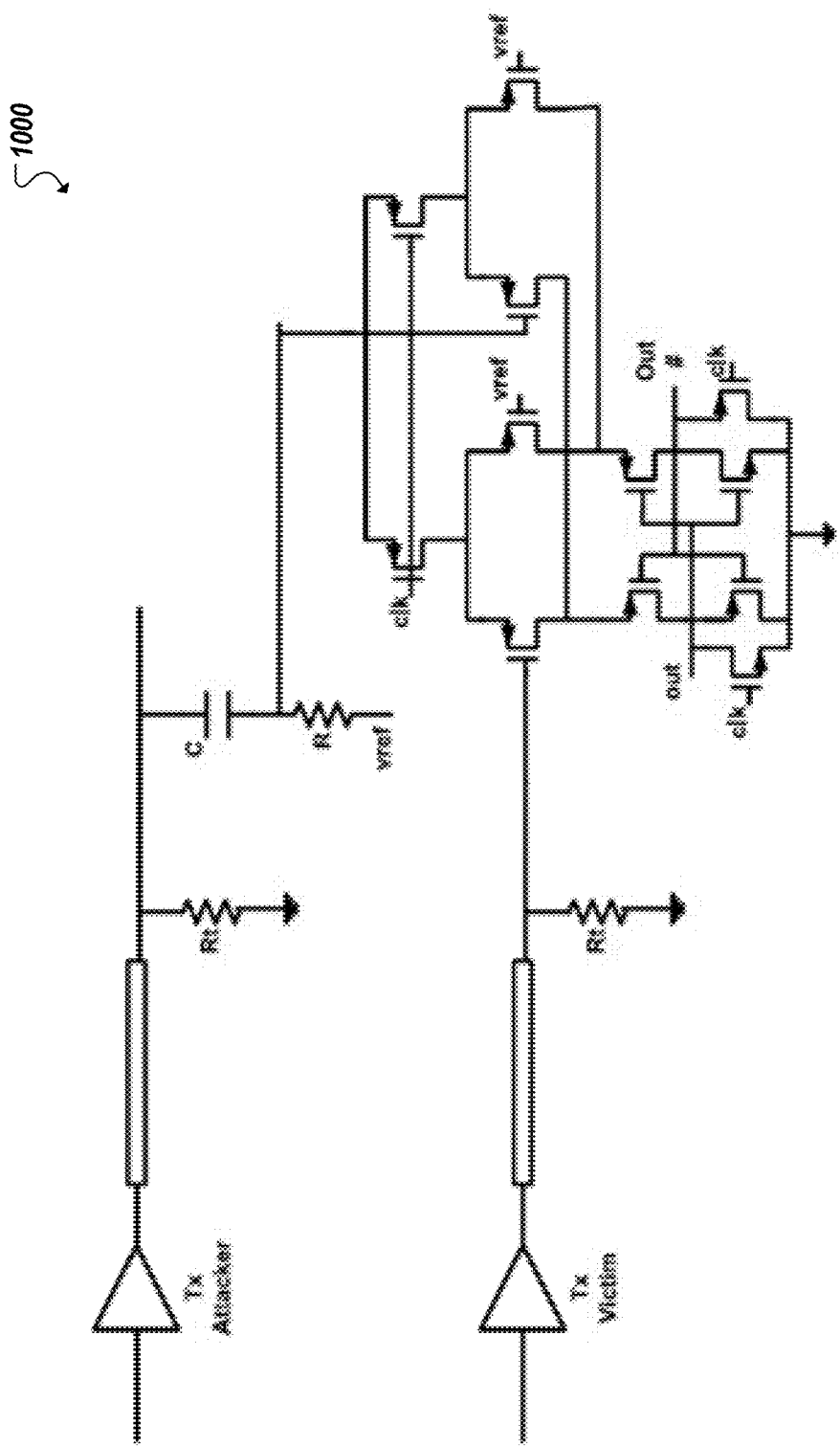
FIG. 10 is a simplified circuit diagram illustrating example crosstalk cancellation components in an embodiment of an MCPL.

Implementations similar to that described in the example of FIG. 9 can be particularly convenient solutions for an application such as MCLP, as implementation of the circuit can be realized with relatively low overhead, as illustrated in the diagram of FIG. 10 illustrating an example transistor-level schematic of the circuit shown and described in the example of FIG. 9. It should be appreciated that the representations in FIGS. 9 and 10 are simplified representations, and an actual implementation would include multiple copies of the circuits illustrated in FIGS. 9 and 10 to accommodate the network of crosstalk interference among and between the lanes of a link. As an example, in a three lane link (e.g., Lanes 0-2) circuitry similar to that described in the examples of FIGS. 9 and 10 could be provided from Lane 0 to Lane 1, from Lane 0 to Lane 2, from Lane 1 to Lane 0, from Lane 1 to Lane 2, from Lane 2 to Lane 0, from Lane 2 to Lane 1, etc. based on the geometry and the layout of the lanes, among other examples Additional features can be implemented at the physical PHY level of an example MCPL. For instance, receiver offset can introduce significant error and limit I/O voltage margin in some instances. Circuit redundancy can be used to improve receiver sensitivity. In some implementations, circuit redundancy can be optimized to address the standard deviation offset of data samplers used in the MCPL. For instance, an example data sampler can be provided that is designed to a three (3) standard deviation offset specification. In the examples of FIGS. 6 and 7, for instance, were two (2) data samplers to be used for each receiver (e.g., for each lane), one hundred (100) samplers would be used for a fifty (50) lane MCPL. In this example, the probability that one of the receiver (RX) lanes fails the three standard deviation offset specification is 24%. A chip reference voltage generator can be provided to set the offset upper-bound and move to the next data sampler on the receiver if another one of the other data samplers is found to be exceeding the bound. However, were four (4) data samplers to be used per receiver (i.e., instead of two in this example), the receiver will only fail if three out of four samplers fail. For a fifty-lane MCPL, as in the examples of FIGS. 6 and 7, adding this additional circuit redundancy can dramatically reduce the failure rate from 24% to less than 0.01%.

In still other examples, at very high data rates, per bit duty cycle correction (DCC) and deskew can be used to augment baseline per cluster DCC and deskew to improve link margin. Instead of correction for all cases, as in traditional solutions, in some implementations a low power digital implementation can be utilized that senses and corrects the outliers where the I/O lane would fail. For instance, a global tuning of the lanes can be performed to identify problem lanes within the cluster. These problem lanes can then be targeted for per-lane tuning to achieve the high data rates supported by the MCPL.

Additional features can also be optionally implemented in some examples of a MCPL to enhance the performance characteristics of the physical link. For instance, line coding can be provided. While mid-rail terminations, such as described above, can allow for DC data bus inversion (DBI) to be omitted, AC DBI can still be used to reduce the dynamic power. More complicated coding can also be used to eliminate the worst case difference of 1's and 0's to reduce, for instance, the drive requirement of mid-rail regulator, as well as limit I/O switching noise, among other example benefits. Further, transmitter equalization can also be optionally implemented. For instance, at very high data rates, insertion loss can be a significant for an in-package channel. A two-tap weight transmitter equalization (e.g., performed during an initial power-up sequence) can, in some cases, be sufficient to mitigate some of these issues, among others.

Figure 11:
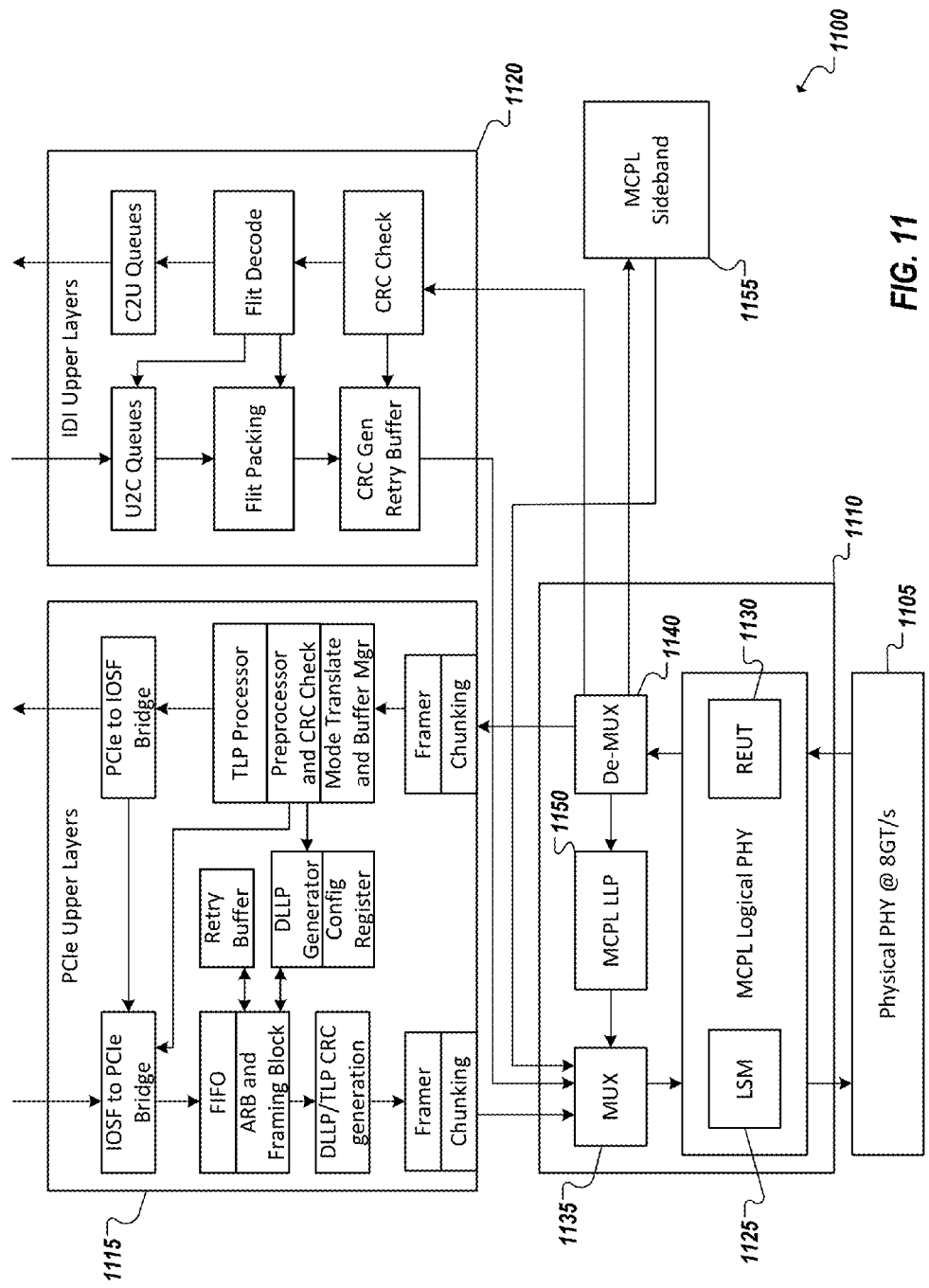
FIG. 11 is a simplified block diagram of an MCPL.

Turning to FIG. 11, a simplified block diagram 1100 is shown illustrating an example logical PHY of an example MCPL. A physical PHY 1105 can connect to a die that includes logical PHY 1110 and additional logic supporting a link layer of the MCPL. The die, in this example, can further include logic to support multiple different protocols on the MCPL. For instance, in the example of FIG. 11, PCIe logic 1115 can be provided as well as IDI logic 1120, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 1110 can include link state machine management logic 1125 for negotiating link state transitions in connection with requests of upper layer logic of the die (e.g., received over PCIe or IDI). Logical PHY 1110 can further include link testing and debug logic (e.g., 1130) ion some implementations. As noted above, an example MCPL can support control signals that are sent between dies over the MCPL to facilitate protocol agnostic, high performance, and power efficiency features (among other example features) of the MCPL. For instance, logical PHY 1110 can support the generation and sending, as well as the receiving and processing of valid signals, stream signals, and LSM sideband signals in connection with the sending and receiving of data over dedicated data lanes, such as described in examples above.

In some implementations, multiplexing (e.g., 1135) and demultiplexing (e.g., 1140) logic can be included in, or be otherwise accessible to, logical PHY 1110. For instance, multiplexing logic (e.g., 1135) can be used to identify data (e.g., embodied as packets, messages, etc.) that is to be sent out onto the MCPL. The multiplexing logic 1135 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 1140 can be employed to interpret incoming stream signals to decode the stream signal and identify the protocol that is to apply to data concurrently received with the stream signal on the data lanes. The demultiplexing logic 1140 can then apply (or ensure) protocol-specific link layer handling and cause the data to be handled by the corresponding protocol logic (e.g., PCIe logic 1115 or IDI logic 1120).

Logical PHY 1110 can further include link layer packet logic 1150 that can be used to handle various link control functions, including power management tasks, loopback, disable, re-centering, scrambling, etc. LLP logic 1150 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 1135, 1140) can also be used to generate and interpret the stream signals corresponding to LLP traffic, as well as cause such traffic to be handled by the appropriate die logic (e.g., LLP logic 1150). Likewise, as some implementations of an MCLP can include a dedicated sideband (e.g., sideband 1155 and supporting logic), such as an asynchronous and/or lower frequency sideband channel, among other examples.

Logical PHY logic 1110 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 12:
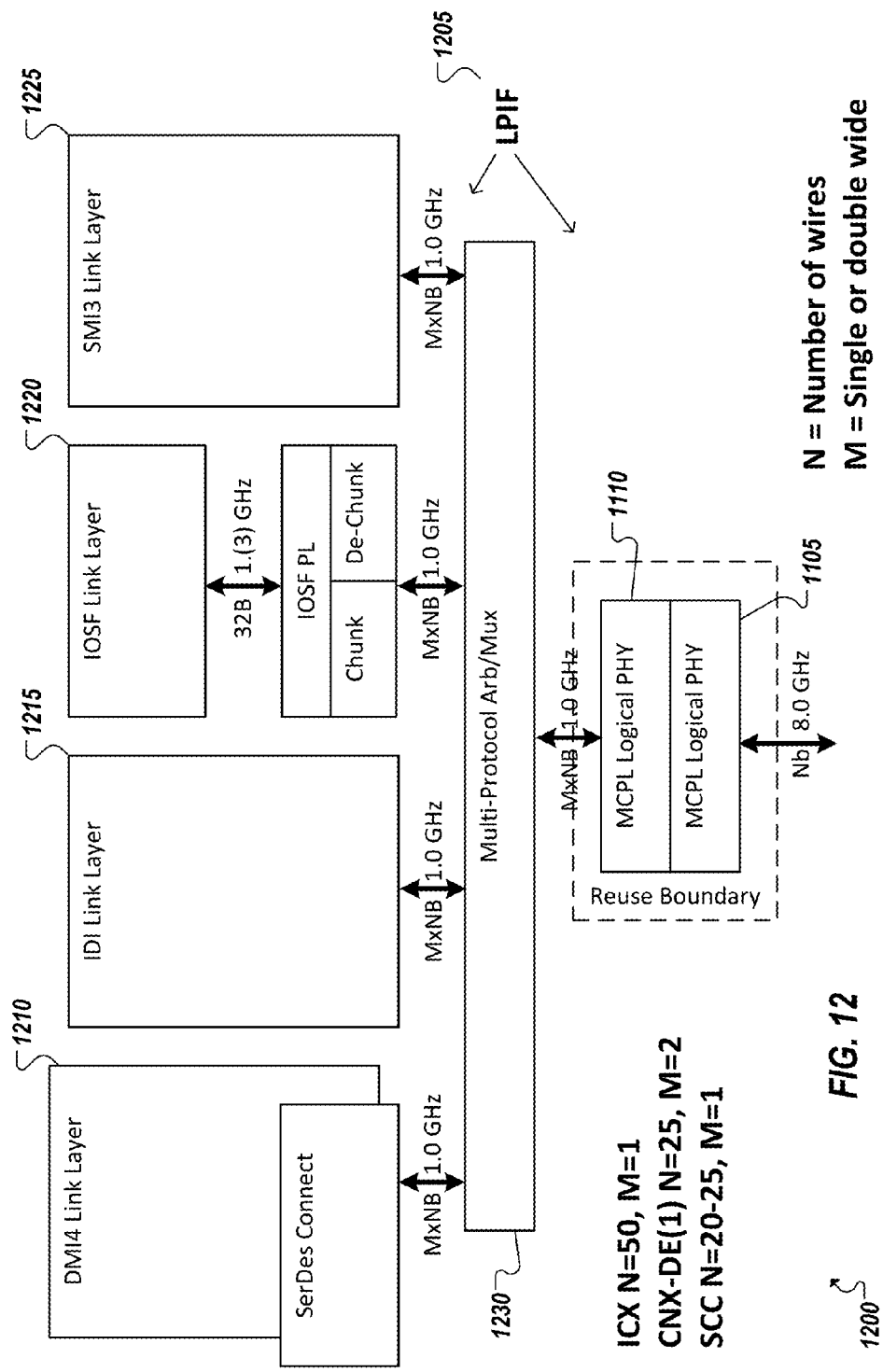
FIG. 12 is a simplified block diagram of an MCPL interfacing with upper layer logic of multiple protocols using a logical PHY interface (LPIF).

Turning to FIG. 12, a simplified block diagram 1200 is shown illustrating another representation of logic used to implement an MCPL. For instance, logical PHY 1110 is provided with a defined logical PHY interface (LPIF) 1205 through which any one of a plurality of different protocols (e.g., PCIe, IDI, QPI, etc.) 1210, 1215, 1220, 1225 and signaling modes (e.g., sideband) can interface with the physical layer of an example MCPL. In some implementations, multiplexing and arbitration logic 1230 can also be provided as a layer separate from the logical PHY 1110. In one example, the LPIF 1205 can be provided as the interface on either side of this MuxArb layer 1230. The logical PHY 1110 can interface with the physical PHY (e.g., the analog front end (AFE) 1105 of the MCPL PHY) through another interface.

The LPIF can abstract the PHY (logical and electrical/analog) from the upper layers (e.g., 1210, 1215, 1220, 1225) such that a completely different PHY can be implemented under LPIF transparent to the upper layers. This can assist in promoting modularity and re-use in design, as the upper layers can stay intact when the underlying signaling technology PHY is updated, among other examples. Further, the LPIF can define a number of signals enabling multiplexing/demultiplexing, LSM management, error detection and handling, and other functionality of the logical PHY. For instance, Table 1 summarizes at least a portion of signals that can be defined for an example LPIF:

TABLE 1

| Signal Name | Description |
| --- | --- |
| Rst | Reset |
| Lclk | Link Clock - 8UI of PHY clock |
| Pl_trdy | Physical Layer is ready to accept data, data is accepted by Physical layer when Pl_trdy and Lp_valid are both asserted. |
| Pl_data[N-1:0][7:0] | Physical Layer-to-Link Layer data, where N equals the number of lanes. |
| Pl_valid | Physical Layer-to-Link Layer signal indicating data valid |
| Pl_Stream[7:0] | Physical Layer-to-Link Layer signal indicating the stream ID received with received data |
| Pl_error | Physical layer detected an error (e.g., framing or training) |
| Pl_AlignReq | Physical Layer request to Link Layer to align packets at LPIF width boundary |
| Pl_in_L0 | Indicates that link state machine (LSM) is in L0 |
| Pl_in_retrain | Indicates that LSM is in Retrain/Recovery |
| Pl_rejectL1 | Indicates that the PHY layer has rejected entry into L1. |
| Pl_in_L12 | Indicates that LSM is in L1 or L2. |
| Pl_LSM (3:0) | Current LSM state information |
| Lp_data[N-1:0][7:0] | Link Layer-to-Physical Layer Data, where N equals number of lanes. |
| Lp_Stream[7:0] | Link Layer-to-Physical Layer signal indicating the stream ID to use with data |
| Lp_AlignAck | Link Layer to Physical layer indicates that the packets are aligned LPIF width boundary |
| Lp_valid | Link Layer-to-Physical Layer signal indicating data valid |
| Lp_enterL1 | Link Layer Request to Physical Layer to enter L1 |
| Lp_enterL2 | Link Layer Request to Physical Layer to enter L2 |
| Lp_Retrain | Link Layer Request to Physical Layer to Retrain the PHY |
| Lp_exitL12 | Link Layer Request to Physical Layer to exit L1, L2 |
| Lp_Disable | Link Layer Request to Physical Layer to disable PHY |

Figure 13:
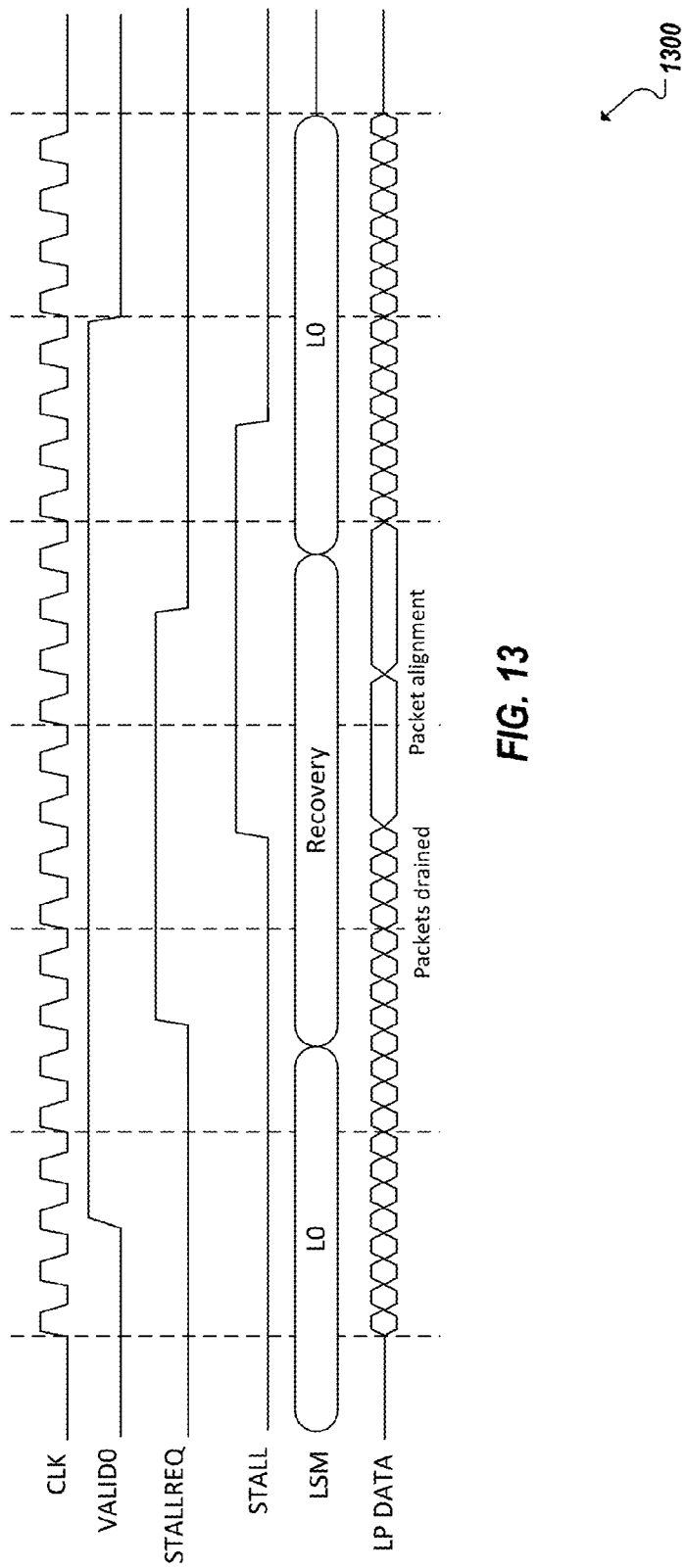
FIG. 13 is a representation of example signaling on an example MCPL in connection with a recovery of a link.

As noted in Table 1, in some implementations, an alignment mechanism can be provided through an AlignReq/AlignAck handshake. For example, when the physical layer enters recovery, some protocols may lose packet framing. Alignment of the packets can be corrected, for instance, to guarantee correct framing identification by the link layer. Additionally, as shown in FIG. 13, the physical layer can assert a StallReq signal when it enters recovery, such that the link layer asserts a Stall signal when a new aligned packet is ready to be transferred. The physical layer logic can sample both Stall and Valid to determine if the packet is aligned. For instance, the physical layer can continue to drive trdy to drain the link layer packets until Stall and Valid are sampled asserted, among other potential implementations, including other alternative implementations using Valid to assist in packet alignment.

Various fault tolerances can be defined for signals on the MCPL. For instance, fault tolerances can be defined for valid, stream, LSM sideband, low frequency side band, link layer packets, and other types of signals. Fault tolerances for packets, messages, and other data sent over the dedicated data lanes of the MCPL can be based on the particular protocol governing the data. In some implementations, error detection and handling mechanisms can be provided, such as cyclic redundancy check (CRC), retry buffers, among other potential examples. As examples, for PCIe packets sent over the MCPL, 32-bit CRC can be utilized for PCIe transaction layer packets (TLPs) (with guaranteed delivery (e.g., through a replay mechanism)) and 16-bit CRC can be utilized for PCIe link layer packets (which may be architected to be lossy (e.g., where replay is not applied)). Further, for PCIe framing tokens, a particular hamming distance (e.g., hamming distance of four (4)) can be defined for the token identifier; parity and 4-bit CRC can also be utilized, among other examples. For IDI packets, on the other hand, 16-bit CRC can be utilized.

In some implementations, fault tolerances can be defined for link layer packets (LLPs) that include requiring a valid signal to transition from low to high (i.e., 0-to-1) (e.g., to assist in assuring bit and symbol lock). Further, in one example, a particular number of consecutive, identical LLPs can be defined to be sent and responses can be expected to each request, with the requestor retrying after a response timeout, among other defined characteristics that can be used as the basis of determining faults in LLP data on the MCPL. In further examples, fault tolerance can be provided for a valid signal, for instance, through extending the valid signal across an entire time period window, or symbol (e.g., by keeping the valid signal high for eight UIs). Additionally, errors or faults in stream signals can be prevented by maintaining a hamming distance for encodings values of the stream signal, among other examples.

Implementations of a logical PHY can include error detection, error reporting, and error handling logic. In some implementations, a logical PHY of an example MCPL can include logic to detect PHY layer de-framing errors (e.g., on the valid and stream lanes), sideband errors (e.g., relating to LSM state transitions), errors in LLPs (e.g., that are critical to LSM state transitions), among other examples. Some error detection/resolution can be delegated to upper layer logic, such as PCIe logic adapted to detect PCIe-specific errors, among other examples.

In the case of de-framing errors, in some implementations, one or more mechanisms can be provided through error handling logic. De-framing errors can be handled based on the protocol involved. For instance, in some implementations, link layers can be informed of the error to trigger a retry. De-framing can also cause a realignment of the logical PHY de-framing. Further, re-centering of the logical PHY can be performed and symbol/window lock can be reacquired, among other techniques. Centering, in some examples, can include the PHY moving the receiver clock phase to the optimal point to detect the incoming data. "Optimal," in this context, can refer to where it has the most margin for noise and clock jitter. Re-centering can include simplified centering functions, for instance, performed when the PHY wakes up from a low power state, among other examples.

Other types of errors can involve other error handling techniques. For instance, errors detected in a sideband can be caught through a time-out mechanism of a corresponding state (e.g., of an LSM). The error can be logged and the link state machine can then be transitioned to Reset. The LSM can remain in Reset until a restart command is received from software. In another example, LLP errors, such as a link control packet error, can be handled with a time-out mechanism that can re-start the LLP sequence if an acknowledgement to the LLP sequence is not received.

FIGS. 14A-14C illustrate representations of example bit mappings on data lanes of an example MCPL for various types of data. For instance, an example MCPL can include fifty data lanes. FIG. 14A illustrates a first bit mapping of example 16 byte slots in a first protocol, such as IDI, that can be sent over the data lanes within an 8UI symbol, or window. For instance, within the defined 8UI window, three 16 byte slots, including a header slot, can be sent. Two bytes of data remain, in this example, and these remaining two bytes can be utilized CRC bits (e.g., in lanes DATA[48] and DATA[49]).

Figure 16:
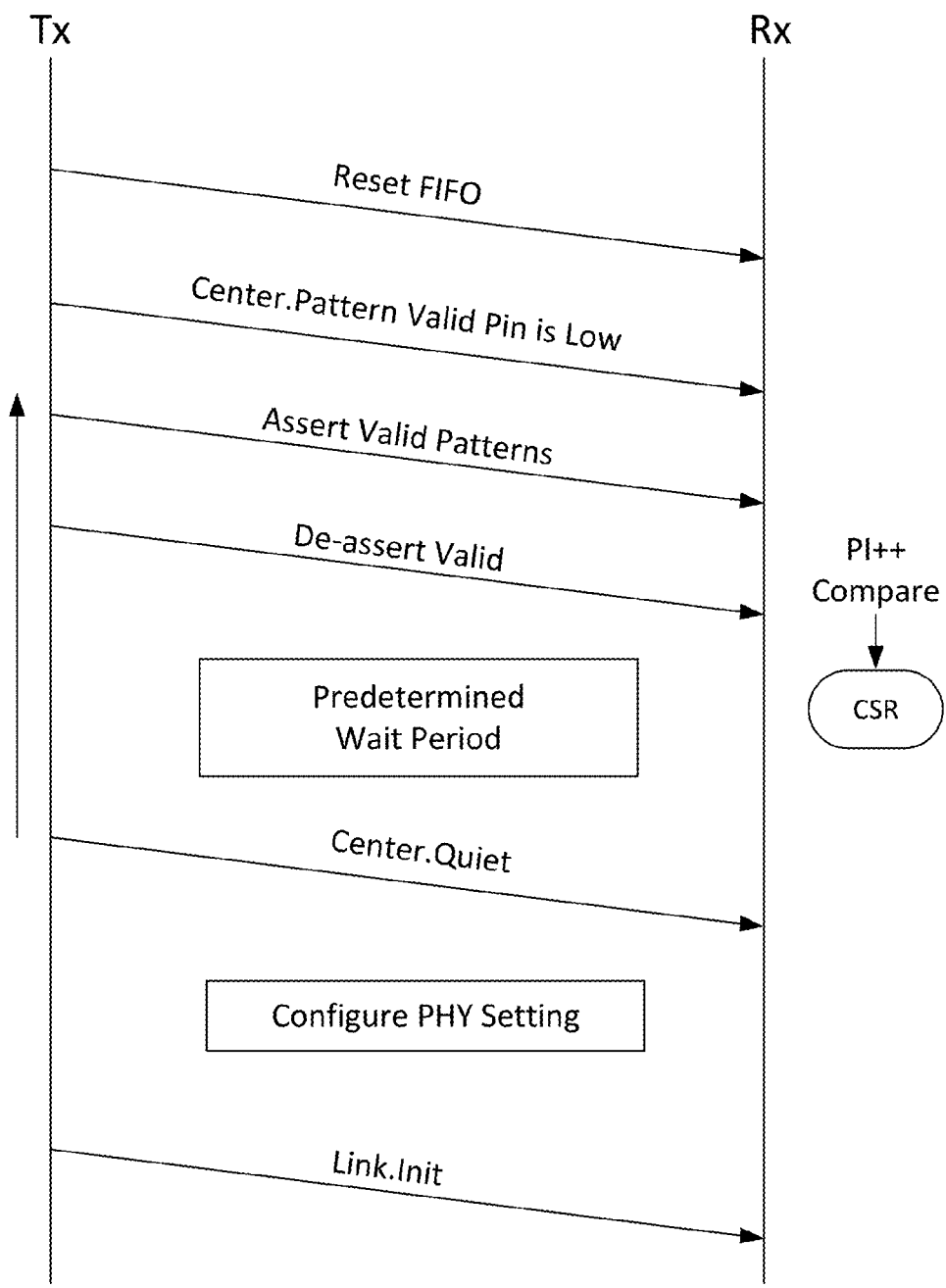
FIG. 16 is a representation of a flow associated with an example centering of a link.

In another example, FIG. 14B illustrates a second example bit mapping for PCIe packet data sent over the fifty data lanes of an example MCPL. In the example of FIG. 14B, 16 bytes packets (e.g., transaction layer (TLP) or data link layer (DLLP) PCIe packets) can be sent over the MCPL. In an 8UI window, three packets can be sent, with the remaining two bytes of bandwidth left unused within the window. Framing tokens can be included in these symbols and used to locate the start and end of each packet. In one example of PCIe, the framing utilized in the example of FIG. 14B can be the same as those token implemented for PCIe at 8 GT/s.

In yet another example, illustrated in FIG. 14C, an example bit mapping of link-to-link packets (e.g., LLP packets) sent over an example MCPL is shown. LLPs can be 4 bytes each and each LLP (e.g., LLP0, LLP1, LLP2, etc.) can be sent four consecutive times, in accordance with fault tolerance and error detection within an example implementation. For instance, failure to receive four consecutive identical LLPs can indicate an error. Additionally, as with other data types, failure to receive a VALID in a proceeding time window, or symbol, can also indicate an error. In some instances, LLPs can have fixed slots. Additionally, in this example, unused, or "spare," bits in the byte time period, can result in logical 0s being transmitted over two of the fifty lanes (e.g., DATA[48-49]), among other examples.

Figure 15:
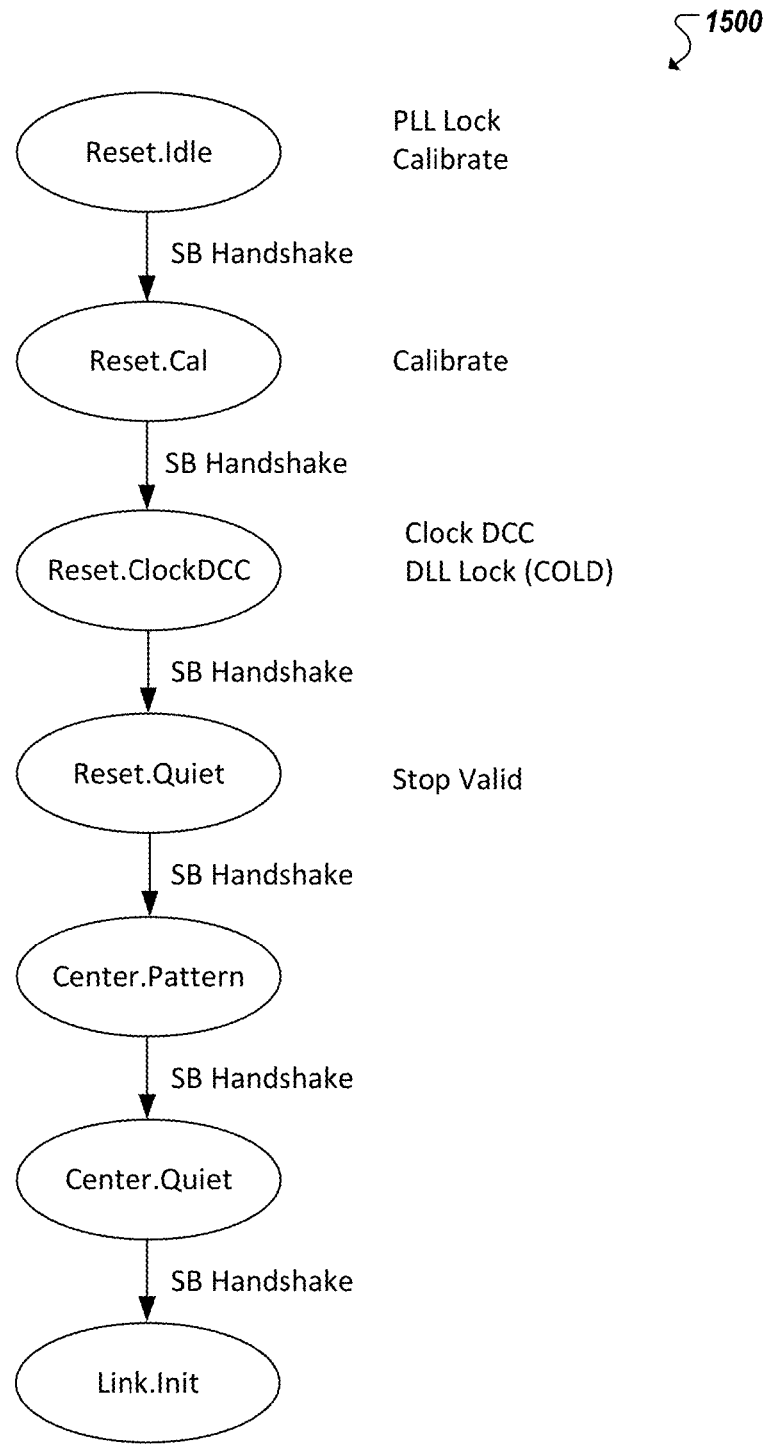
FIG. 15 is a representation of a portion of an example link state machine.

Turning to FIG. 15, a simplified link state machine transition diagram 1400 is shown together with sideband handshaking utilized between the state transitions. For instance, a Reset.Idle state (e.g., where phase lock loop (PLL) lock calibration is performed) can transition, through a sideband handshake, to a Reset.Cal state (e.g., where the link is further calibrated). Reset.Cal can transition, through a sideband handshake, to a Reset.ClockDCC state (e.g., where duty cycle correction (DCC) and delay-locked looping (DLL) lock can be performed). An additional handshake can be performed to transition from Reset.ClockDCC to a Reset.Quiet state (e.g., to deassert the Valid signal). To assist in alignment of signaling on the lanes of the MCPL, the lanes can be centered through a Center.Pattern state.

In some implementations, as shown in the example of FIG. 16, during the Center.Pattern state, the transmitter can generate training patterns or other data. The receiver can condition its receiver circuitry to receive such training patterns, for instance, by setting the phase interpolator position and vref position and setting the comparator. The receiver can continuously compare the patterns received with expected patterns and store the result in a register. After one set of patterns are complete, the receiver can increment the phase interpolator setting keeping the vref the same. The test pattern generation and comparison process can continue and new compare results can be stored in the register with the procedure repeatedly stepping through all phase interpolator values and through all values of vref. The Center.Quiet state can be entered when the pattern generation and comparison process is all complete. Following the centering of the lanes through the Center.Pattern and Center Quiet link states, a sideband handshake (e.g., using an LSM sideband signal over the dedicated LSM sideband lane of the link) can be facilitated to transition to a Link.Init state to initialize the MCPL and enable sending of data on the MCPL.

Returning momentarily to the discussion of FIG. 15, as noted above, sideband handshakes can be used to facilitate link state machine transitions between dies or chips in a multi-chip package. For instance, signals on the LSM sideband lanes of an MCPL can be used to synchronize the state machine transitions across the die. For example, when the conditions to exit a state (e.g., Reset.Idle) are met, the side that met those conditions can assert, on its outbound LSM_SB lane, an LSM sideband signal and wait for the other remote die to reach the same condition and assert an LSM sideband signal on its LSM_SB lane. When both LSM_SB signals are asserted the link state machine of each respective die can transition to the next state (e.g., a Reset.Cal state). A minimum overlap time can be defined during which both LSM_SB signals should be kept asserted prior to transitioning state. Further, a minimum quiesce time can be defined after LSM_SB is de-asserted to allow for accurate turn-around detection. In some implementations, every link state machine transition can be conditioned on and facilitated by such LSM_SB handshakes.

Figure 17:
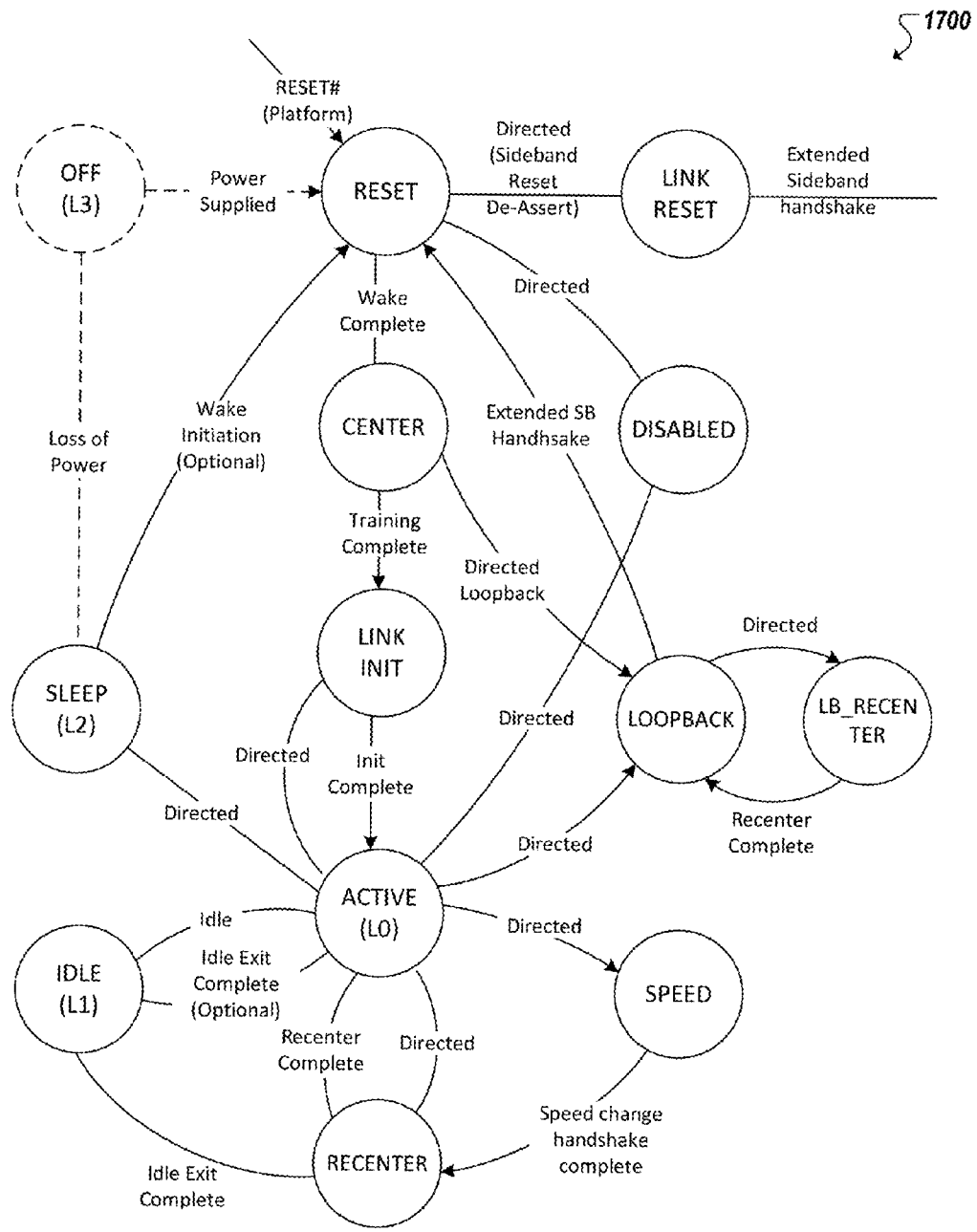
FIG. 17 is a representation of an example link state machine.

FIG. 17 is a more detailed link state machine diagram 1700, illustrating at least some of the additional link states and link state transitions that can be included in an example MCPL. In some implementations, an example link state machine can include, among the other states and state transitions illustrated in FIG. 17, a "Directed Loopback" transition can be provided to place the lanes of an MCPL into a digital loopback. For instance, the receiver lanes of an MCPL can be looped back to the transmitter lanes after the clock recovery circuits. An "LB_Recenter" state can also be provided in some instances, which can be used to align the data symbols. Additionally, as shown in FIG. 15, MCPL can support multiple link states, including an active L0 state and low power states, such as an L1 idle state, and L2 sleep state, among potentially other examples.

Figure 18:
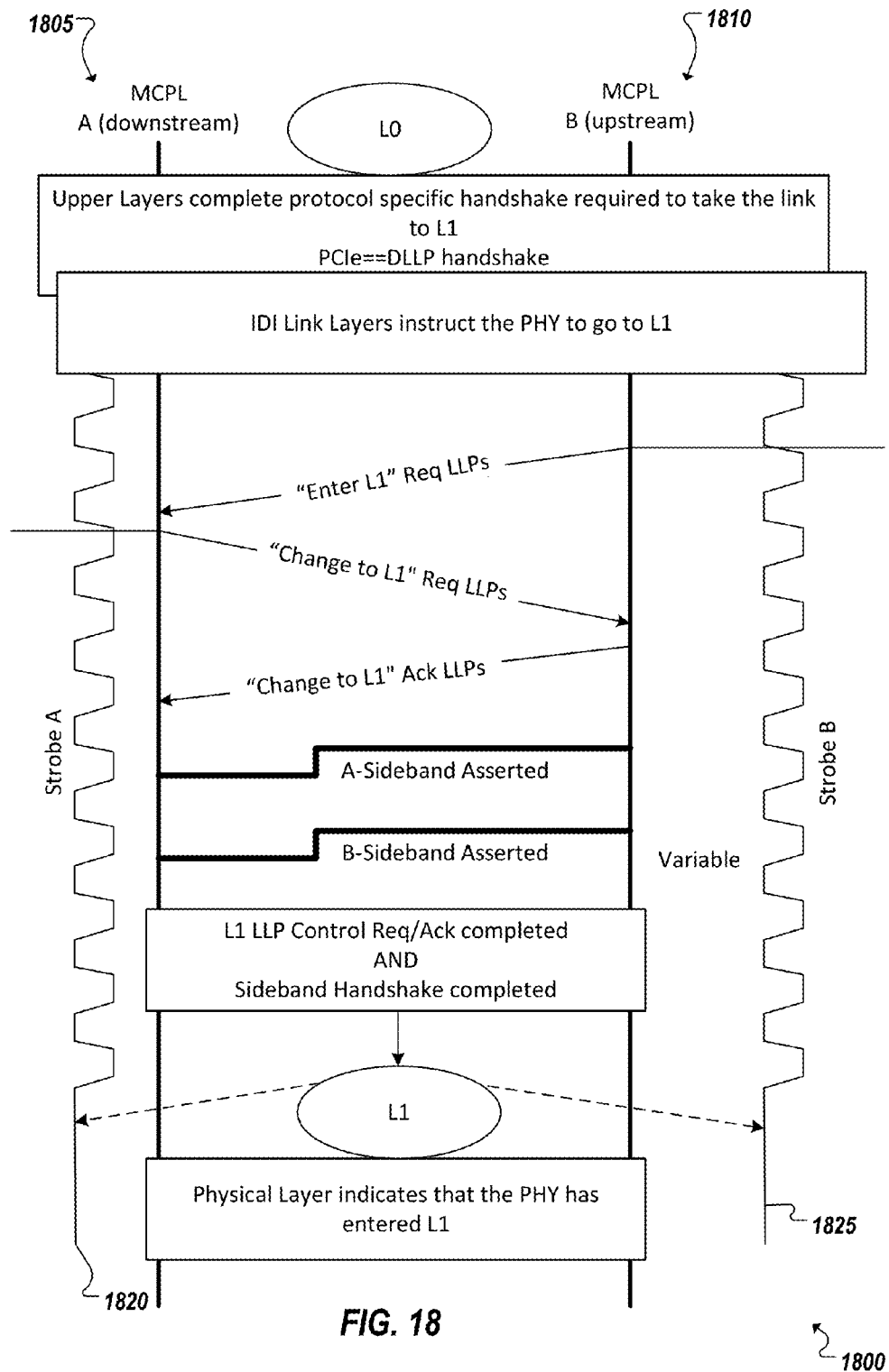
FIG. 18 is a representation of signaling to enter a low power state.

FIG. 18 is a simplified block diagram 1800 illustrating an example flow in a transition between an active state (e.g., L0) and a low-power, or idle, state (e.g., L1). In this particular example, a first device 1805 and a second device 1810 are communicatively coupled using an MCPL. While in the active state, data is transmitted over the lanes of the MCPL (e.g., DATA, VALID, STREAM, etc.). Link layer packets (LLPs) can be communicated over the lanes (e.g., data lanes, with the stream signal indicating that the data is LLP data), to assist in facilitating link state transitions. For instance, LLPs can be sent between the first and second devices 1805, 1810 to negotiate entry from L0 into L1. For instance, upper layer protocols supported by the MCPL can communicate that entry into L1 (or another state) is desired and the upper layer protocols can cause LLPs to be sent over the MCPL to facilitate a link layer handshake to cause the physical layer to enter L1. For instance, FIG. 18 shows at least a portion of LLPs sent including an "Enter L1" request LLP sent from the second (upstream) device 1810 to the first (downstream) device 1805. In some implementations, and upper level protocols, the downstream port does not initiate the entry into L1. The receiving first device 1805 can send a "Change to L1" request LLP in response, which the second device 1810 can acknowledge through a "Change to L1" acknowledgement (ACK) LLP, among other examples. Upon detecting completion of the handshake, the logical PHY can cause a sideband signal to be asserted on a dedicated sideband link to acknowledge that the ACK was received and that the device (e.g., 1805) is ready for and expecting entry into L1. For instance, the first device 1805 can assert a sideband signal 1815 sent to the second device 1810 to confirm receipt of the final ACK in the link layer handshake. Additionally, the second device 1810 can also assert a sideband signal in response to sideband signal 1815 to notify the first device 1805 of the first device's sideband ACK 1805. With the link layer control and sideband handshakes completed, the MCPL PHY can be transitioned into the L1 state causing all lanes of the MCPL to be put into idle power savings mode, including respective MCPL strobes of the 1820, 1825 of the devices 1805, 1810. The L1 can be exited upon upper level layer logic of one of the first and second devices 1805, 1810 requesting re-entry into L0, for instance, in response to detecting data to be sent to the other device over the MCPL.

As noted above, in some implementations, an MCPL can facilitate communication between two devices supporting potentially multiple different protocols, and the MCPL can facilitate communications according to potentially any one of the multiple protocols over the lanes of the MCPL. Facilitating multiple protocols, however, can complicate entry and reentry into at least some link states. For instance, while some traditional interconnects have a single upper layer protocol assuming the role of master in state transitions, an implementation of MCPL with multiple different protocols effectively involves multiple masters. As an example, as shown in FIG. 18, each of PCIe and IDI can be supported between two devices 1805, 1810 over an implementation of an MCPL. For instance, placing the physical layer into an idle or low power state may be conditioned on permission first being obtained from each of the supported protocols (e.g., both PCIe and IDI).

In some instances, entry into L1 (or another state) may be requested by only one of the multiple, supported protocols supported for an implementation of an MCPL. While there may be a likelihood that the other protocols will likewise request entry into the same state (e.g., based on identifying similar conditions (e.g., little or no traffic) on the MCPL), the logical PHY can wait until permission or instructions are received from each upper layer protocol before actually facilitating the state transition. The logical PHY can track which upper layer protocols have requested the state change (e.g., performed a corresponding handshake) and trigger the state transition upon identifying that each of the protocols have requested the particular state change, such as a transition from L0 to L 1 or another transition that would affect or interfere with other protocols' communications. In some implementations, protocols can be blind as to their at least partial dependence on other protocols in the system. Further, in some instances, a protocol may expect a response (e.g., from the PHY) to a request to enter a particular state, such as a confirmation or rejection of the requested state transition. Accordingly, in such instances, while waiting for permission from other supported protocols for entry into an idle link state, the logical PHY can generate synthetic responses to a request to enter the idle state to "trick" the requesting upper layer protocol into believing that a particular state has been entered (when, in reality, the lanes are still active, at least until the other protocols also request entry into the idle state). Among other potential advantages, this can simplify coordinating entry into the low power state between multiple protocols, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 19:
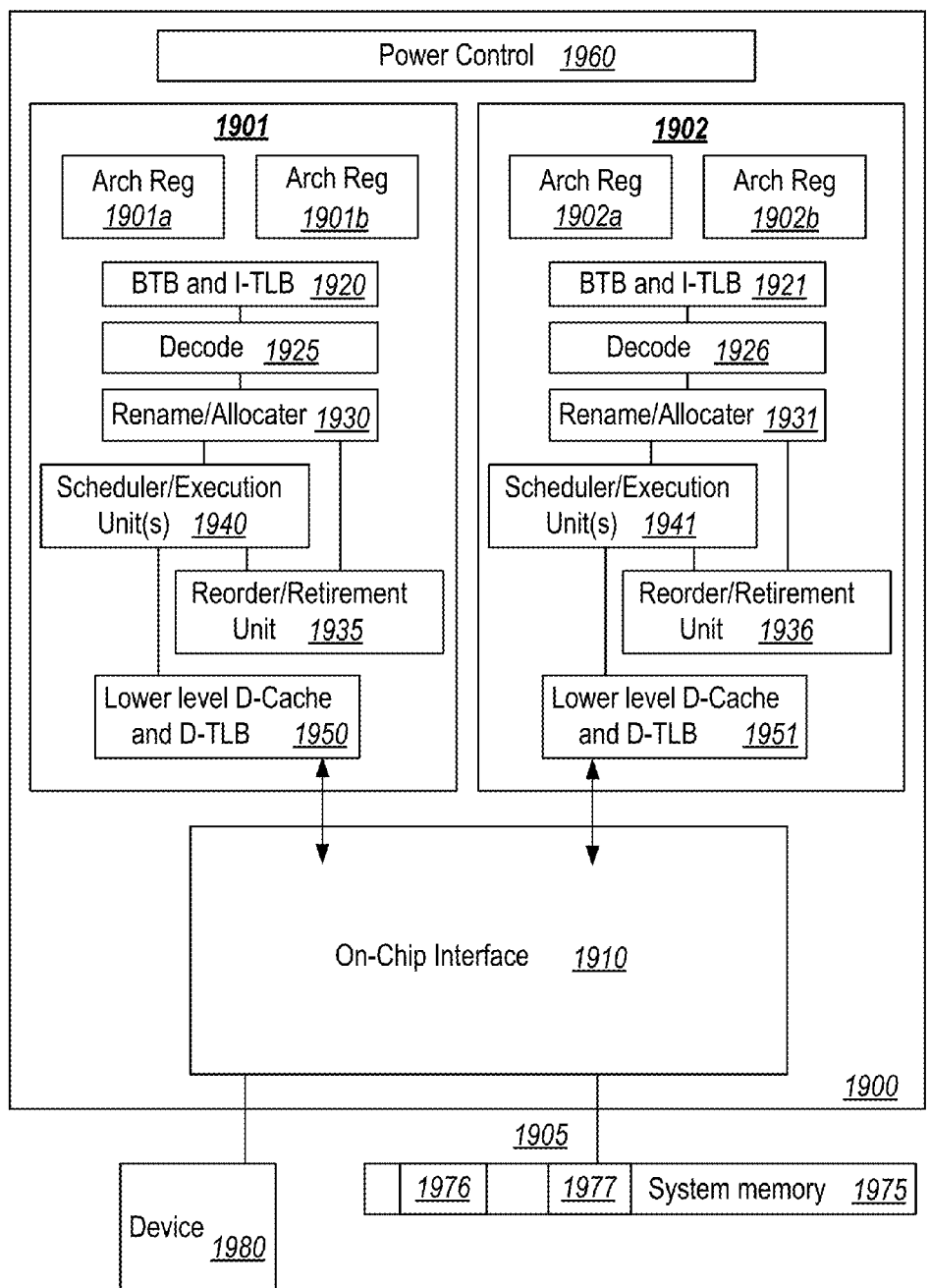
FIG. 19 illustrates an embodiment of a block diagram for a computing system including a multicore processor.

Referring to FIG. 19, an embodiment of a block diagram for a computing system including a multicore processor is depicted. Processor 1900 includes any processor or processing device, such as a microprocessor, an embedded processor, a digital signal processor (DSP), a network processor, a handheld processor, an application processor, a co-processor, a system on a chip (SOC), or other device to execute code. Processor 1900, in one embodiment, includes at least two cores—core 1901 and 1902, which may include asymmetric cores or symmetric cores (the illustrated embodiment). However, processor 1900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1900, as illustrated in FIG. 19, includes two cores—core 1901 and 1902. Here, core 1901 and 1902 are considered symmetric cores, i.e. cores with the same configurations, functional units, and/or logic. In another embodiment, core 1901 includes an out-of-order processor core, while core 1902 includes an in-order processor core. However, cores 1901 and 1902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1901 are described in further detail below, as the units in core 1902 operate in a similar manner in the depicted embodiment.

As depicted, core 1901 includes two hardware threads 1901a and 1901b, which may also be referred to as hardware thread slots 1901a and 1901b. Therefore, software entities, such as an operating system, in one embodiment potentially view processor 1900 as four separate processors, i.e., four logical processors or processing elements capable of executing four software threads concurrently. As alluded to above, a first thread is associated with architecture state registers 1901a, a second thread is associated with architecture state registers 1901b, a third thread may be associated with architecture state registers 1902a, and a fourth thread may be associated with architecture state registers 1902b. Here, each of the architecture state registers (1901a, 1901b, 1902a, and 1902b) may be referred to as processing elements, thread slots, or thread units, as described above. As illustrated, architecture state registers 1901a are replicated in architecture state registers 1901b, so individual architecture states/contexts are capable of being stored for logical processor 1901a and logical processor 1901b. In core 1901, other smaller resources, such as instruction pointers and renaming logic in allocator and renamer block 1930 may also be replicated for threads 1901a and 1901b. Some resources, such as re-order buffers in reorder/retirement unit 1935, ILTB 1920, load/store buffers, and queues may be shared through partitioning. Other resources, such as general purpose internal registers, page-table base register(s), low-level data-cache and data-TLB 1915, execution unit(s) 1940, and portions of out-of-order unit 1935 are potentially fully shared.

Processor 1900 often includes other resources, which may be fully shared, shared through partitioning, or dedicated by/to processing elements. In FIG. 19, an embodiment of a purely exemplary processor with illustrative logical units/resources of a processor is illustrated. Note that a processor may include, or omit, any of these functional units, as well as include any other known functional units, logic, or firmware not depicted. As illustrated, core 1901 includes a simplified, representative out-of-order (OOO) processor core. But an in-order processor may be utilized in different embodiments. The OOO core includes a branch target buffer 1920 to predict branches to be executed/taken and an instruction-translation buffer (I-TLB) 1920 to store address translation entries for instructions.

Core 1901 further includes decode module 1925 coupled to fetch unit 1920 to decode fetched elements. Fetch logic, in one embodiment, includes individual sequencers associated with thread slots 1901a, 1901b, respectively. Usually core 1901 is associated with a first ISA, which defines/specifies instructions executable on processor 1900. Often machine code instructions that are part of the first ISA include a portion of the instruction (referred to as an opcode), which references/specifies an instruction or operation to be performed. Decode logic 1925 includes circuitry that recognizes these instructions from their opcodes and passes the decoded instructions on in the pipeline for processing as defined by the first ISA. For example, as discussed in more detail below decoders 1925, in one embodiment, include logic designed or adapted to recognize specific instructions, such as transactional instruction. As a result of the recognition by decoders 1925, the architecture or core 1901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1926, in one embodiment, recognize the same ISA (or a subset thereof). Alternatively, in a heterogeneous core environment, decoders 1926 recognize a second ISA (either a subset of the first ISA or a distinct ISA).

In one example, allocator and renamer block 1930 includes an allocator to reserve resources, such as register files to store instruction processing results. However, threads 1901a and 1901b are potentially capable of out-of-order execution, where allocator and renamer block 1930 also reserves other resources, such as reorder buffers to track instruction results. Unit 1930 may also include a register renamer to rename program/instruction reference registers to other registers internal to processor 1900. Reorder/retirement unit 1935 includes components, such as the reorder buffers mentioned above, load buffers, and store buffers, to support out-of-order execution and later in-order retirement of instructions executed out-of-order.

Scheduler and execution unit(s) block 1940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1950 are coupled to execution unit(s) 1940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1901 and 1902 share access to higher-level or further-out cache, such as a second level cache associated with on-chip interface 1910. Note that higher-level or further-out refers to cache levels increasing or getting further way from the execution unit(s). In one embodiment, higher-level cache is a last-level data cache—last cache in the memory hierarchy on processor 1900—such as a second or third level data cache. However, higher level cache is not so limited, as it may be associated with or include an instruction cache. A trace cache—a type of instruction cache—instead may be coupled after decoder 1925 to store recently decoded traces. Here, an instruction potentially refers to a macro-instruction (i.e. a general instruction recognized by the decoders), which may decode into a number of micro-instructions (micro-operations).

In the depicted configuration, processor 1900 also includes on-chip interface module 1910. Historically, a memory controller, which is described in more detail below, has been included in a computing system external to processor 1900. In this scenario, on-chip interface 1910 is to communicate with devices external to processor 1900, such as system memory 1975, a chipset (often including a memory controller hub to connect to memory 1975 and an I/O controller hub to connect peripheral devices), a memory controller hub, a northbridge, or other integrated circuit. And in this scenario, bus 1905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1975 may be dedicated to processor 1900 or shared with other devices in a system. Common examples of types of memory 1975 include DRAM, SRAM, non-volatile memory (NV memory), and other known storage devices. Note that device 1980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1900. For example in one embodiment, a memory controller hub is on the same package and/or die with processor 1900. Here, a portion of the core (an on-core portion) 1910 includes one or more controller(s) for interfacing with other devices such as memory 1975 or a graphics device 1980. The configuration including an interconnect and controllers for interfacing with such devices is often referred to as an on-core (or un-core configuration). As an example, on-chip interface 1910 includes a ring interconnect for on-chip communication and a high-speed serial point-to-point link 1905 for off-chip communication. Yet, in the SOC environment, even more devices, such as the network interface, co-processors, memory 1975, graphics processor 1980, and any other known computer devices/interface may be integrated on a single die or integrated circuit to provide small form factor with high functionality and low power consumption.

In one embodiment, processor 1900 is capable of executing a compiler, optimization, and/or translator code 1977 to compile, translate, and/or optimize application code 1976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 20:
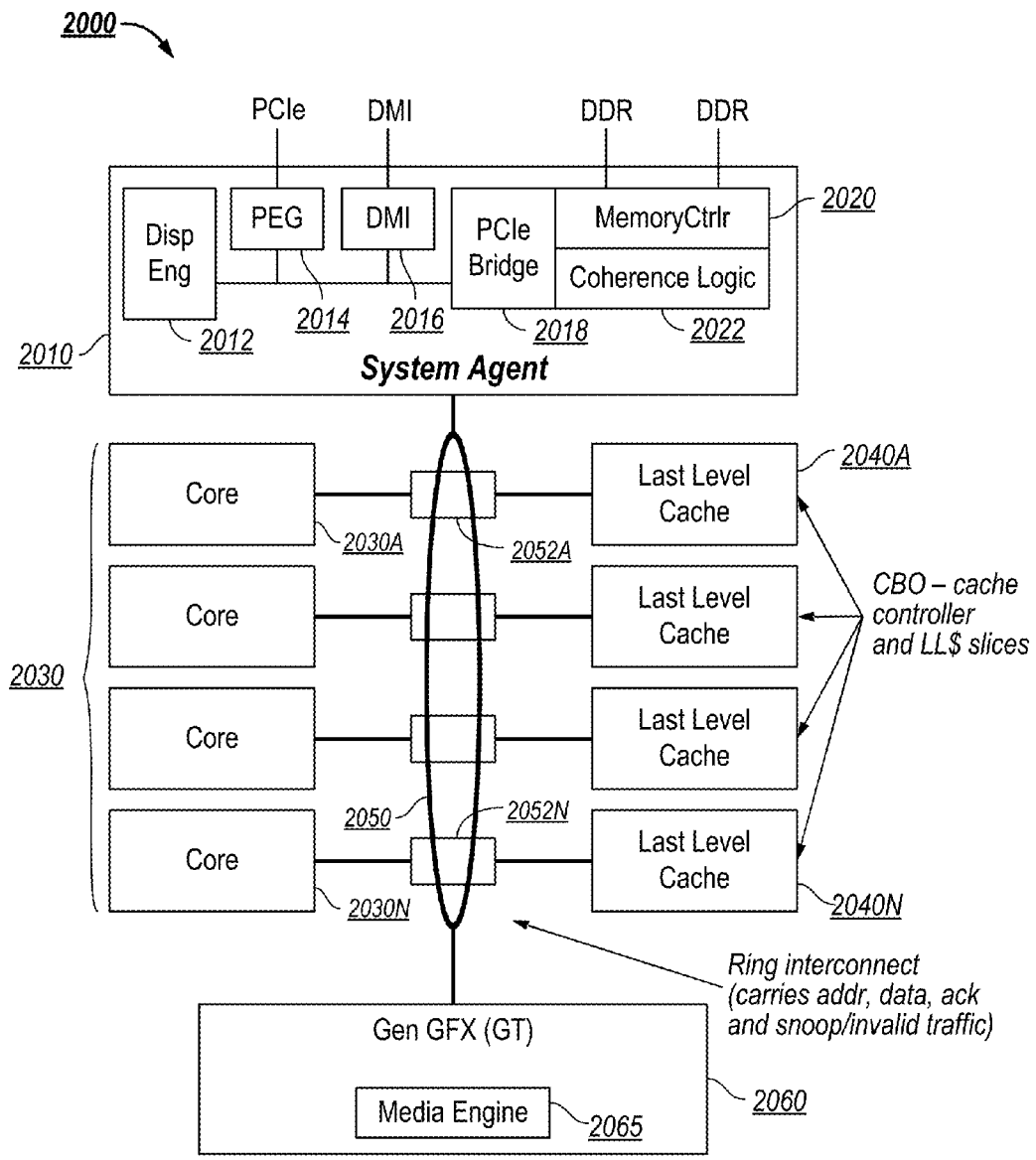
FIG. 20 illustrates another embodiment of a block diagram for a computing system including a multicore processor.

Referring now to FIG. 20, shown is a block diagram of an embodiment of a multicore processor. As shown in the embodiment of FIG. 20, processor 2000 includes multiple domains. Specifically, a core domain 2030 includes a plurality of cores 2030A-2030N, a graphics domain 2060 includes one or more graphics engines having a media engine 2065, and a system agent domain 2010.

In various embodiments, system agent domain 2010 handles power control events and power management, such that individual units of domains 2030 and 2060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 2030 and 2060 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 2030 further includes low level caches in addition to various execution units and additional processing elements. Here, the various cores are coupled to each other and to a shared cache memory that is formed of a plurality of units or slices of a last level cache (LLC) 2040A-2040N; these LLCs often include storage and cache controller functionality and are shared amongst the cores, as well as potentially among the graphics engine too.

As seen, a ring interconnect 2050 couples the cores together, and provides interconnection between the core domain 2030, graphics domain 2060 and system agent circuitry 2010, via a plurality of ring stops 2052A-2052N, each at a coupling between a core and LLC slice. As seen in FIG. 20, interconnect 2050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 2010 includes display engine 2012 which is to provide control of and an interface to an associated display. System agent domain 2010 may include other units, such as: an integrated memory controller 2020 that provides for an interface to a system memory (e.g., a DRAM implemented with multiple DIMMs; coherence logic 2022 to perform memory coherence operations. Multiple interfaces may be present to enable interconnection between the processor and other circuitry. For example, in one embodiment at least one direct media interface (DMI) 2016 interface is provided as well as one or more PCIe™ interfaces 2014. The display engine and these interfaces typically couple to memory via a PCIe™ bridge 2018. Still further, to provide for communications between other agents, such as additional processors or other circuitry, one or more other interfaces may be provided.

Figure 21:
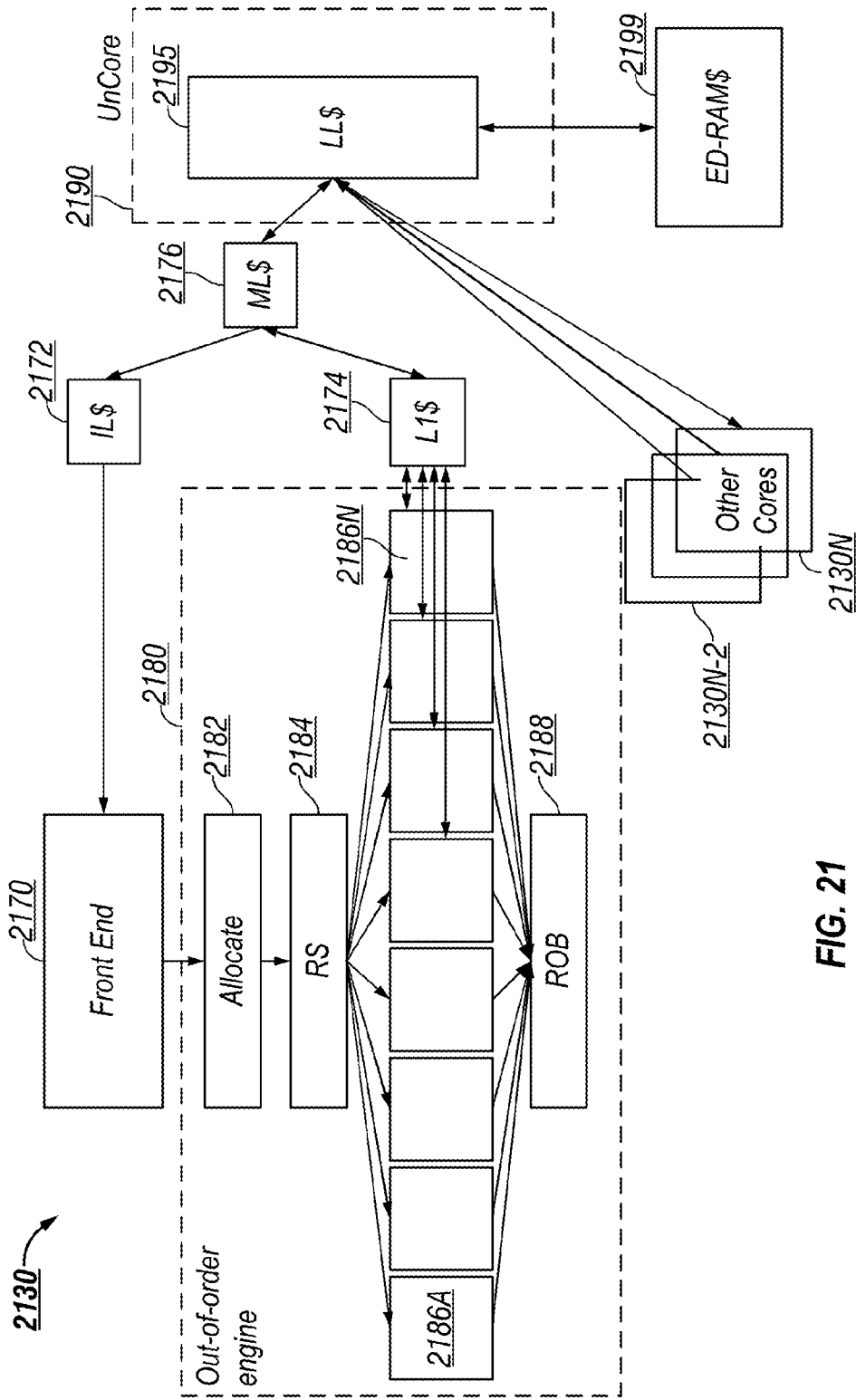
FIG. 21 illustrates an embodiment of a block diagram for a processor.

Referring now to FIG. 21, shown is a block diagram of a representative core; specifically, logical blocks of a back-end of a core, such as core 2030 from FIG. 20. In general, the structure shown in FIG. 21 includes an out-of-order processor that has a front end unit 2170 used to fetch incoming instructions, perform various processing (e.g. caching, decoding, branch predicting, etc.) and passing instructions/operations along to an out-of-order (OOO) engine 2180. OOO engine 2180 performs further processing on decoded instructions.

Specifically in the embodiment of FIG. 21, out-of-order engine 2180 includes an allocate unit 2182 to receive decoded instructions, which may be in the form of one or more micro-instructions or uops, from front end unit 2170, and allocate them to appropriate resources such as registers and so forth. Next, the instructions are provided to a reservation station 2184, which reserves resources and schedules them for execution on one of a plurality of execution units 2186A-2186N. Various types of execution units may be present, including, for example, arithmetic logic units (ALUs), load and store units, vector processing units (VPUs), floating point execution units, among others. Results from these different execution units are provided to a reorder buffer (ROB) 2188, which take unordered results and return them to correct program order.

Still referring to FIG. 21, note that both front end unit 2170 and out-of-order engine 2180 are coupled to different levels of a memory hierarchy. Specifically shown is an instruction level cache 2172, that in turn couples to a mid-level cache 2176, that in turn couples to a last level cache 2195. In one embodiment, last level cache 2195 is implemented in an on-chip (sometimes referred to as uncore) unit 2190. As an example, unit 2190 is similar to system agent 2010 of FIG. 20. As discussed above, uncore 2190 communicates with system memory 2199, which, in the illustrated embodiment, is implemented via ED RAM. Note also that the various execution units 2186 within out-of-order engine 2180 are in communication with a first level cache 2174 that also is in communication with mid-level cache 2176. Note also that additional cores 2130N-2-2130N can couple to LLC 2195. Although shown at this high level in the embodiment of FIG. 21, understand that various alterations and additional components may be present.

Figure 22:
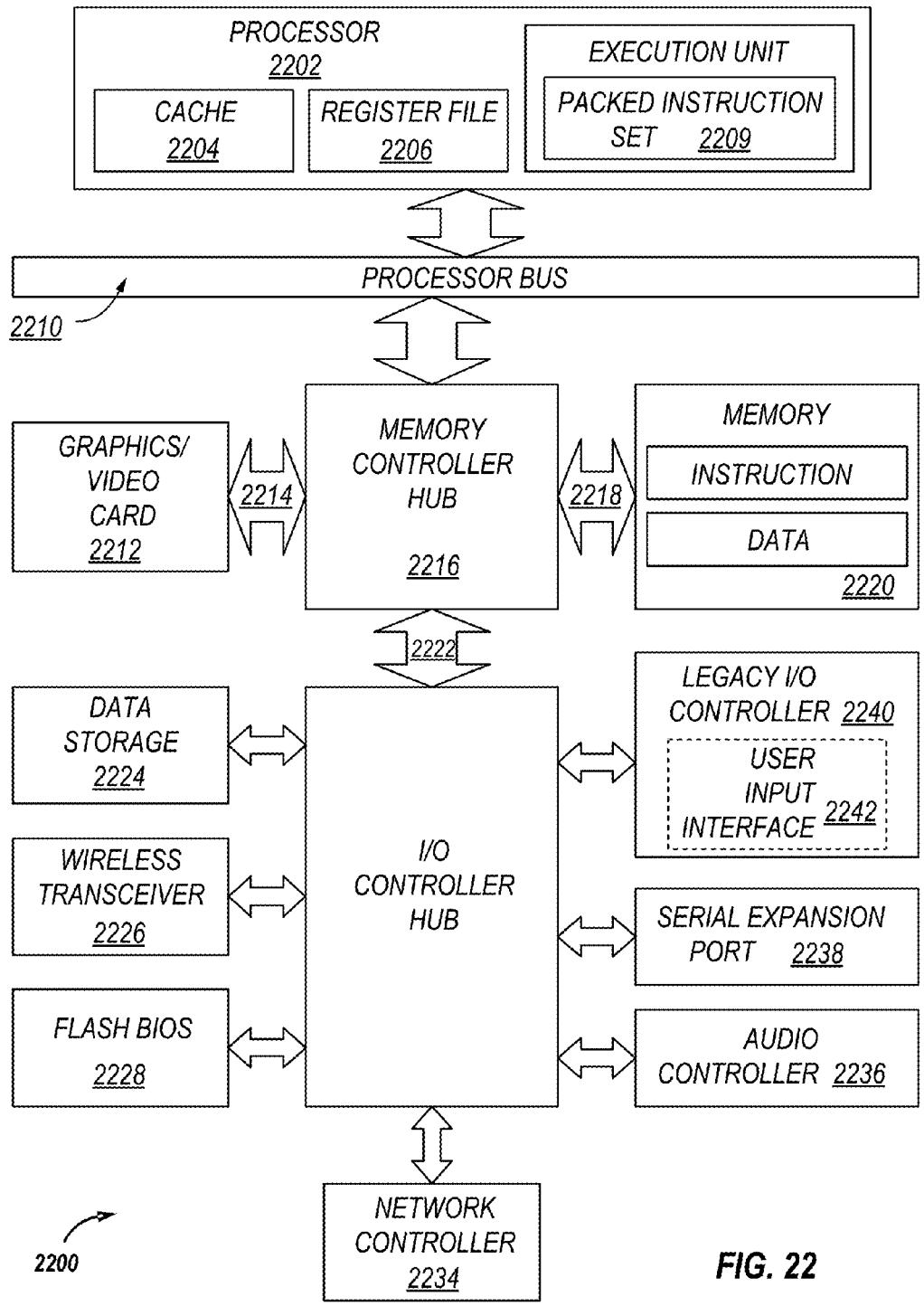
FIG. 22 illustrates another embodiment of a block diagram for a computing system including a processor.

Turning to FIG. 22, a block diagram of an exemplary computer system formed with a processor that includes execution units to execute an instruction, where one or more of the interconnects implement one or more features in accordance with one embodiment of the present invention is illustrated. System 2200 includes a component, such as a processor 2202 to employ execution units including logic to perform algorithms for process data, in accordance with the present invention, such as in the embodiment described herein. System 2200 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 2200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 2202 includes one or more execution units 2208 to implement an algorithm that is to perform at least one instruction. One embodiment may be described in the context of a single processor desktop or server system, but alternative embodiments may be included in a multiprocessor system. System 2200 is an example of a 'hub' system architecture. The computer system 2200 includes a processor 2202 to process data signals. The processor 2202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 2202 is coupled to a processor bus 2210 that transmits data signals between the processor 2202 and other components in the system 2200. The elements of system 2200 (e.g. graphics accelerator 2212, memory controller hub 2216, memory 2220, I/O controller hub 2224, wireless transceiver 2226, Flash BIOS 2228, Network controller 2234, Audio controller 2236, Serial expansion port 2238, I/O controller 2240, etc.) perform their conventional functions that are well known to those familiar with the art.

In one embodiment, the processor 2202 includes a Level 1 (L1) internal cache memory 2204. Depending on the architecture, the processor 2202 may have a single internal cache or multiple levels of internal caches. Other embodiments include a combination of both internal and external caches depending on the particular implementation and needs. Register file 2206 is to store different types of data in various registers including integer registers, floating point registers, vector registers, banked registers, shadow registers, checkpoint registers, status registers, and instruction pointer register.

Execution unit 2208, including logic to perform integer and floating point operations, also resides in the processor 2202. The processor 2202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 2202. For one embodiment, execution unit 2208 includes logic to handle a packed instruction set 2209. By including the packed instruction set 2209 in the instruction set of a general-purpose processor 2202, along with associated circuitry to execute the instructions, the operations used by many multimedia applications may be performed using packed data in a general-purpose processor 2202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 2208 may also be used in micro controllers, embedded processors, graphics devices, DSPs, and other types of logic circuits. System 2200 includes a memory 2220. Memory 2220 includes a dynamic random access memory (DRAM) device, a static random access memory (SRAM) device, flash memory device, or other memory device. Memory 2220 stores instructions and/or data represented by data signals that are to be executed by the processor 2202.

Note that any of the aforementioned features or aspects of the invention may be utilized on one or more interconnect illustrated in FIG. 22. For example, an on-die interconnect (ODI), which is not shown, for coupling internal units of processor 2202 implements one or more aspects of the invention described above. Or the invention is associated with a processor bus 2210 (e.g. other known high performance computing interconnect), a high bandwidth memory path 2218 to memory 2220, a point-to-point link to graphics accelerator 2212 (e.g. a Peripheral Component Interconnect express (PCIe) compliant fabric), a controller hub interconnect 2222, an I/O or other interconnect (e.g. USB, PCI, PCIe) for coupling the other illustrated components. Some examples of such components include the audio controller 2236, firmware hub (flash BIOS) 2228, wireless transceiver 2226, data storage 2224, legacy I/O controller 2210 containing user input and keyboard interfaces 2242, a serial expansion port 2238 such as Universal Serial Bus (USB), and a network controller 2234. The data storage device 2224 can comprise a hard disk drive, a floppy disk drive, a CD-ROM device, a flash memory device, or other mass storage device.

Figure 23:
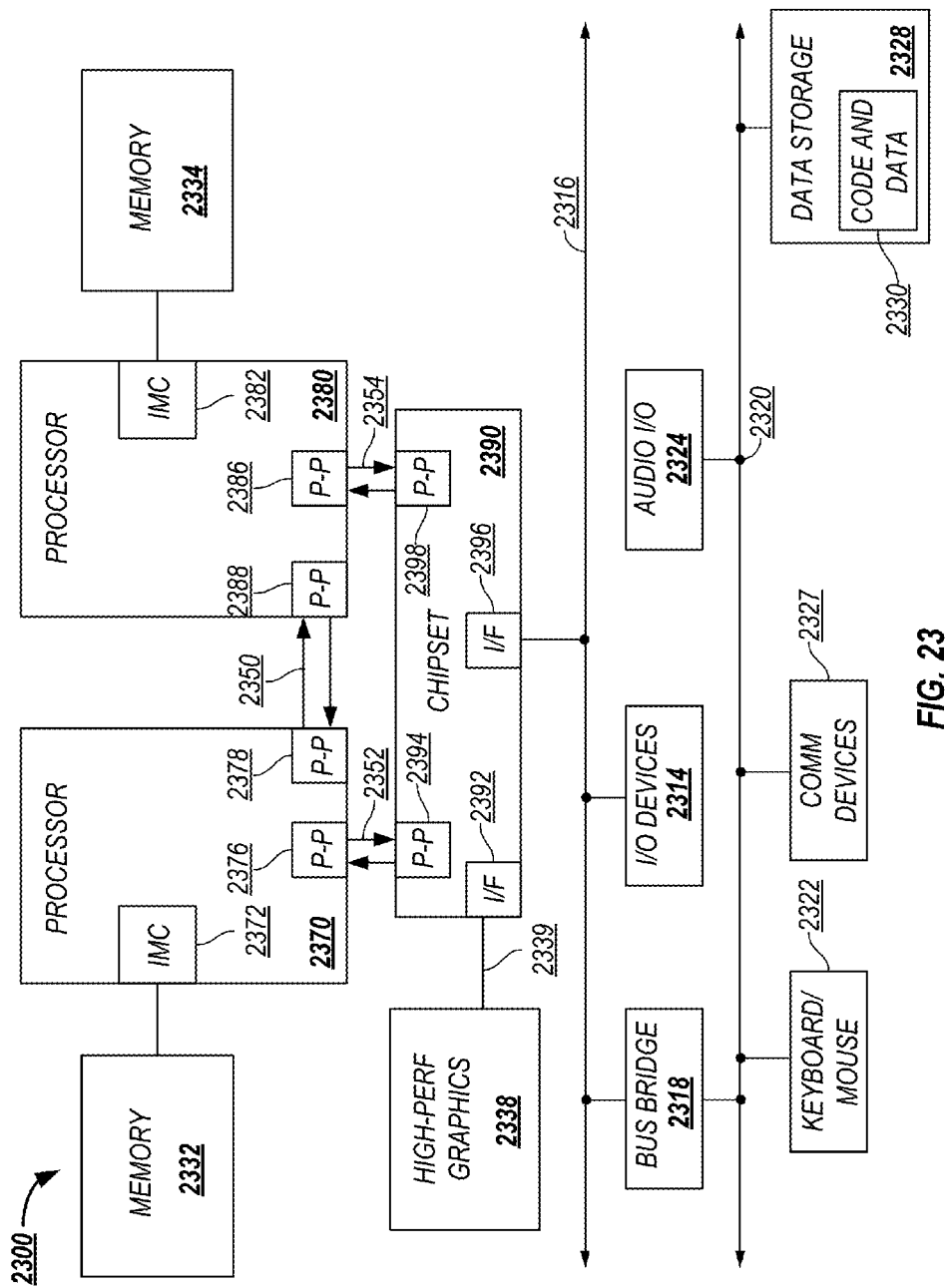
FIG. 23 illustrates an embodiment of a block for a computing system including multiple processors.

Referring now to FIG. 23, shown is a block diagram of a second system 2300 in accordance with an embodiment of the present invention. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of a processor. In one embodiment, 2352 and 2354 are part of a serial, point-to-point coherent interconnect fabric, such as a high-performance architecture. As a result, the invention may be implemented within the QPI architecture.

While shown with only two processors 2370, 2380, it is to be understood that the scope of the present invention is not so limited. In other embodiments, one or more additional processors may be present in a given processor.

Processors 2370 and 2380 are shown including integrated memory controller units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 each exchange information with a chipset 2390 via individual P-P interfaces 2352, 2354 using point to point interface circuits 2376, 2394, 2386, 2398. Chipset 2390 also exchanges information with a high-performance graphics circuit 2338 via an interface circuit 2392 along a high-performance graphics interconnect 2339.

A shared cache (not shown) may be included in either processor or outside of both processors; yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present invention is not so limited.

As shown in FIG. 23, various I/O devices 2314 are coupled to first bus 2316, along with a bus bridge 2318 which couples first bus 2316 to a second bus 2320. In one embodiment, second bus 2320 includes a low pin count (LPC) bus. Various devices are coupled to second bus 2320 including, for example, a keyboard and/or mouse 2322, communication devices 2327 and a storage unit 2328 such as a disk drive or other mass storage device which often includes instructions/code and data 2330, in one embodiment. Further, an audio I/O 2324 is shown coupled to second bus 2320. Note that other architectures are possible, where the included components and interconnect architectures vary. For example, instead of the point-to-point architecture of FIG. 23, a system may implement a multi-drop bus or other such architecture.

Figure 24:
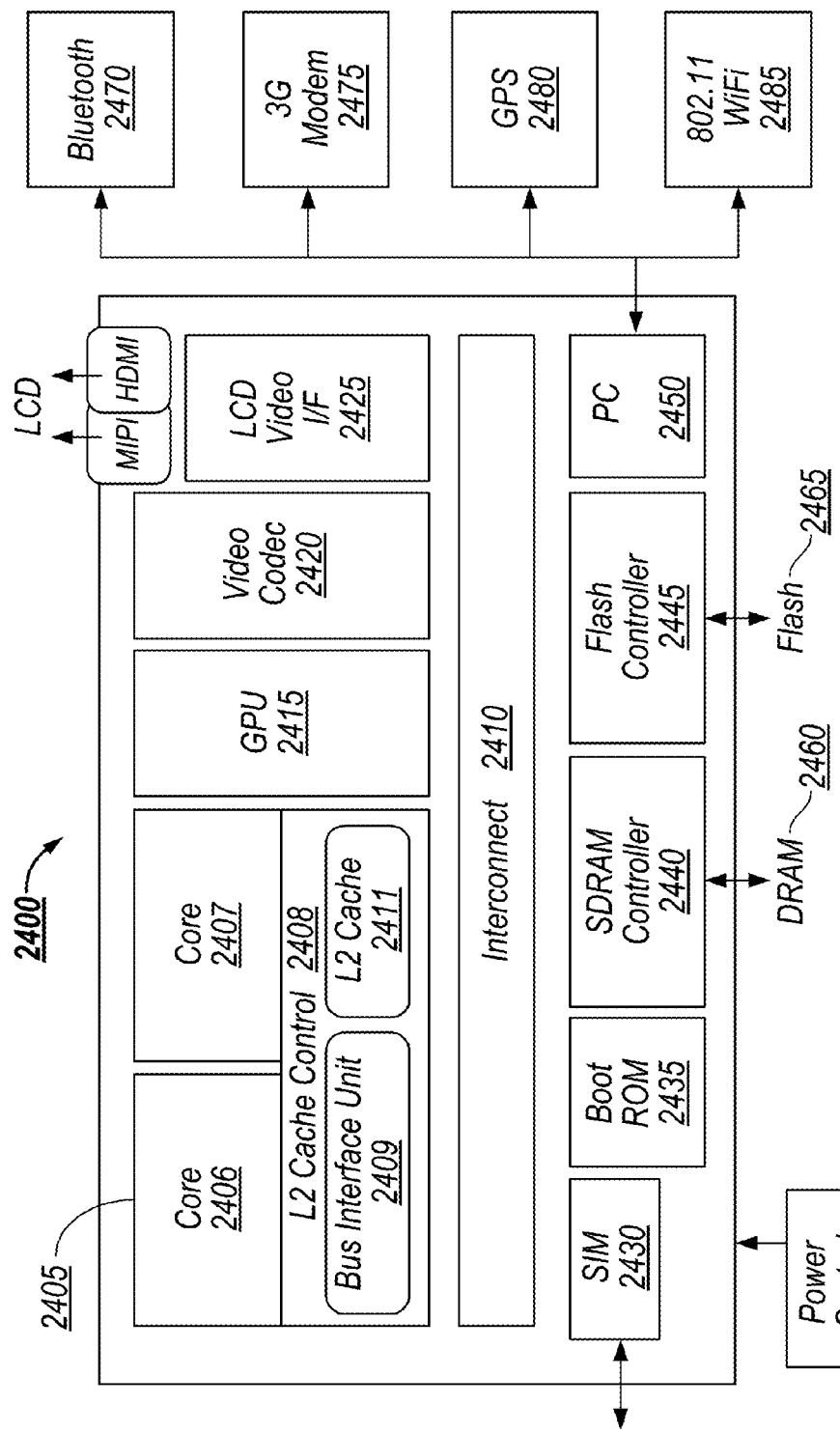
FIG. 24 illustrates an example system implemented as system on chip (SoC).

Turning next to FIG. 24, an embodiment of a system on-chip (SOC) design in accordance with the inventions is depicted. As a specific illustrative example, SOC 2400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2400 includes 2 cores—2406 and 2407. Similar to the discussion above, cores 2406 and 2407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2406 and 2407 are coupled to cache control 2408 that is associated with bus interface unit 2409 and L2 cache 2411 to communicate with other parts of system 2400. Interconnect 2410 includes an on-chip interconnect, such as an IOSF, AMBA, or other interconnect discussed above, which potentially implements one or more aspects of described herein.

Interface 2410 provides communication channels to the other components, such as a Subscriber Identity Module (SIM) 2430 to interface with a SIM card, a boot rom 2435 to hold boot code for execution by cores 2406 and 2407 to initialize and boot SOC 2400, a SDRAM controller 2440 to interface with external memory (e.g. DRAM 2460), a flash controller 2445 to interface with non-volatile memory (e.g. Flash 2465), a peripheral control 2450 (e.g. Serial Peripheral Interface) to interface with peripherals, video codecs 2420 and Video interface 2425 to display and receive input (e.g. touch enabled input), GPU 2415 to perform graphics related computations, etc. Any of these interfaces may incorporate aspects of the invention described herein.

In addition, the system illustrates peripherals for communication, such as a Bluetooth module 2470, 3G modem 2475, GPS 2485, and WiFi 2485. Note as stated above, a UE includes a radio for communication. As a result, these peripheral communication modules are not all required. However, in a UE some form a radio for external communication is to be included.

Figure 25:
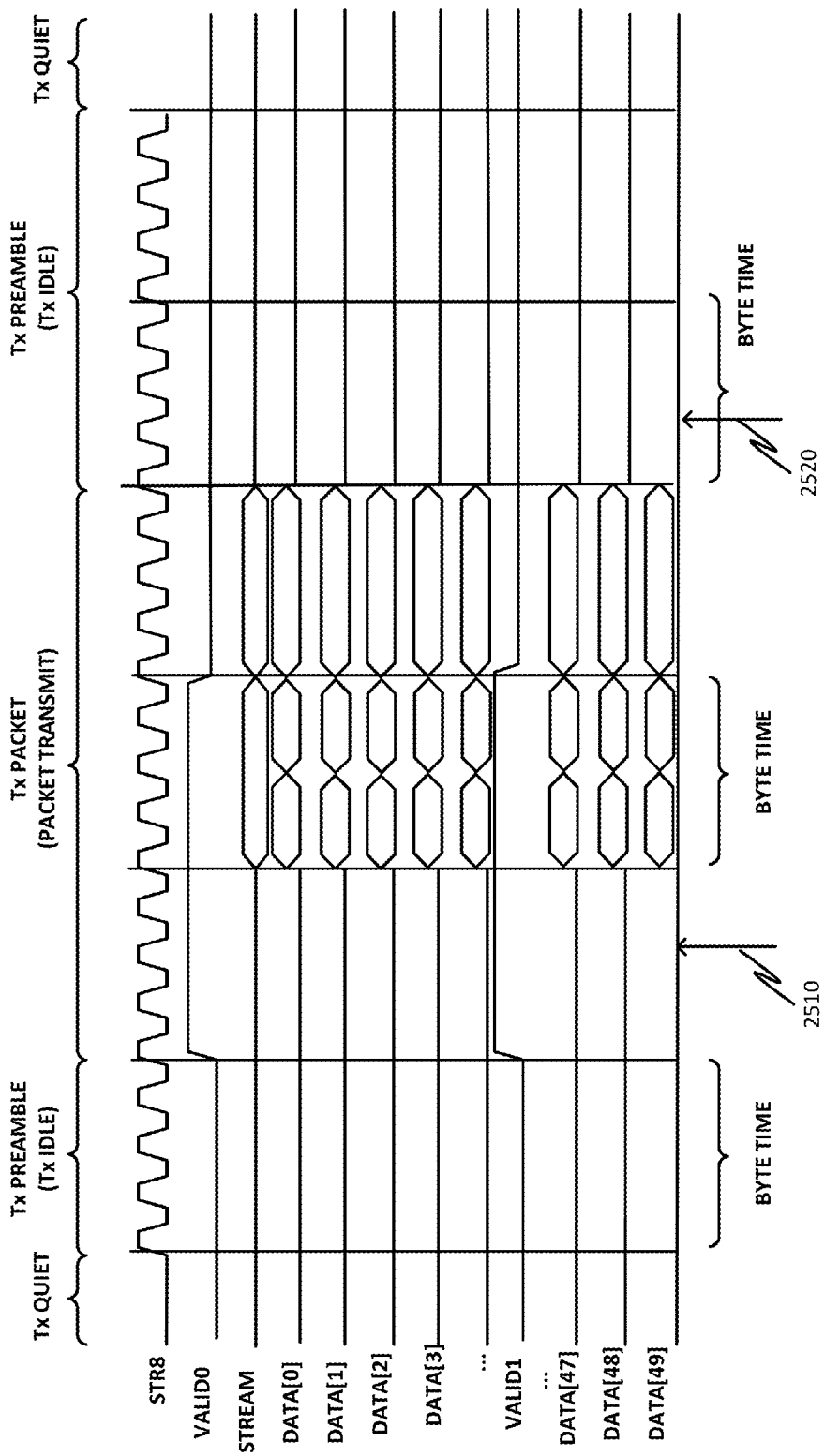
FIG. 25 illustrates an example of signaling in an embodiment.
Figure 26:
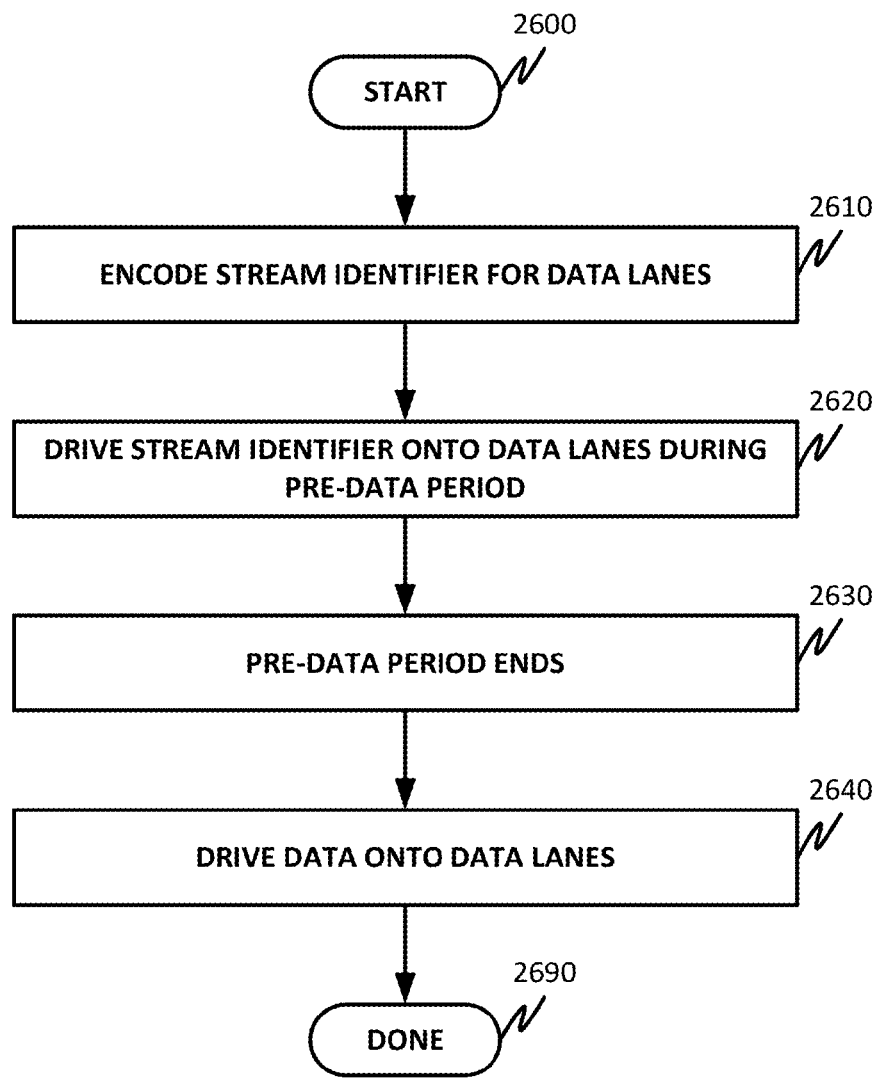
FIG. 26 is an example flow chart of a method for encoding data absent an explicit STREAM lane.
Figure 27:
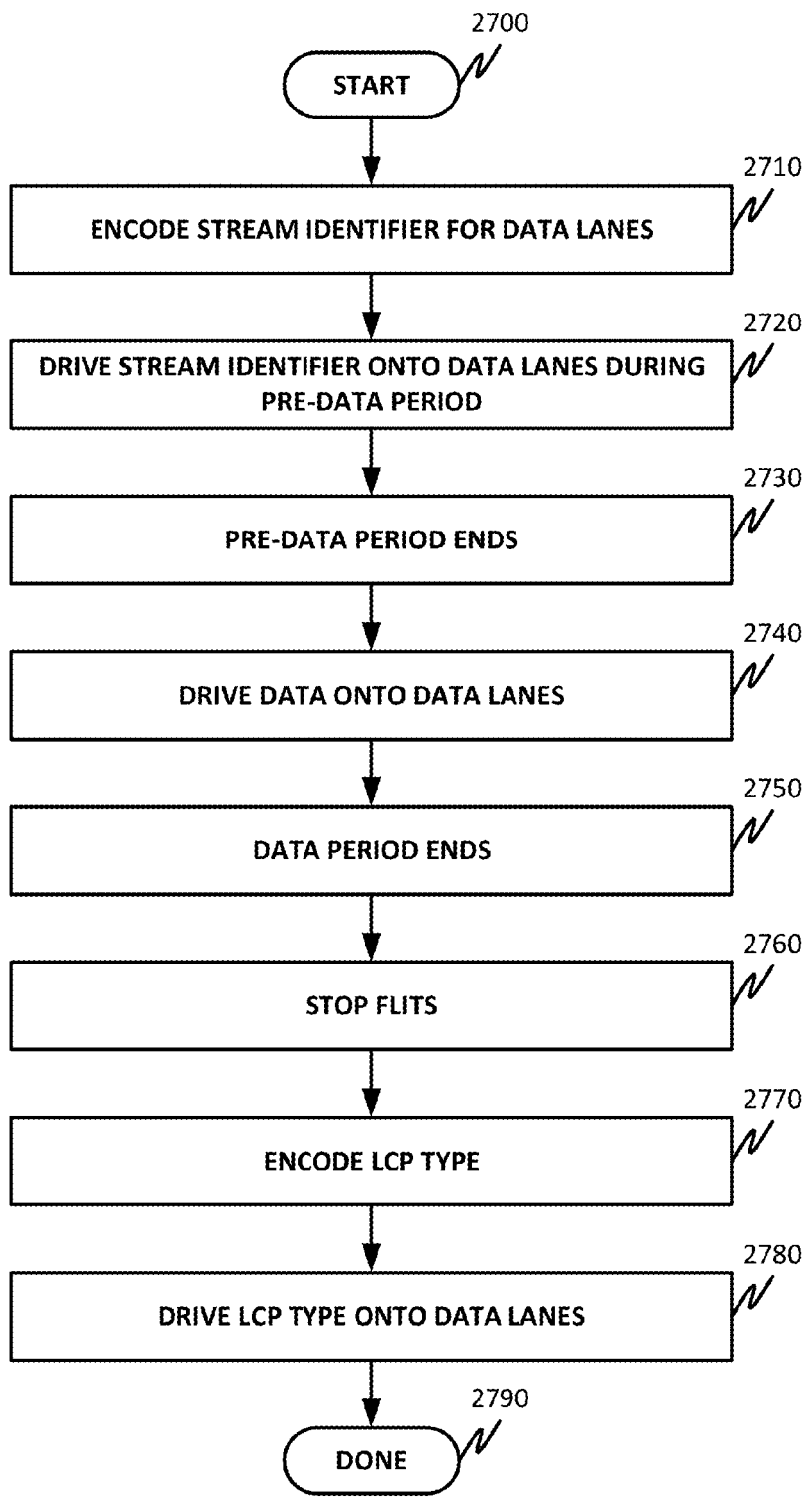
FIG. 27 is an example flow chart of a method for encoding data absent an explicit STREAM lane.

FIGS. 25-27 disclose an example of data encoding absent a dedicated STREAM lane. In embodiments of the interface described herein, a "STREAM" lane may be provided to differentiate Intel® intra-die interconnect (IDI) traffic from Intel® on-chip system fabric (IOSF) traffic, both of which are provided in the link layer. Link control packets (LCPs) on the PHY layer may also need to be flagged. In one embodiments, one stream lane is provided per each cluster of 20 data lanes.

However, in certain embodiments, the interface may be provided without a dedicated STREAM lane. For example, to provide equivalent functionality, STREAM lane data may be provided within data lanes during idle periods. Because one stream lane may be provided per 20 data lanes, elimination of the stream lane saves approximately 5% of area.

In on embodiment, during a pre-data time, the 20 data lanes may be brought high from midrail to represent one species of data, and brought low to represent a second species of data (for example, Intel® on-chip system fabric (IOSF)). To represent additional species of data, such as link control packets (LCPs) for example, lanes can be divided into two or more groups, and a single bit can be encoded into each group. LCP can also be encoded into a post-data time, for example by ceasing flit traffic and manipulating a "VALID" lane from midrail to 0 or 1.

There are multiple ways this can be done. In FIG. 25, arrow 2510 marks an example pre-data symbol time, while arrow 2520 marks an example post-data symbol times. In the example of FIG. 25, in addition to data lanes (which may be provided in groups of n lanes each (where in one example n=20), a "STROBE" lane may be provided, and each group may include a "VALID" lane. A "STREAM" lane is also disclosed by way of example to illustrate signaling that may be necessary in the absence of the teachings of this specification. With the methods of FIGS. 26 and 27, the STREAM lane may be eliminated, providing approximately 5% space savings in one embodiment.

During the pre-data period, the data lanes remain idle, for example, sitting at midrail in a tridata scheme. However, they could be driven to 0 or 1 without loss of electrical integrity. Thus, the idle data lanes are useful for encoding stream data without a separate stream lane.

In one embodiment, it is only necessary to distinguish between IOSF and IDI in the pre-data period. Thus, all lanes may be driven either high or low, to represent one of the two possibilities. However, this specification is not so limited. It is also possible to provide k bits of stream data, to represent $2^k$ species of packets, by dividing the data streams into k groups, and driving a value onto each group. The groups may be uniform in size, though this is not required. If any lanes are not needed, they may be left idle in the midrail state.

It is also possible to use only k lanes rather than dividing into groups. However, the use of groupings provides redundancy that may be beneficial in embodiments where reliability is at a premium over variety.

Post-data may also be provided for encoding LCP packets. This is useful because in the case where the link layer provides only two species of packet (such as IOSF and IDI), the data lanes can receive a uniform value while LCP is encoded separately. Encoding LCPs post-data is possible because in certain embodiments, LCPs always get priority over flit. When one agent needs to send an LCP on the PHY, it may end flit traffic by providing back pressure on the link layer.

Similar to the manner in which a plurality of link layer species can be provided as described above, during a symbol time of the post-data period, different types of LCPs can be encoded onto the lanes. For example, "00" on lanes 0 and 1 may be a request to enter hardware recentering. This may occur when a circular redundancy check (CRC) error is encountered at a higher-than-expected rate, so that one of the agents determines that the link needs to be retrained so that the clock can be properly "centered." In an example, "01" may be an ACK of this request. These are provided by way of non-limiting example only, and it should be noted that many different LCP requests and responses can be usefully encoded in this scheme. Also, as above, encoding the same value on a plurality of lanes can help to reduce errors. In an embodiment, keeping lanes at midrail indicates that no LCP is being sent.

Also, in certain embodiments, it may be necessary to send an LCP in the quiet time after the post-data period. To do this, the VALID lane could pulled to 0, for example, just before the LCP is send. The VALID lane may remain at midrail everywhere else during the quiet period.

In certain embodiments, the STROBE, VALID and STREAMID of all clusters may be driven identically to one another. In other embodiments, they may be driven separately to provide enhanced capabilities, such as recentering only a single cluster, while other clusters continue to receive normal traffic.

FIG. 26 is a flow diagram illustrating a method 2600 of providing embedded stream lane data. In the example of FIG. 26, pre-data encoding is used.

In block 2610, a stream lane encoder encodes the stream lane identifier, or species identifier to identify the species of data that is to follow.

In block 2620, still during the pre-data time illustrated in FIG. 25, a lane driver drives the encoded species identifier onto the data lanes. In certain embodiments, where multiple bits of stream lane identifier are needed, this may include dividing the data lanes into an appropriate number of groups. For example, if there are 20 lanes, and four bits are needed to represent up to 16 species of data, then the data lanes may be divided into four groups of five lanes each. In each group, all five lanes will be driven to the same state. In case there are extra lanes that are not to receive a value, they may be left at midrail.

In block 2630, the pre-data period expires. The data lanes must now be freed for use by substantive data.

In block 2640, the lane driver drives the substantive data onto the data lanes.

In block 2690, the method is done.

FIG. 27 is a flow diagram illustrating a method 2700 of providing additional post-data stream information, such as an LCP signal.

In block 2710, a stream lane encoder encodes the stream lane identifier, or species identifier to identify the species of data that is to follow.

In block 2720, still during the pre-data time illustrated in FIG. 25, a lane driver drives the encoded species identifier onto the data lanes. In certain embodiments, where multiple bits of stream lane identifier are needed, this may include dividing the data lanes into an appropriate number of groups. For example, if there are 20 lanes, and four bits are needed to represent up to 16 species of data, then the data lanes may be divided into four groups of five lanes each. In each group, all five lanes will be driven to the same state. In case there are extra lanes that are not to receive a value, they may be left at midrail.

In block 2730, the pre-data period expires. The data lanes must now be freed for use by substantive data.

In block 2740, the lane driver drives the substantive data onto the data lanes.

In block 2750, the data period ends. The data lanes are now available for use again as stream identifiers.

In block 2760, Agent A for example, determines that it needs to provide an LCP. Thus, Agent A ceases sending flits.

In block 2770, the stream encoder encodes the LCP. For example, a code may be provided for "RECENTER," and another code could be provided for Agent B (FIG. 3) to provide an "ACK" of this request. Additional LCP codes are also available.

In block 2780, the lane driver drives the LCP code onto the data lanes. The two agents then perform the requested action.

In block 2790, the method is done.

Figure 28:
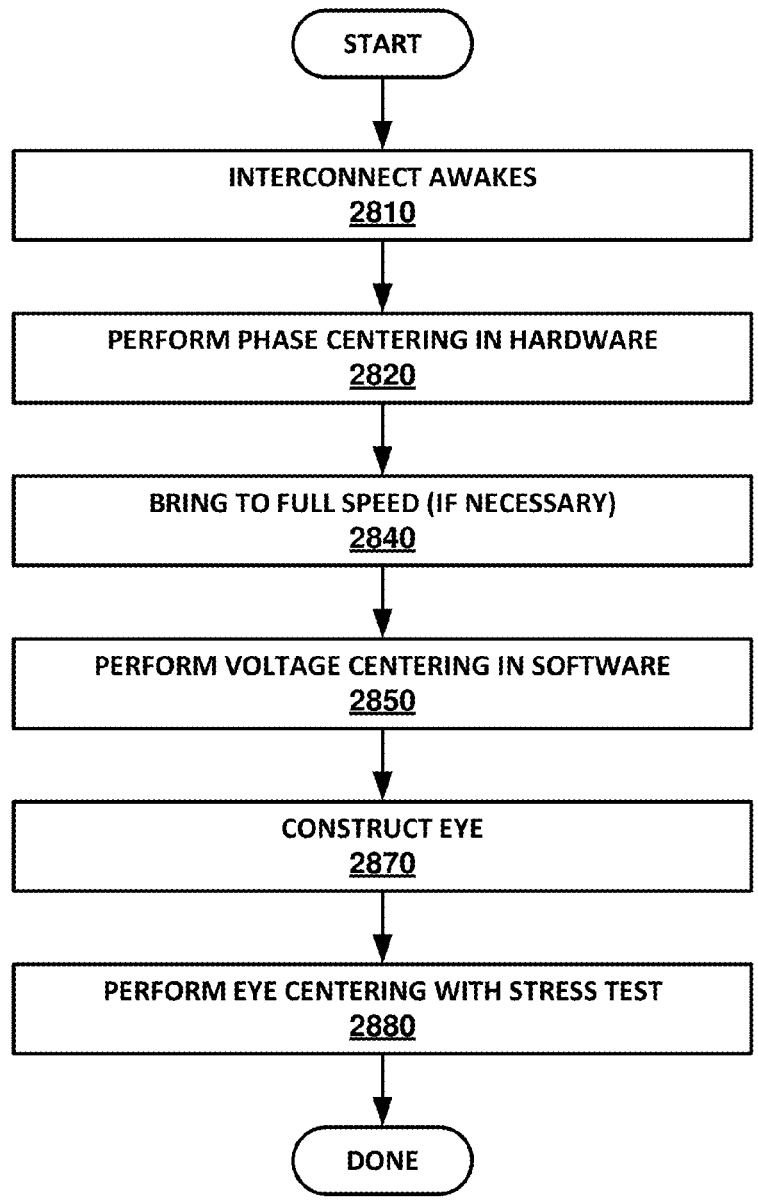
FIG. 28 is an example flow chart of a method for performing centering of a reference voltage.
Figure 29A:
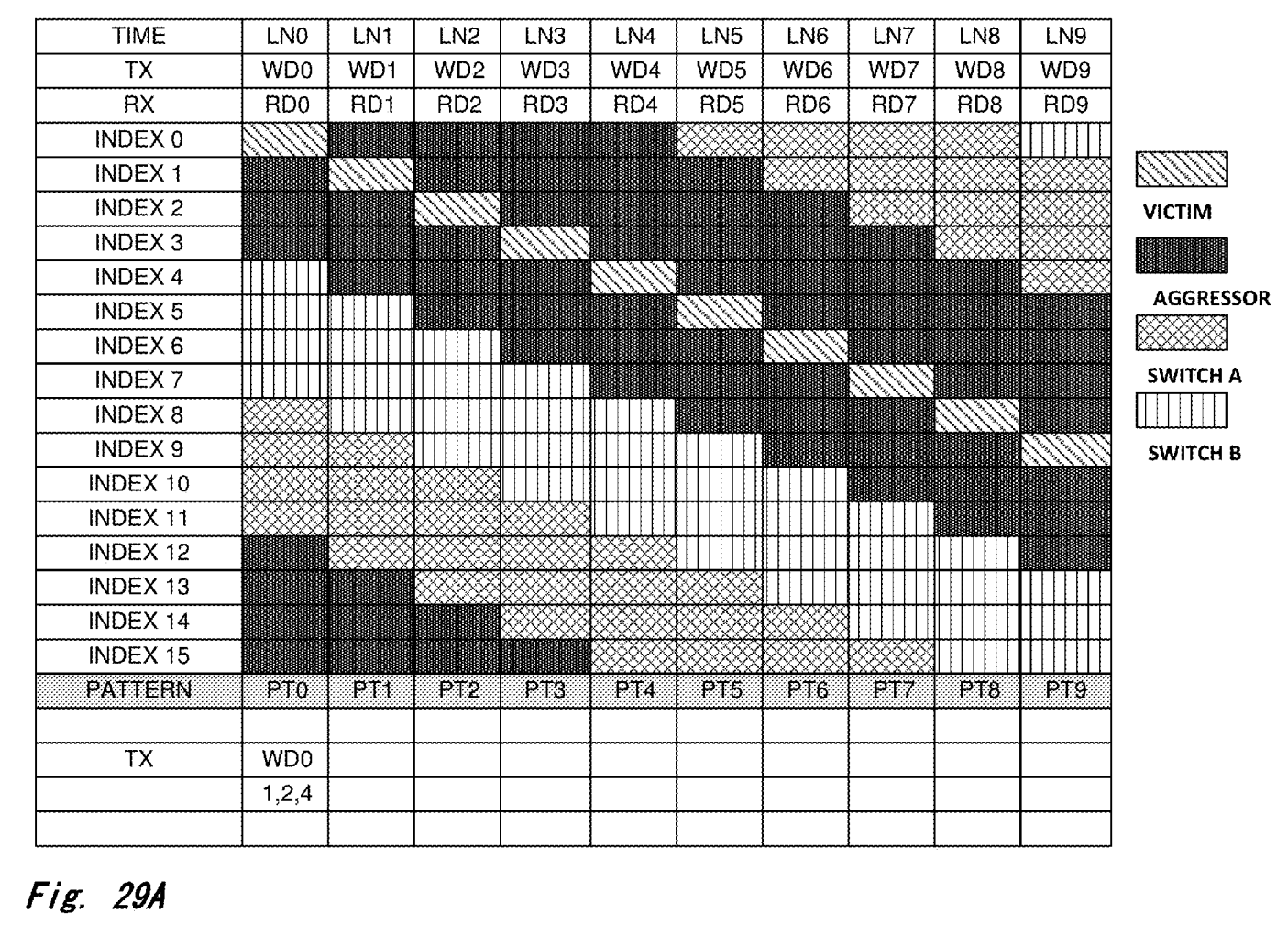
Figure 29B:
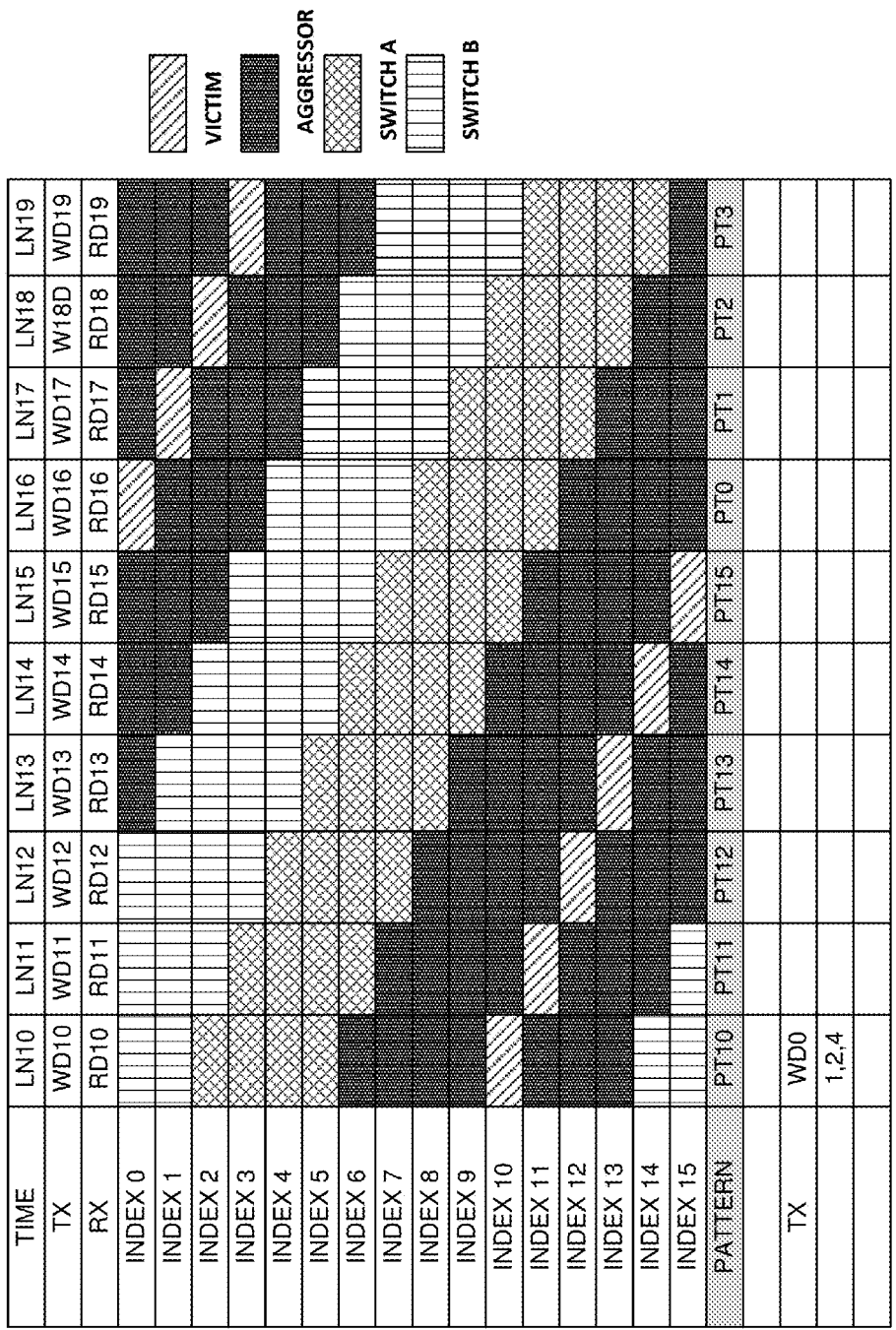
Figure 30:
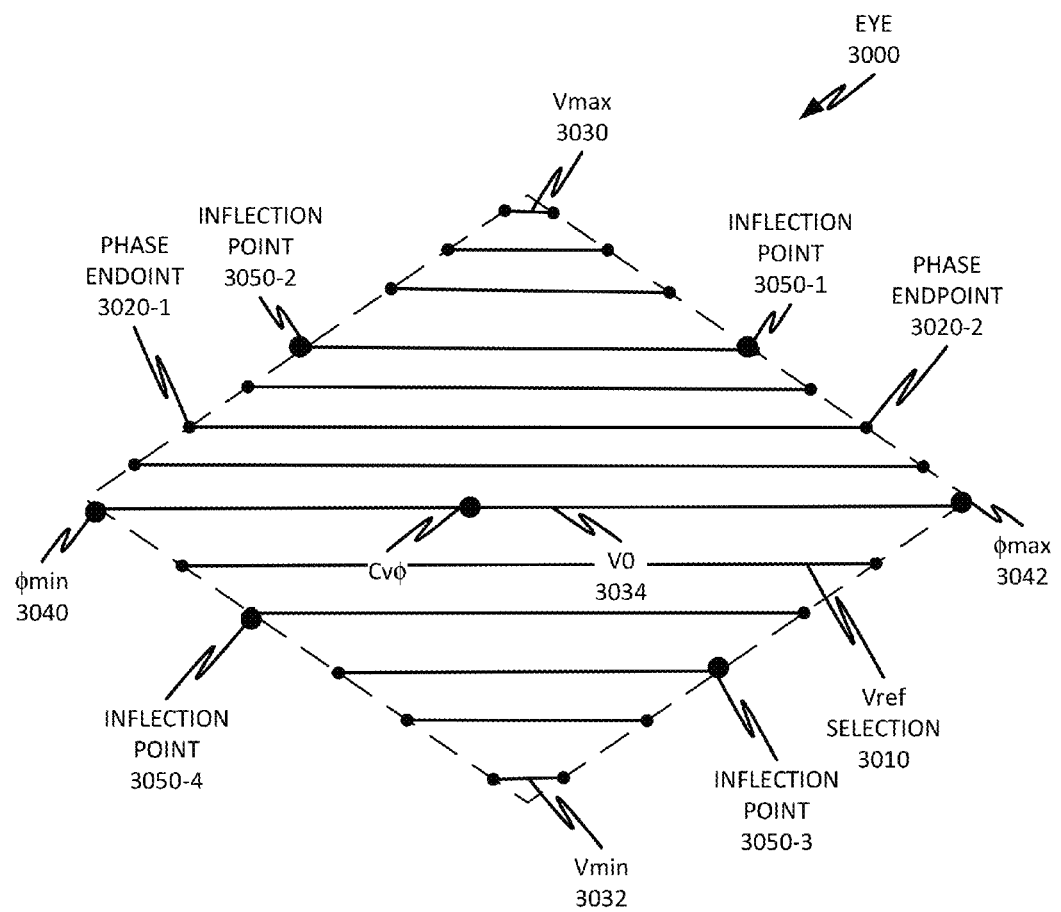
FIG. 30 is an example illustration of eye centering.

FIGS. 28-30 illustrate one embodiment of a centering state, as illustrated in FIG. 17. In this embodiment, when the interface is brought up from a powered-down state, the link must be "trained" before it can function at full speed. Training is necessary because values may "drift" over time and between varying conditions, such as temperature. Particularly with a high-speed link like PCIe, it is necessary to have signals properly centered in both the time domain (horizontally) and the voltage domain (vertically) to avoid bit errors that may be introduced by parameter drift.

Training may include "centering" or "recentering" the clock signal to ensure that signals are properly centered in both the time domain and voltage domain. At any given speed, the clock has a window in which a sample of a data lane will yield a correct value. Sampling outside the window may yield a bit error. The faster the clock, the smaller the window. Adding complication, there are separate windows for vertical Vref centering and horizontal phase centering. Thus, an important aspect of training in one example, and especially in a high-speed interconnect with a narrow window, is adjusting both the Vref and phase of the clock so that data are sampled at or near the center of the window to minimize bit errors.

In one example, training includes feeding the interface a known value such as a PRBS, and then sampling back the bit pattern. After a sample, the clock may be shifted vertically in the voltage domain (Vref), or horizontally in the time domain (phase). The interface detects when bit errors begin to occur, thus constructing a two-dimensional "eye," which may be of a substantially rhomboid shape. In simple terms, values within the eye result in no (or acceptably few) bit errors, while values outside the eye result in an unacceptable number of bit errors.

Centering may include a combination of both hardware and software. Software centering may run, in certain embodiments, from a basic input-output system (BIOS) chip. In one example, hardware is provided for basic or initial centering operations, which may provide a rough centering solution. Software may then be used to supplement and refine the initial centering. Software centering provides additional flexibility, and in some cases provides greater programmability of logic as compared to hardware centering. This can address issues such as, for example, hardware centering finding what it believes is a "near center" for the eye, when in fact an even nearer center is available via additional passes.

In one example, the hardware includes 32 quantized delay settings for phase adjustment, though any number may be provided. $V_{ref}$ settings may be similarly quantized.

In a first (hardware-only) stage, centering may comprise a sweep of the quantized phase settings across each lane, conducted at a nominal voltage V, such as an original value, or the last computed value. After each sweep, an error detector enumerates the number of errors encountered in each pass, if any.

Error detection in this embodiment is an example of transmitter (Tx) adaptation, i.e., Tx values are adjusted based on remote receiver (Rx) metrics which are made available to Tx on a backchannel. Software typically running on a core on the upstream die can access the local die and remote die using a sideband (see FIG. 6), which serves as the backchannel. In HPI, such adaptation happens in both directions simultaneously since the backchannel is not on the same wire as the link layer.

In an embodiment, each sweep is aggregated. Thus, the sweep is scored not on the number of errors on any one lane, but on the number of errors across all lanes. This means that in some cases, a setting that is the best for an individual lane may not be the best for the interconnect as a whole. This phase sweep may be performed in hardware at initial bootup, and may be used to perform a rough centering, in which an approximate center phase $\phi_0$ is selected. In an embodiment, the phase sweep is performed at full speed so that the value of $\phi_0$ is suitable for full-speed operation. In other embodiments, the initial hardware sweep may first be performed at partial speed, such as at half speed, and refined later at full speed.

After the phase sweep is complete, the interface is brought to full speed (if necessary), and software instructions may be loaded from BIOS to continue refining centering in software. In this second stage (performed in one example in software) the voltage ($V_{ref}$) value is similarly swept across quantized settings. Each sweep may be performed at a voltage of $\phi_0 \pm \sigma$. Stated differently, each lane performs a $V_{ref}$ sweep with the phase set at $\phi_0$ to determine the optimal $V_{ref}$ value at that phase. Offset $\sigma$ is then incremented, for example by 1, and $V_{ref}$ is swept on either side of $\phi_0$ (e.g., $\phi_0 \pm \sigma$). If the eye is not yet fully defined, $\sigma$ may again be incremented, and the process may be repeated until the eye is fully defined (see FIG. 30), which occurs in one embodiment when $V_{max} \approx V_{min}$ (where $V_{max}$ is the maximum phase with an acceptable error rate at the selected $\phi$ and $V_{min}$ is the minimum phase with an acceptable error rate at the selected $\phi$).

As with the phase sweep, each voltage sweep results in zero or more errors, and the result at each $V_{ref}$ value is aggregated across all lanes. In an embodiment, the $V_{ref}$ sweep is performed at operational speed (8 Ghz in one example) to ensure that the results are valid for operational speeds.

In a third stage, software may construct a two-dimensional "eye," including a center point, based on the values identified in the first two stages. The eye may be a rhomboid or other suitable shape. Determining an optimal center for the eye may be non-trivial, since the eye opening may be asymmetric, non-monotonic around the major inflection points, and somewhat time-variant. Thus, eye centering may be performed in software. In one example, centering includes finding the values of $\phi_{max}$ and $\phi_{min}$, and a midpoint between the two, as well as $V_{max}$ and $V_{min}$, and a midpoint between the two. From the midpoints, the software can compute a proposed center $C_{V\phi}$.

The software may then select four inflection points along the edges of the rhomboid, and run a test pattern at the inflection points, along with the four apexes of the rhomboid, located at $V_{max}$, $V_{min}$, $\phi_{max}$, and $\phi_{min}$. If the eye has been constructed and centered properly, these eight points should all fall just within the eye, and should thus have an acceptable error rate. If any of the eight points results in an unacceptable error rate, the eye may need to be adjusted to improve performance. For example, if an inflection point fails, the boundary of the eye may need to be adjusted one quantum inward on one or both axes. The new value then needs to be similarly tested to ensure that it passes. When a point is thus adjusted, the center $C_{V\phi}$ may also be adjusted accordingly.

The error detection described in any of the stages above may be enhanced by providing a cross-talk pattern, as illustrated in FIGS. 29A and 29B. It can be seen in this example that a test of one lane comprises selecting that lane under test as a "victim" lane. A test pattern may be driven on that lane, including for example a PRBS. Adjacent lanes, as well as lanes up to l lanes away (in this example, l=4) are "aggressor" lanes. These lanes receive a crosstalk pattern, which in this case is a logical inverse of the test pattern, thus approximating a "worst case" scenario. Remaining lanes are neutral. This test pattern is particularly useful in centering the eye, as it is important in that stage to probe the edge cases and ensure that they are legitimately within the eye.

FIG. 28 provides a flow chart of centering as described in this Specification.

In block 2810, the interconnect awakes, such as coming up for boot after a machine has been turned off.

In block 2820, the interconnect performs initial voltage centering as described above. This may include performing a voltage sweep in hardware, and selecting the setting that results in the fewest overall bit errors.

In block 2840, once rough voltage centering is completed in hardware, the interface may be brought to its full speed (if voltage centering was performed at reduced speed, such as at half speed).

In block 2850, phase centering is performed, for example in software. In certain examples, the software may also refine voltage centering as described herein. Phase centering in one embodiment comprises sweeping the phase $\phi$ for each voltage $V_0 \pm \sigma$, as described above. In other words, a voltage is selected, and the phase is swept at that voltage.

In block 2870, an eye is constructed in software.

In block 2880, eye centering is performed. As described above, this involves, in one embodiment, selecting the four apexes and four inflection points, and stress testing each point to determine whether it passes. If a point fails, that apex or inflection point may be adjusted inward and tested again. The eye center $C_{V\phi}$ may also be adjusted accordingly.

FIGS. 29A and 29B illustrate an example victim/aggressor test pattern, as described above. In this example, up to four lanes above or below the victim lane (being tested) are populated with the aggressor pattern. The remaining lanes are neutral. In an embodiment, the aggressor pattern is an exact bitwise inverse of the PRBS test pattern on the victim lane.

FIG. 30 is an illustration of an example of an eye 3000. In this illustration, eye 3000 is a proper rhombus for ease of illustrating certain important features. However, the features of eye 3000 need not be, and often will not be, regular or monotonic. The rhomboid defined by eye 3000 could be skewed left, right, up, or down, and the edges need not consist of perfectly collinear lines. This may especially be true once eye 3000 has been subjected to centering.

In this example, eye 3000 is defined initially by sweeping each $V_{ref}$ selection 3010 across a plurality of phase quanta to identify two phase endpoints 3020 for that $V_{ref}$ selection. The sweeps may begin with $V_0$ 3034, and proceed in quantized steps above and below until $V_{max}$ 3030 and $V_{min}$ 3032 are identified. In this example, $\phi_{max}$ 3042 and $\phi_{min}$ 3040 both occur on the $V_0$ line, though in reality one or both may occur on some other line, and need not occur on the same line.

Inflection points 3050 are also chosen. In this example, $V_0$ to $V_{max}$ comprises an odd number of quanta, so that inflection points 3050-1 and 3050-2 can be chosen at the "true" center point between the two. However, $V_0$ to $V_{min}$ comprises an even number of quanta, so that inflection points 3050-3 and 3050-4 must be chosen off center. These may be chosen by a floor function, a ceiling function, or one may be chosen on either side of the divide, depending on design choices.

An initial center $C_{V\phi}$ is also chosen. Again, because the values are quantized, this may not be the geometric center, but rather may be off center by one or more quanta in any direction. During centering, $V_{max}$ 3030, $V_{min}$ 3032, $\phi_{max}$ 3042, $\phi_{min}$ 3040, and inflection points 3050 are used as test points. As a result of testing, any of these points may be adjusted up or down, left or right, by one or more quanta, thus making the shape of eye 3000 more irregular. As test points are adjusted, center $C_{V\phi}$ may also be adjusted accordingly as necessary. Once centering is complete, all lanes are set to the phase and voltage values of $C_{V\phi}$ to ensure optimal operation.

Figure 31:
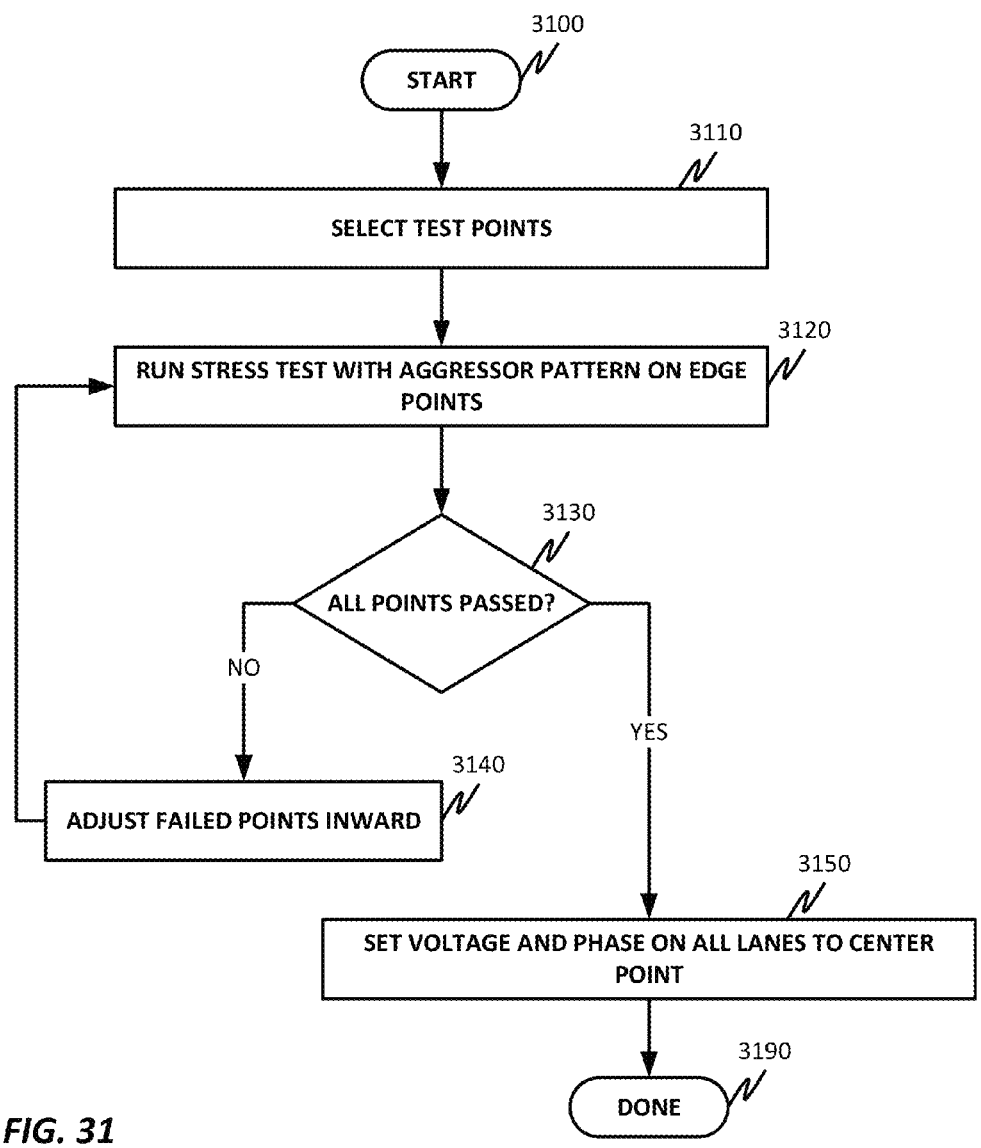
FIG. 31 is an example flow chart of a method for eye centering.

FIG. 31 is a flow diagram of an eye centering method 3100 according to one or more examples of the present Specification. Certain embodiments of method 3100 may be performed in software, though the method may also be performed in hardware, or in a combination of hardware and software.

In block 3110, the software selects test points, for example $V_{max}$ 3030, $V_{min}$ 3032, $\phi_{max}$ 3042, $\phi_{min}$ 3040, and inflection points 3050 of FIG. 30.

In block 3120, the software runs a stress test on each lane at each test point, using the victim/aggressor lanes described in FIGS. 29A and 29B.

In decision block 3130, if all points passed, then in block 3150, all lanes may be set with the phase and voltage of the eye center $C_{V\phi}$.

In block 3140, if all points did not pass, then failed points may be adjusted inward. Control then passes to block 3120 to test the new point(s). This continues iteratively until all points have passed and the data lanes have been properly configured in block 3150.

In block 3190, the method is done.

In certain examples, an operation known as "recentering" may also occur as necessary. Recentering may be required when, for example, an unacceptable number of errors occur during operation. In one example, an unacceptable error rate is more than one circular redundancy check (CRC) error in approximately $10^{12}$ bits. When this occurs, flits stop, and phits take over the interconnect to perform a phase sweep in hardware (software may not be available because the machine is in operation, so the BIOS cannot be loaded).

Centering may take several microseconds, which is unacceptably slow for periodic centering in a high-speed interconnect. Thus, in one embodiment, recentering occurs only when an error tracker in the interface link layer detects that the number of CRC errors received in a span of time is greater than a threshold value. For example, a CRC error once every $10^{12}$ bits may be acceptable. But more than that may be an indication of a true error. Thus, the receiving agent may send a sideband message informing the transmitting agent that recentering is necessary. When that occurs, the sending agent acknowledges the message, and the two agents enter recentering.

The message on the sideband may be a link control packet (LCP), which is a special class of packets sent on the interface sideband. The sideband may operate at a speed orders of magnitude slower than the link layer. For example, the interface sideband may operate at 100 to 400 MHz.

Some interface designs may opt to do low frequency or continuous CDR tracking using signaling on the data lanes, which consists of flits/packets which are scrambled with a PRBS23. During quiet periods when there are not enough packets on the data lanes, the PHY inserts dummy LCPs so the tracking can be maintained.

Figure 32:
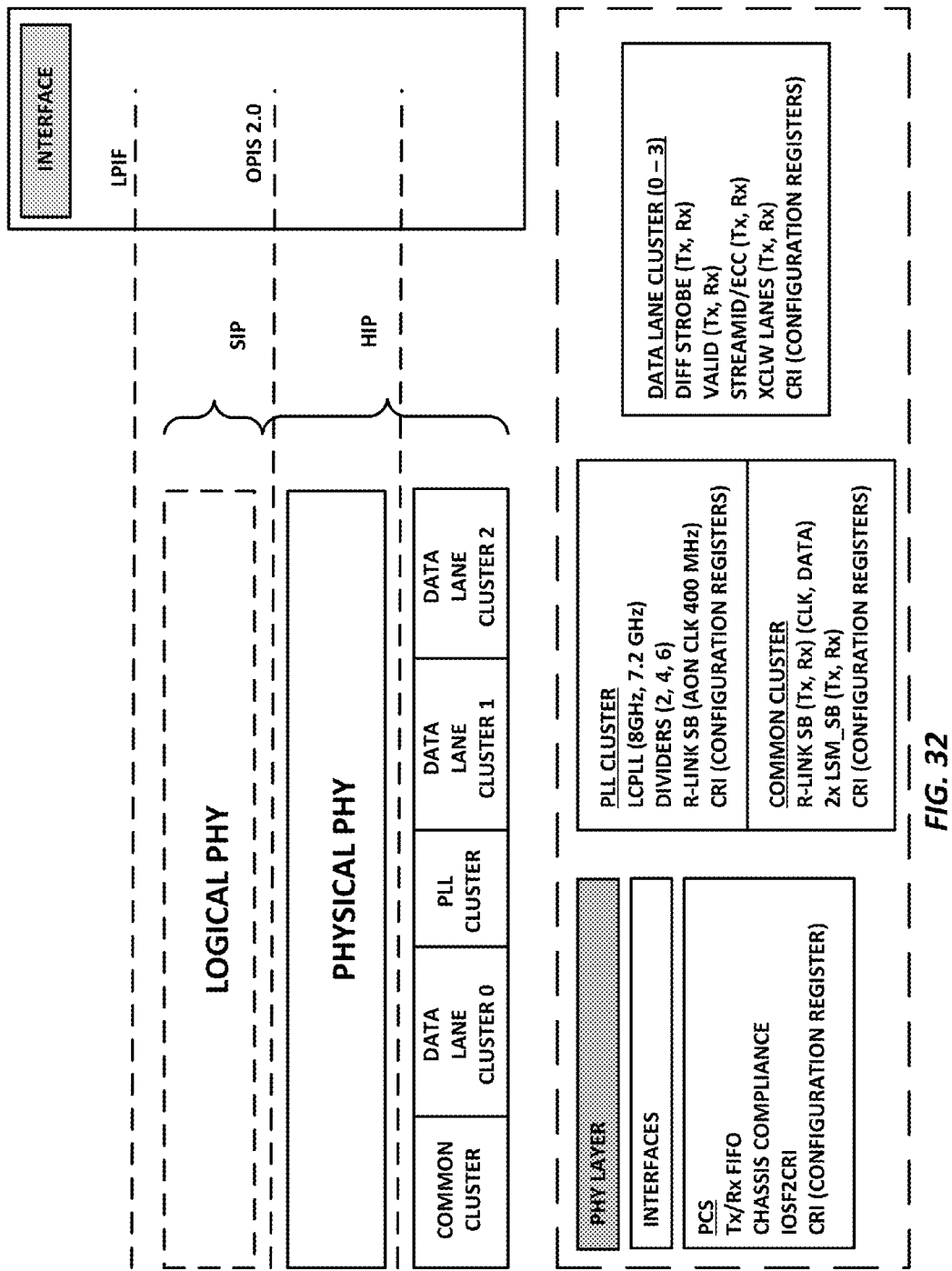
FIG. 32 is an example block diagram of a system including hard IP and soft IP.
Figure 33:
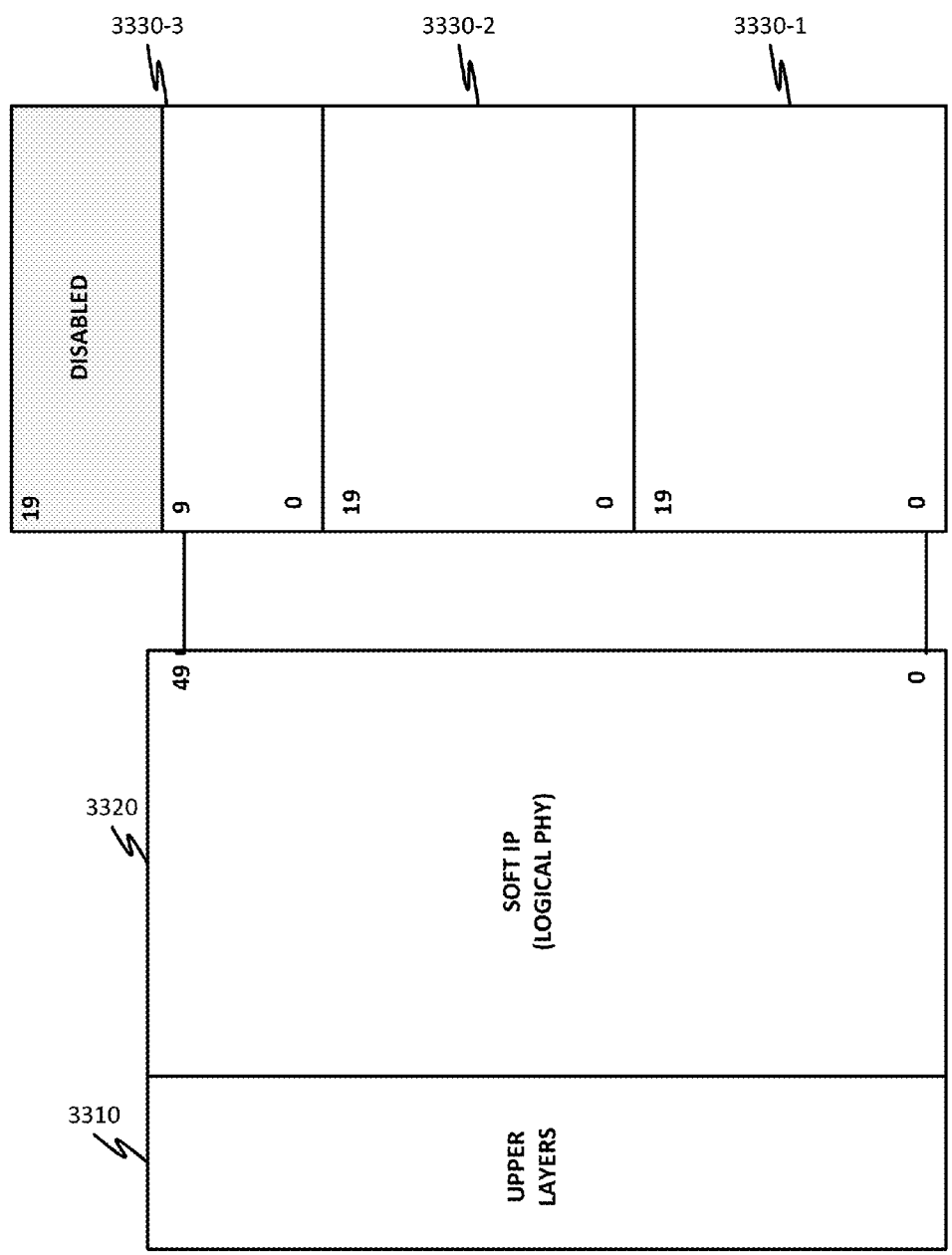
FIG. 33 is an example block diagram of an interface between hard IP blocks and soft IP blocks.
Figure 34:
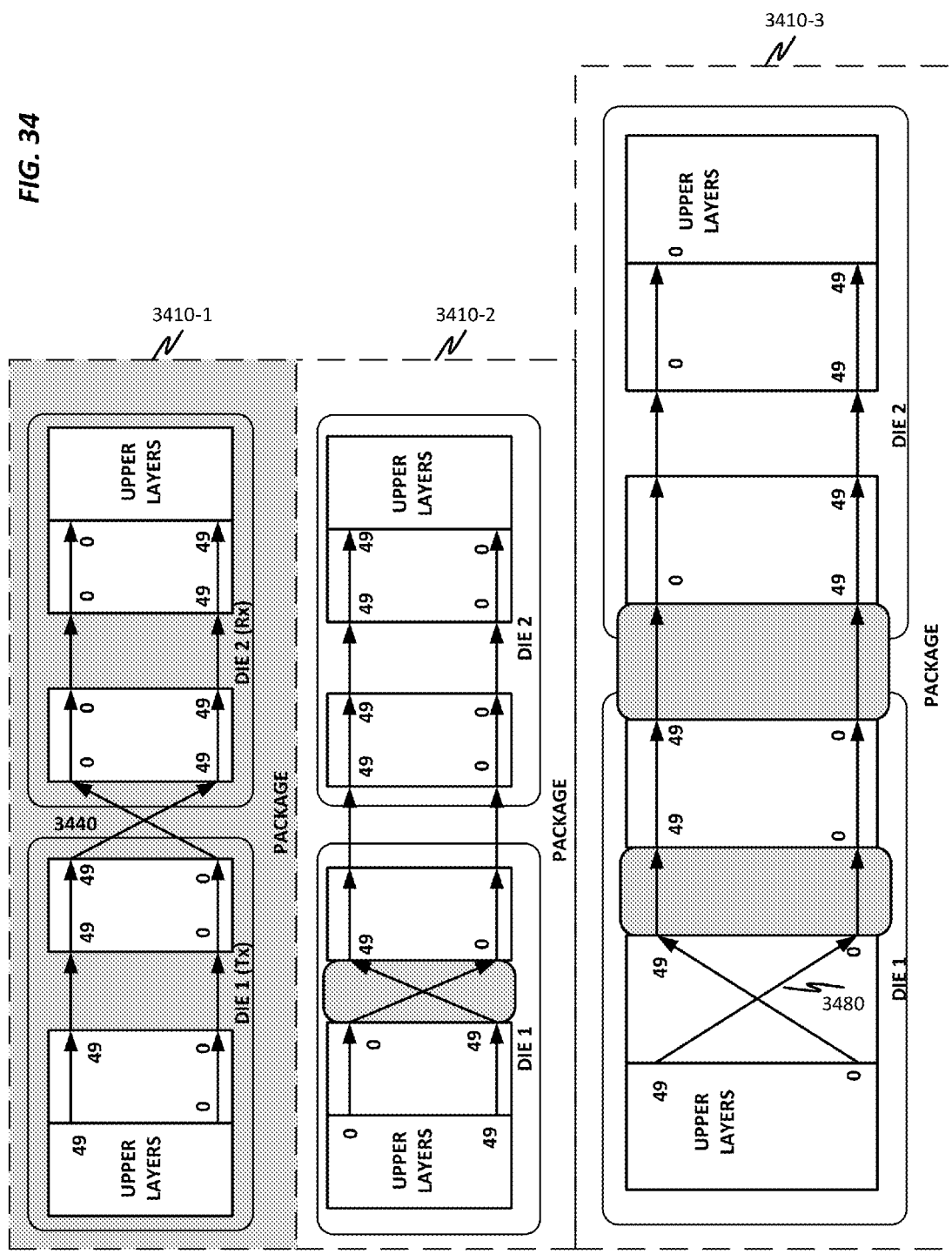
FIG. 34 is an example of a system with a multiplexer-like programmable switch for handling lane reversal.

Turning now to FIGS. 32-34, in certain embodiments, it may be beneficial to design a system in stages by first designing lower-order blocks and then aggregating the lower order blocks into functional elements. An intellectual property (IP) block (or "computing block") can refer to a reusable unit of logic, circuitry, or chip layout. An SoC, for example, can include multiple IP blocks, including multiple instances of the same IP block. An IP block, in some instances, can support multiple functions, facilitated, in some cases, by one or multiple devices included in the IP block. A system can be designed by defining a set of IP blocks to implement the system. For example, one team may design a low level functional block, and make that block available to other teams for use as a drop-in component for later designs. In this type of multi-layer design process, it is beneficial to provide certain functions as a "hard IP block" or "hard IP" (meaning that the IP block has a fixed routing that may not be altered during higher-level design). A hard IP block may include, for example, analog components that are sensitive to changes in routing. For certain analog components, rerouting may cause changes in impedance or capacitance, which may affect the functionality of certain sensitive analog components. Thus, the development team responsible for designing a hard IP block may optimize those parameters and ensure that each of the components operates within acceptable parameters. Once that routing is fixed, it should not be changed by downstream designers.

Other IP blocks may be provided as "soft IP." Soft IP may include, for example, digital components that are less sensitive to changes in routing. Thus, a soft IP block may be provided with a fixed logical function, but may be laid out according to the design requirements of a particular design. For example, a PHY layer may be provided with the physical PHY implemented in hard IP, and the logical PHY implemented in soft IP.

While it is advantageous to provide certain types of functional blocks in a hard IP, a limitation of hard IP is that the block is, by design and by definition, not flexible. Thus, in one example, an SOC designer may require 50 data lanes. This designer may be working with a hard IP block that provides 20 data lanes per unit. Because the routing of the hard IP block is fixed at design time, the SOC designer must use an integer number of hard IP blocks. Specifically, using p hard IP blocks, where each block provides n data lanes, h=n*p total hard IP data lanes are provided. Where the system design calls for k total data lanes, it is possible to encounter k≠h. For example, where k=50 and n=20, p=⌈k/n⌉=3 hard IP blocks are required for h=n*p=60 available hard IP data lanes. This result may be acceptable so long as h≥k, or in other words, so long as p hard IP blocks provide at least enough data lanes. During layout of the final SOC, the optimizing software will not connect the extra 10 data lanes to any power supplies or logic gates, so that the only cost associated with having the extra data lanes is some amount of extra space on the silicon wafer. Because hard IP blocks tend to be small compared to the overall wafer, the wasted space is not excessive. To facilitate the use of hard IP blocks, each data lane may be provided with a separate enable, so that unused data lanes can be ignored. Also note that other combinations of lanes from clusters can also be used depending on the situation (e.g., the unused lanes could be distributed in the middle of the cluster to reduce crosstalk).

FIG. 32 discloses a block diagram of an example die, illustrating that the logical PHY may be implemented in soft IP (SIP), while the physical PHY may be implemented in hard IP (HIP). An internal standard interface (OPIS, on-package interface (OPI) PHY interface specification) is defined in this example to facilitate the division. A link PHY interface (LPI) is also provided.

This partition allows movement of configuration aspects, such as lane reversal, to the soft IP. The HIP (which is detailed in the dotted box) is architected as clusters which allows for flexibility (e.g. port width) without sacrificing performance (e.g. speed).

FIG. 33 is an illustrative example of placement of hard and soft IP according to one or more examples of the present Specification. In FIG. 33, upper layers 3310 provide higher-level logic, and may be implemented in any suitable form. A soft IP 3320 provides a logical PHY. Several hard IP blocks 3330 are also provided. Specifically, hard IP blocks 3330-1, 3330-2, and 3330-3 are each provided with 20 data lanes (n=20), and with necessary supporting lanes. In this implementation, a PHY is provided with 50 total lanes (k=50). Thus, three hard IP blocks 3330 are used, for 60 total available lanes in the hard IP (h=60). Because the hard IP blocks are fixed, 10 extra lanes are included. In this example, each hard IP block 3330 may provide a separate enable for each data lane. Thus, lanes 10-19 on hard IP block 3330-3 are disabled. During layout, they will receive no routing, no power, no clock, and no other signals. Lanes 10-19 are shown as disabled by way of example only. In other embodiments, any 10 lanes could be disabled to the same effect, depending on design requirements.

FIG. 34 illustrates an issue that may arise with the use of hard and soft IP blocks, namely lane reversal. This can be illustrated with an example PHY package providing both a transmitter and a receiver. In this example, the transmitter and receiver may each be provided on a separate SOC die, and then integrated onto a single package. Each die may include, for example, a physical PHY provided in hard IP, and a logical PHY provided in soft IP. Because the hard IP, soft IP, and/or dies may be provided by different groups within the same vendor, or by different vendors, in some cases the data lanes of one group may be reversed from the data lanes of the other group. In the case of an SOC designer, the designer may have no way of knowing beforehand how an OEM is going to implement the design, and whether the lanes will be reversed.

Thus, lane reversals may be encountered at a variety of interfaces. In one case, lane reversal may occur between the hard IP and the soft IP. In other cases, lane reversal may occur between two dies on the same package.

To handle such a lane reversal, a "bowtie" may be used to route the data lanes to one another. However, because these data lanes necessarily cross over each other, at least 2 additional layers are necessary to route a bowtie (either on-die, or on a package). This introduces additional design complexity.

FIG. 34 includes three packages 3410. By way of example only, each package 3410 includes a hard IP 3330, a soft IP 3320, and upper layer logic 3310. As before, hard IP 3330 provides a physical PHY, soft IP 3320 provides logical PHY functions, and upper layers 3310 provide additional upper layer logic.

For example, in package 3410-1, Die 1 (Tx) is a PHY transmitter, and Die 2 (Rx) is a PHY receiver. As illustrated in this example, the data lanes of Die 1 are lane reversed from the data lanes of Die 2. Thus, if a bowtie is used, additional layers may be required so that the connections can cross over one another. This adds complexity to the design.

In package 3410-2, there is lane reversal between hard IP 3330 and soft IP 3320 of Die 1. In this case, the bowtie connection must be made on Die 1. Again, the bowtie will require additional layers on Die 1 so that the lanes can be properly matched up. As before, this results in additional design complexity.

In the example of package 3410-3, however, lane reversal can be repaired and the lanes properly aligned without the need for a bowtie connection and the additional complexity associated therewith. Specifically, in package 3410-3, soft IP 3320 includes a multiplexer-like programmable switch 3480. Switch 3480 may not be a traditional multiplexer with a select signal to select between inputs, but may be internally structurally similar to a multiplexer, with the difference that in this example, the number of inputs is identical to the number of outputs.

The programmable aspect of switch 3480 includes that the switch includes at least two modes, namely one mode to route lanes straight across, and another mode to route lanes in reverse order. Other programming options may also be provided as necessary. To this end, the data lanes may be provided with a virtual fuse property. At boot up, a fuse puller device may determine whether lanes are to be reversed on package 3410-3. If the lanes are to be reversed, then programmable switch 3480 will be fused so as to perform the lane reversal. If the lanes are not to be reversed, then the fuse puller fuses multiplexer 3420 so as not to reverse the lanes. Where the orientation is known at design time, the designer of package 3410-3 may program the fuse puller to provide the correct orientation.

Advantageously, this architecture accounts for the fact that the designer of soft IP 3320 may not be able to know in advance the orientation of the lanes. For example, package 3410-3 may be provided to an original equipment manufacturer (OEM), who may orient package 3410-3 according to its own design requirements. In that case, the OEM may be cognizant of the orientation, and may manually set the fuse puller to orient switch 3480 correctly. In another example, on bootup, package 3410-3 may perform a training sequence to determine whether the data lanes are routed straight across, or crosswise. Based on the result of the training sequence, software may then program the fuse puller to provide the proper orientation to switch 3480.

While the present invention has been described with respect to a limited number of embodiments, those skilled in the art will appreciate numerous modifications and variations therefrom. It is intended that the appended claims cover all such modifications and variations as fall within the true spirit and scope of this present Specification.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine-readable medium to store information transmitted via optical or electrical wave modulation or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present Specification.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated separately commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again, that use of the term 'configured to' does not require operation, but instead focuses on the latent state of an apparatus, hardware, and/or element, wherein the latent state of the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of "to", "capable to", or "operable to", in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represent binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine-readable, computer-accessible, or computer-readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; or other forms of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible, machine-readable medium suitable for storing or transmitting electronic instructions or information in a form readable by a machine (e.g., a computer).

The following examples pertain to embodiments in accordance with this Specification. One or more embodiments may provide an apparatus, a system, a machine-readable storage, a machine-readable medium, hardware- and/or software-based logic, and a method to provide a hard intellectual property (IP) subassembly comprising p hard IP blocks, wherein each hard IP block is to provide n data lanes and is to have a fixed routing, and wherein the p hard IP blocks are to provide $h=n*p$ available hard IP lanes; and a soft IP assembly having at least one soft IP block comprising routable logic and providing k data lanes, wherein $k \neq h$.

In one or more embodiments, the data lanes have a separate enable, and k–h lanes are to be disabled.

In one or more embodiments, the soft IP block further comprises a programmable switch to selectively map data lanes according to a switch mode.

In one or more embodiments, the switch mode comprises at least a direct lane mapping mode, in which lanes are to be mapped in numerical order, and a cross-mapping mode, in which lanes are to be mapped in reverse numerical order.

In one or more embodiments, the switch mode is programmable via a fuse pull.

In one or more embodiments, the switch mode is programmable via a training sequence.

In one or more embodiments, the fuses are programmable via read-only memory.

In one or more embodiments, each lane is to receive a non-correlated pseudo-random bit sequence for centering.

In one or more embodiments, at least some of the hard IP blocks are to receive a separate VALID signal.

In one or more embodiments, at least some of the hard IP blocks are to receive a separate STREAM_ID.

In one or more embodiments, an interconnected system, comprises a first agent; a second agent; and an interconnect to communicatively couple the first agent to the second agent, comprising: a hard intellectual property (IP) subassembly comprising p hard IP blocks, wherein each hard IP block is to provide n data lanes and is to have a fixed routing, and wherein the p hard IP blocks are to provide $h=n*p$ available hard IP lanes; and a soft IP assembly having at least one soft IP block comprising routable logic and providing k data lanes, wherein $k \neq h$.

In one or more embodiments, there is also disclosed a method of provisioning an interconnect, comprising placing a hard intellectual property (IP) subassembly comprising p hard IP blocks, wherein each hard IP block is to provide n data lanes and is to have a fixed routing, and wherein the p hard IP blocks are to provide $h=n*p$ available hard IP lanes;

and placing a soft IP assembly having at least one soft IP block comprising routable logic and providing k data lanes, wherein k≠h.

In one or more embodiments, the method further comprises disabling k−h lanes.

In one or more embodiments, the method further comprises selectively mapping data lanes according to a switch mode.

In one or more embodiments, selectively mapping data lanes according to a switch mode comprises direct lane mapping mode in numerical order.

In one or more embodiments, selectively mapping data lanes according to a switch mode comprises cross mapping lanes in reverse numerical order.

In one or more embodiments, the method further comprises providing each lane a pseudo-random bit sequence for centering.

In one or more embodiments, an interconnect apparatus comprises a clock generator to generate a clock signal; a phase shifter to phase shift the clock signal by a test phase; an error rate detector to measure an error rate of the test phase; and an operational phase selector to select an operational phase of the clock signal based at least in part, on the error rate of the test phase.

In one or more embodiments, an interconnect apparatus comprises a stream lane encoder to encode a species identifier for a data packet; and a lane driver to drive the species identifier onto at least one of n data lanes during a non-data time of the data packet.

Reference throughout this Specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this Specification are not necessarily all referring to the same embodiment. Furthermore, the particular features, structures, or characteristics may be combined in any suitable manner in one or more embodiments.

In the foregoing Specification, a detailed description has been given with reference to specific exemplary embodiments. It will, however, be evident that various modifications and changes may be made thereto without departing from the broader spirit and scope of the invention as set forth in the appended claims. The Specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   an interconnect comprising p hard logic blocks, wherein each hard logic block is to provide n data lanes and is to have a fixed routing, and wherein the p hard logic blocks are to provide h=n*p available hard data lanes, the data lanes having separate per-lane enables; and
   a soft computing block comprising routable logic to communicatively couple the interconnect to a host platform and to provide for the interconnect k data lanes, wherein k<h;
   wherein k−h lanes are to be disabled via the per-lane enables.

2. The apparatus of claim 1, wherein the soft computing block further comprises a programmable switch to selectively map data lanes according to a switch mode.

3. The apparatus of claim 2, wherein the switch mode comprises at least a direct lane mapping mode, in which lanes are to be mapped in numerical order, and a cross-mapping mode, in which lanes are to be mapped in reverse numerical order.

4. The apparatus of claim 2, wherein the switch mode is programmable via a fuse pull.

5. The apparatus of claim 2, wherein the switch mode is programmable via a training sequence.

6. The apparatus of claim 2, wherein the switch mode is programmable via read-only memory.

7. The apparatus of claim 1, wherein each lane is to receive a non-correlated pseudo-random bit sequence for centering.

8. The apparatus of claim 1, wherein at least some of the hard logic blocks are to receive a separate VALID signal.

9. The apparatus of claim 1, wherein at least some of the hard logic blocks are to receive a separate STREAM_ID.

10. The apparatus of claim 1, wherein the k−h disabled lanes are to be distributed amongst the k data lanes.

11. An interconnected system, comprising:
    a first agent;
    a second agent; and
    an interconnect to communicatively couple the first agent to the second agent, comprising:
    p hard logic blocks, wherein each hard logic block is to provide n data lanes and is to have a fixed routing, and wherein the p hard logic blocks are to provide h=n*p available hard data lanes, the data lanes having separate per-lane enables; and
    a soft computing block comprising routable logic to communicatively couple the interconnect to a host platform and to provide for the interconnect k data lanes, wherein k<h;
    wherein k−h lanes are to be disabled via the per-lane enables.

12. The interconnected system of claim 11, wherein the soft computing block further comprises a programmable switch to selectively map data lanes according to a switch mode.

13. The interconnected system of claim 12, wherein the switch mode comprises at least a direct lane mapping mode, in which lanes are to be mapped in numerical order, and a cross-mapping mode, in which lanes are to be mapped in reverse numerical order.

14. The interconnected system of claim 12, wherein the switch mode is programmable via a fuse pull.

15. The interconnected system of claim 12, wherein the switch mode is programmable via a training sequence.

16. The interconnected system of claim 12, wherein the switch mode is programmable via read-only memory.

17. The interconnected system of claim 12, wherein each lane is to receive a non-correlated pseudo-random bit sequence for centering.

18. The interconnected system of claim 12, wherein at least some of the hard logic blocks are to receive a separate VALID signal.

19. The interconnected system of claim 12, wherein at least some of the hard logic blocks are to receive a separate STREAM_ID.

20. The interconnected system of claim 11, wherein the k−h disabled lanes are to be distributed amongst the k data lanes.

21. A method of provisioning an interconnect, comprising:
    placing p hard logic blocks, wherein each hard logic block is to provide n data lanes and is to have a fixed routing, and wherein the p hard logic blocks are to provide h=n*p available hard data lanes, the data lanes having separate per-lane enables; and placing a soft computing block comprising routable logic to communicatively couple the interconnect to a host platform and to provide for the interconnect k data lanes, wherein k<h;

wherein k–h lanes are to be disabled via the per-lane enables.

22. The method of claim 21, further comprising disabling k h lanes.

23. The method of claim 21, further comprising selectively mapping data lanes according to a switch mode.

24. The method of claim 21, further comprising providing each lane a pseudo-random bit sequence for centering.

25. The method of claim 21, further comprising distributing the k–h disabled lanes amongst the k data lanes.

* * * * *

UNITED STATES PATENT AND TRADEMARK OFFICE
CERTIFICATE OF CORRECTION

PATENT NO. : 9,946,676 B2  
APPLICATION NO. : 14/669975  
DATED : April 17, 2018  
INVENTOR(S) : Wagh et al.

Page 1 of 1

It is certified that error appears in the above-identified patent and that said Letters Patent is hereby corrected as shown below:

In the Claims

In Column 43, Line 63, delete "wherein k-h lanes" and insert -- wherein h-k lanes --, therefor.

In Column 44, Line 35, delete "wherein k-h lanes" and insert -- wherein h-k lanes --, therefor.

In Column 45, Line 8, delete "wherein k-h lanes" and insert -- wherein h-k lanes --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*